(12) United States Patent
Feng et al.

(10) Patent No.: US 12,375,757 B2
(45) Date of Patent: Jul. 29, 2025

(54) REFRESH RATE SETTING METHOD AND RELATED DEVICE

(71) Applicant: Honor Device Co., Ltd., Shenzhen (CN)

(72) Inventors: Xiaogang Feng, Shenzhen (CN); Fei Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/035,380

(22) PCT Filed: Aug. 29, 2022

(86) PCT No.: PCT/CN2022/115417
§ 371 (c)(1),
(2) Date: May 4, 2023

(87) PCT Pub. No.: WO2023/109184
PCT Pub. Date: Jun. 22, 2023

(65) Prior Publication Data
US 2024/0357201 A1     Oct. 24, 2024

(30) Foreign Application Priority Data

Dec. 16, 2021   (CN) .......................... 202111545016.7

(51) Int. Cl.
*H04N 21/4402*     (2011.01)
*H04N 21/443*      (2011.01)

(52) U.S. Cl.
CPC . *H04N 21/440281* (2013.01); *H04N 21/4438* (2013.01)

(58) Field of Classification Search
CPC ....... H04N 21/440281; H04N 21/4438; H04N 21/4788; H04N 21/44218; G06F 9/451
See application file for complete search history.

(56) References Cited

U.S. PATENT DOCUMENTS

| | | | |
|---|---|---|---|
| 10,460,643 B2 * | 10/2019 | Peng | ...................... G06F 1/3265 |
| 11,100,901 B2 | 8/2021 | Peng et al. | |
| 2022/0060607 A1 | 2/2022 | Huang | |
| 2024/0221701 A1 * | 7/2024 | Zhao | ...................... G09G 5/005 |

(Continued)

FOREIGN PATENT DOCUMENTS

| | | |
|---|---|---|
| CN | 106210853 A | 12/2016 |
| CN | 106919358 A | 7/2017 |
| CN | 106919402 A | 7/2017 |

(Continued)

*Primary Examiner* — Rodney Amadiz
(74) *Attorney, Agent, or Firm* — Leydig, Voit & Mayer, Ltd.

(57) ABSTRACT

This application relates to the field of display technologies, and discloses a refresh rate setting method and a related device, aiming to meet a requirement of an electronic device for a refresh rate in a video playing process. A method includes: refreshing and displaying the application interface of the application at the first refresh rate in response to receiving an operation of launching the application by a user; displaying a video picture at the first refresh rate in response to receiving an operation of playing a video by the user, determining, in a process of displaying the video picture, whether to perform bullet screen drawing in a preset duration.

20 Claims, 21 Drawing Sheets

(56) References Cited

U.S. PATENT DOCUMENTS

2024/0348869 A1* 10/2024 Feng ...................... G06F 9/451

FOREIGN PATENT DOCUMENTS

| CN | 106933526 | A | 7/2017 |
| CN | 109120988 | A | 1/2019 |
| CN | 109413480 | A | 3/2019 |
| CN | 111767013 | A | 10/2020 |
| CN | 113438552 | A | 9/2021 |
| CN | 113766324 | A | 12/2021 |
| CN | 114205673 | A | 3/2022 |
| WO | 2018161578 | A1 | 9/2018 |
| WO | 2018161957 | A1 | 9/2018 |
| WO | 2021175213 | A1 | 9/2021 |

* cited by examiner

| Launcher | Video application | Drawing and rendering module | AMS | WMS | Frame rate decision-making module | Surface Flinger |

Receive an operation of launching a video application by a user

S4101. Deliver a request of launching an application Activity to an AMS, where the request carries a package name S4102. Launch an application Activity S4103. Send window information corresponding to a video application home screen, where the window information carries the package name S4104. Create a window of the video application home screen S4105. Send view information corresponding to the window of the video application home screen TO FIG. 4a-2   TO FIG. 4a-2   TO FIG. 4a-2   TO FIG. 4a-2   TO FIG. 4a-2   TO FIG. 4a-2   TO FIG. 4a-2

FIG. 4a-1

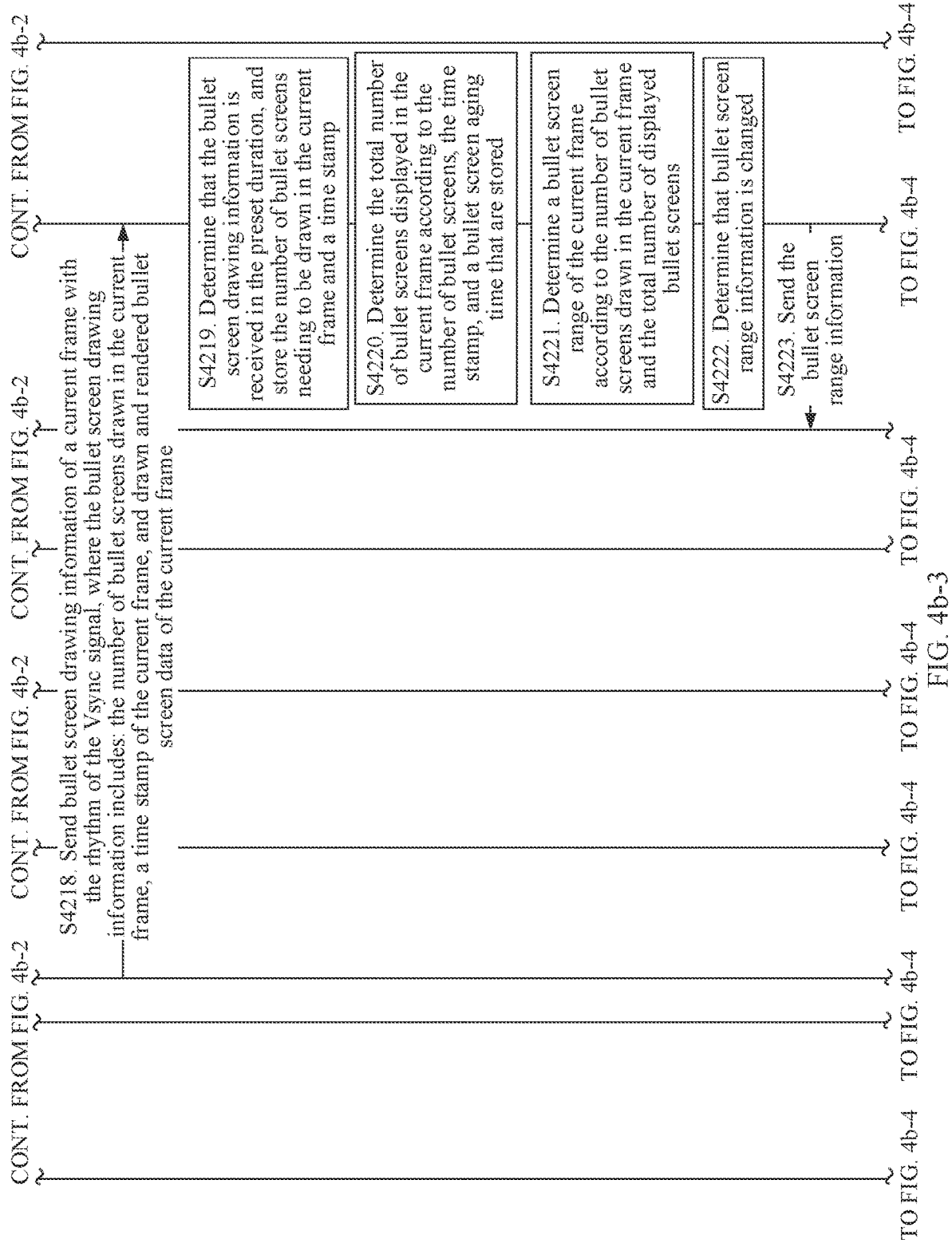

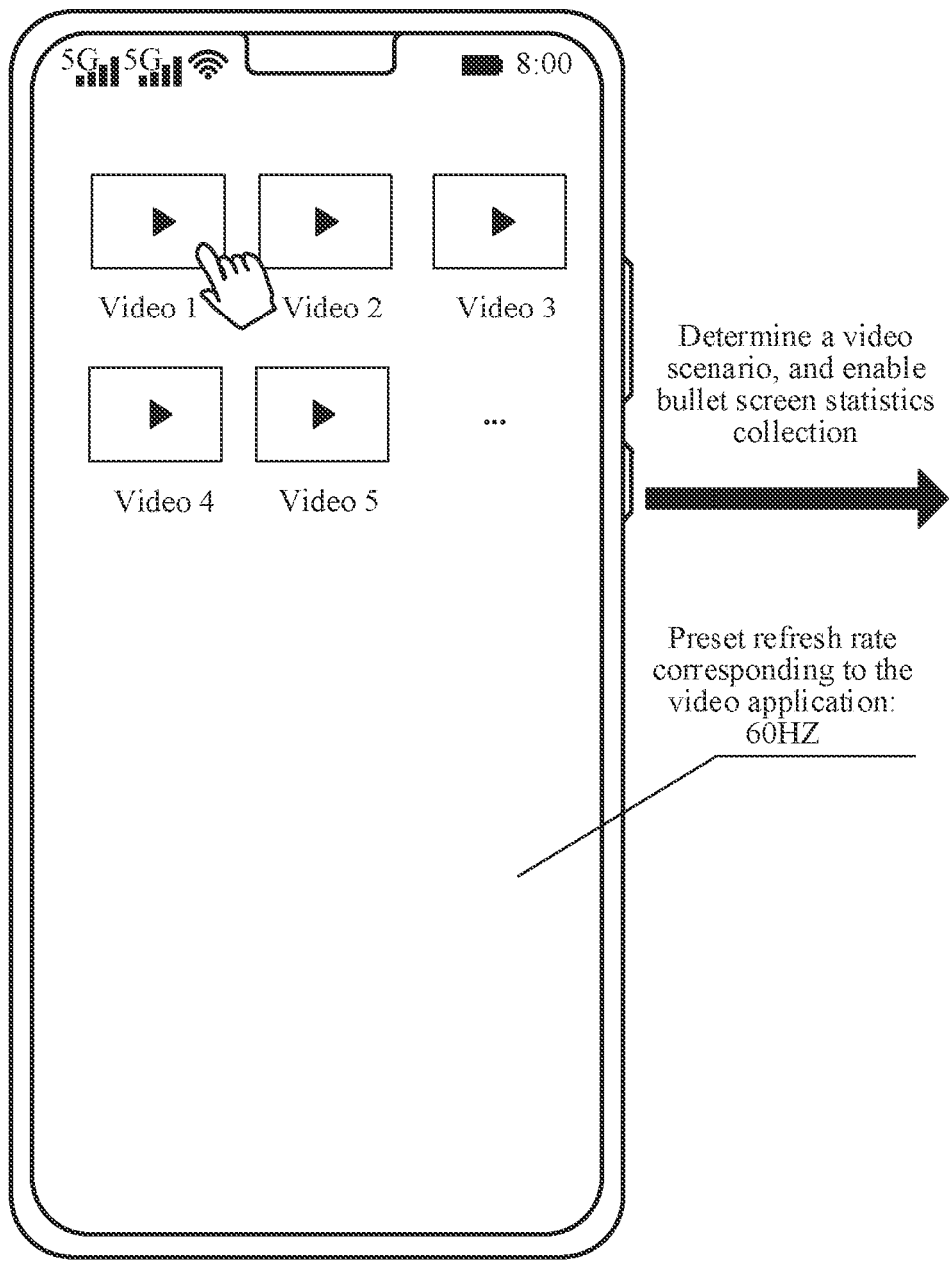
FIG. 4c-(1)

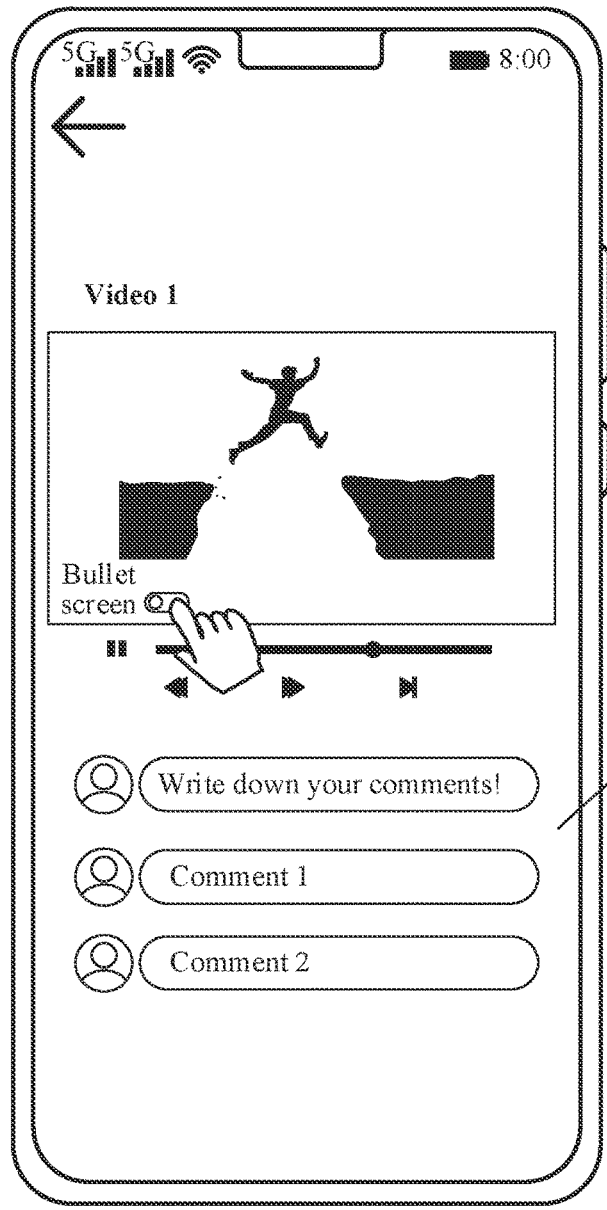
FIG. 4c-(2)

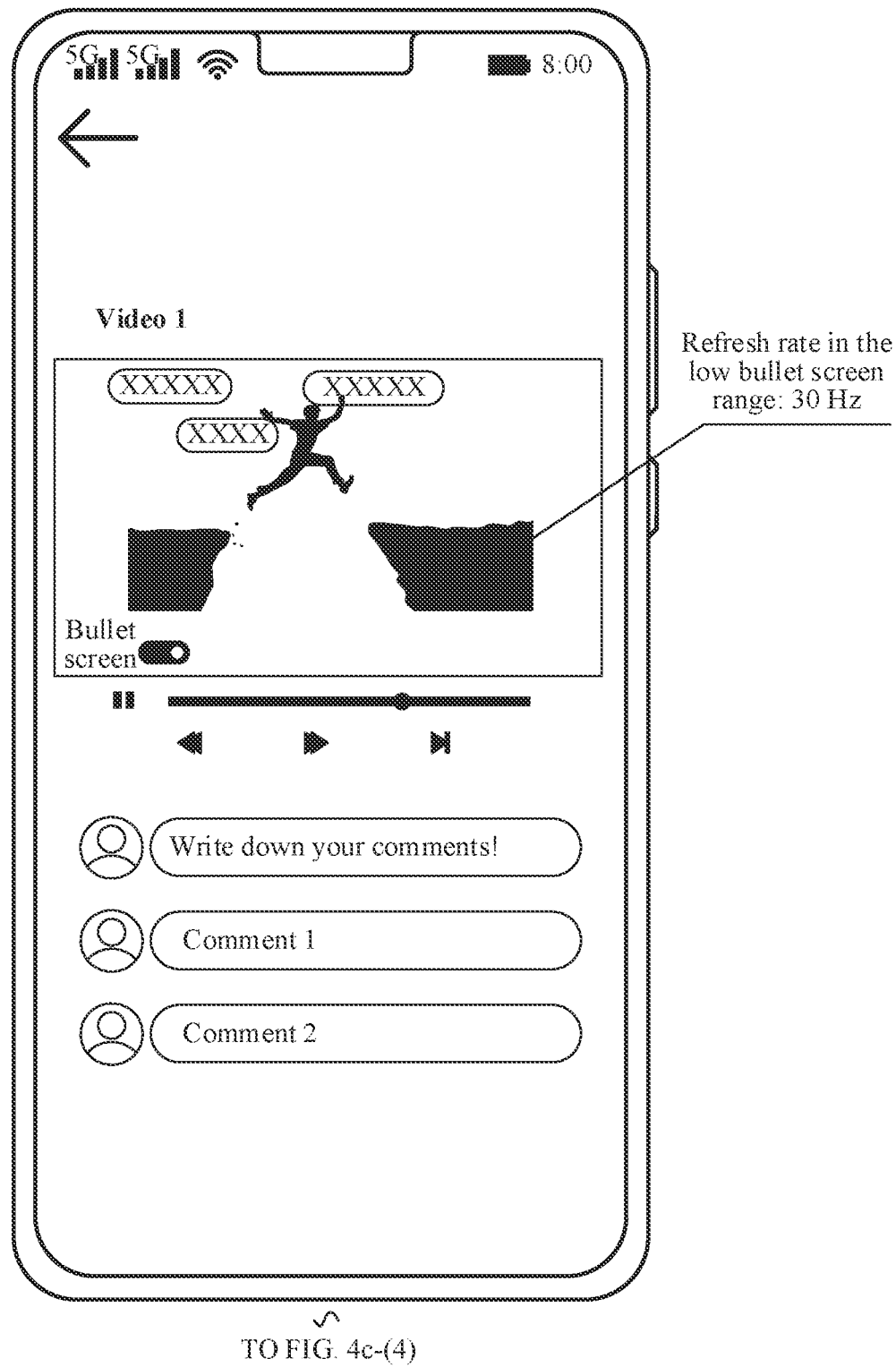
FIG. 4c-(3)

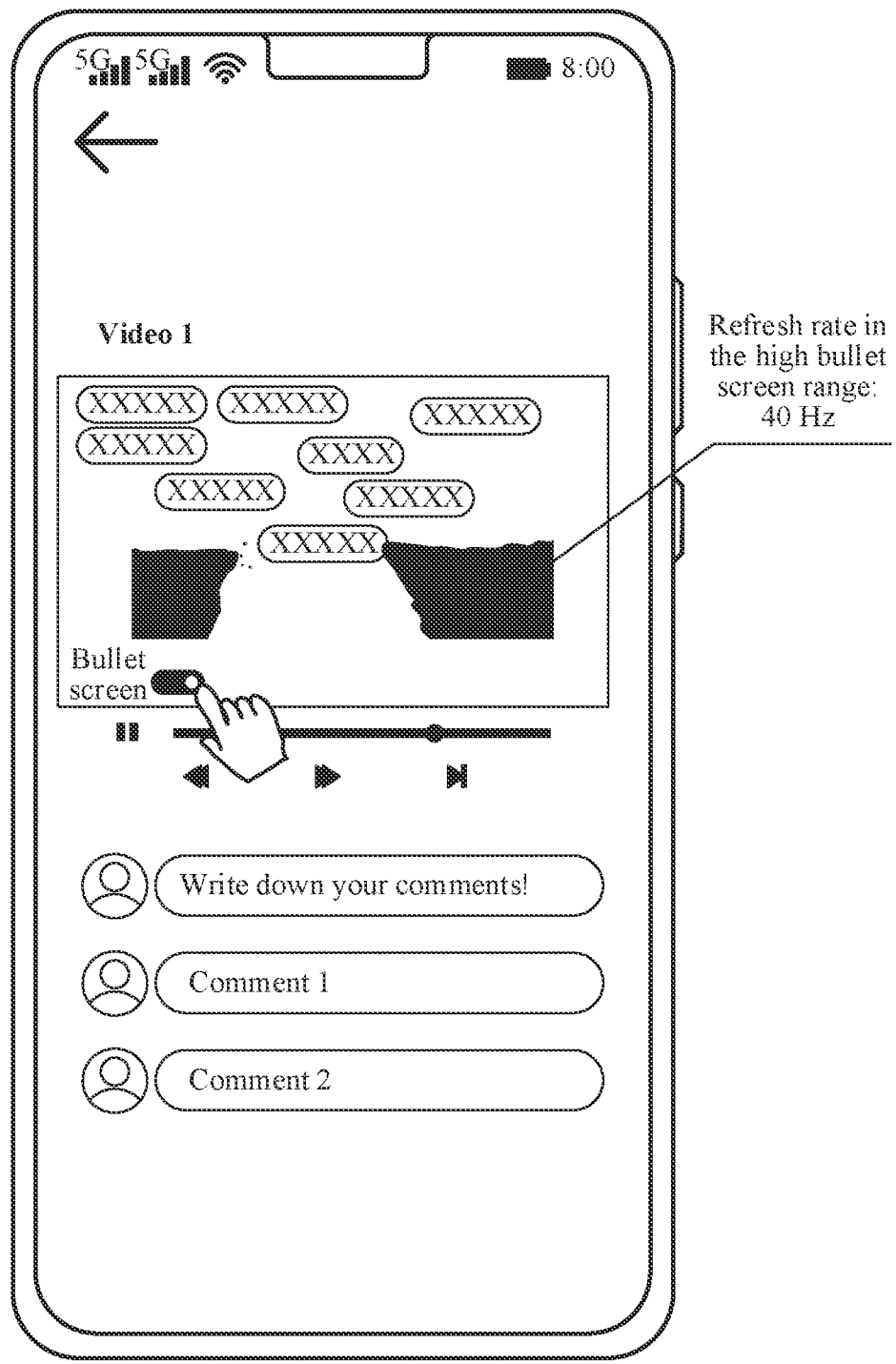
FIG. 4c-(4)

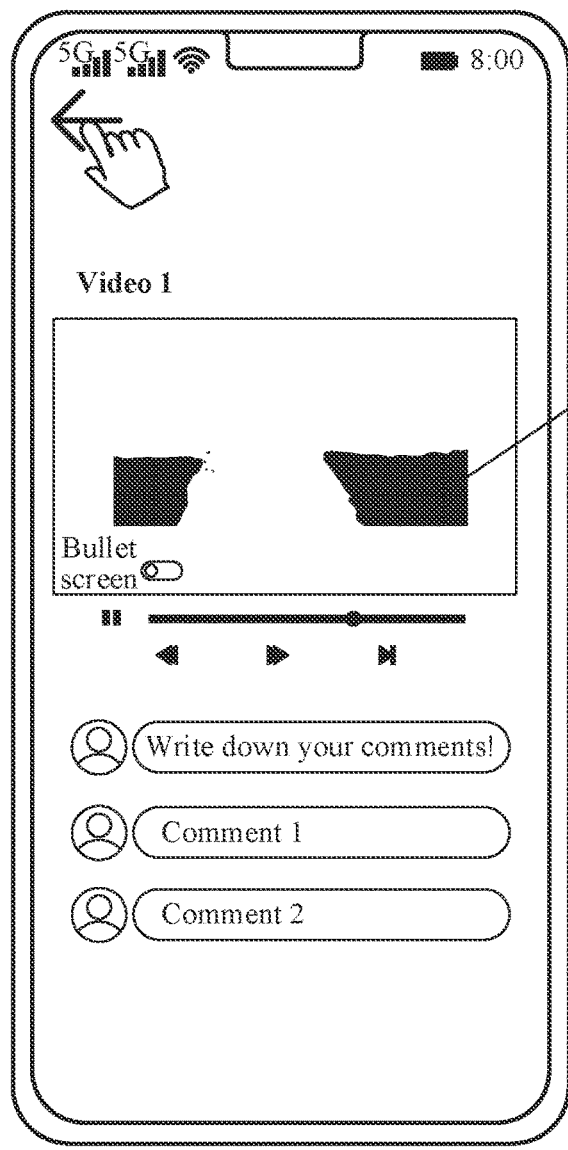
FIG. 4c-(5)

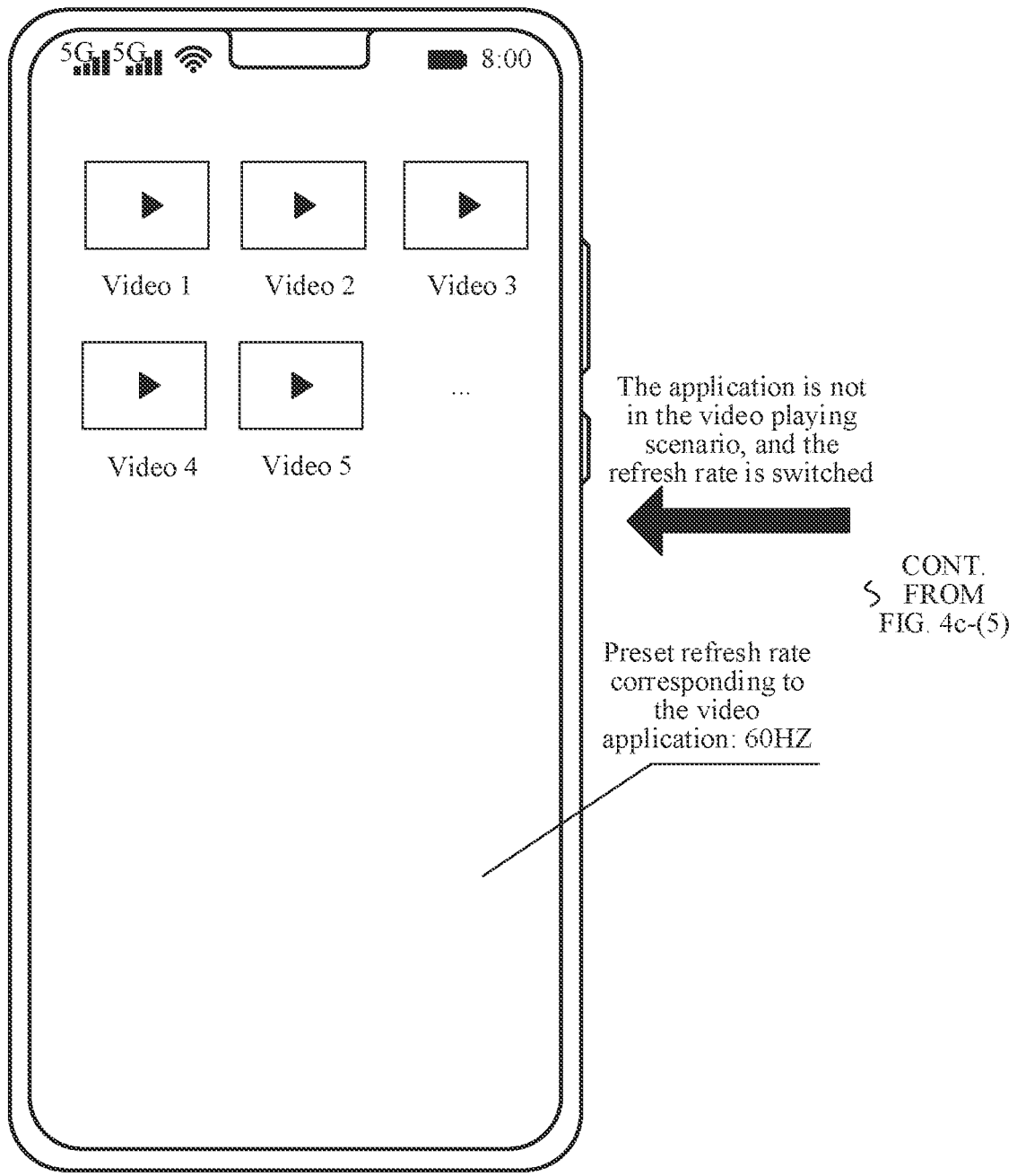
FIG. 4c-(6)

REFRESH RATE SETTING METHOD AND RELATED DEVICE

CROSS-REFERENCE TO RELATED APPLICATIONS

This application is a national stage of International Application No. PCT/CN2022/115417, filed on Aug. 29, 2022, which claims priority to Chinese Patent Application No. 202111545016.7, filed on Dec. 16, 2021. The disclosures of both of the aforementioned applications are hereby incorporated by reference in their entireties.

TECHNICAL FIELD

This application relates to the field of display technologies, and in particular, to a refresh rate setting method and a related device.

BACKGROUND

The refresh rate is the number of times per second that a picture on a screen is refreshed. With the development of display technologies, electronic devices such as mobile phones and tablet computers can support continuously increasing refresh rates. Currently, to enable a picture to be displayed fluently, an electronic device usually refreshes and displays the picture at a fixed high refresh rate, for example, refreshes and displays the picture at a fixed refresh rate of 60 Hz, 90 Hz, or 120 Hz.

However, in a video playing scenario of the electronic device, a required refresh rate is usually low. As a result, when the electronic device plays a video, an actual refresh rate is higher than the required refresh rate. Consequently, the processor is overloaded, and the electricity of the system is wasted.

SUMMARY

This application provides a refresh rate setting method and a related device, aiming to meet a requirement for a refresh rate in a video playing process.

To achieve the foregoing objective, this application provides the following technical solutions:

According to a first aspect, an embodiment of this application discloses a refresh rate setting method, applicable to an electronic device, where an application is installed in the electronic device, and the method includes: refreshing and displaying the application interface of the application at the first refresh rate in response to receiving an operation of launching the application by a user: displaying a video picture at the first refresh rate in response to receiving an operation of playing a video by the user: determining, in a process of displaying the video picture, whether to perform bullet screen drawing in a preset duration: collecting statistics on bullet screen data of each frame of displayed picture of the video in a case that bullet screen drawing is performed in the preset duration, and then refreshing and displaying the application interface of the application at a second refresh rate according to the bullet screen data of the each frame of displayed picture; and refreshing and displaying the application interface of the application at a third refresh rate in a case that bullet screen drawing is not performed in the preset duration, where the third refresh rate is different from the second refresh rate.

In this embodiment of this application, in the process of displaying the video picture, whether to perform bullet screen drawing in the preset duration is determined in real time: in a case that bullet screen drawing is performed in the preset duration, it may be determined that the application enters a bullet screen scenario, and therefore statistics is collected on the bullet screen data of the each frame of displayed picture of the video; and then the application interface of the application is refreshed and displayed at a second refresh rate according to the bullet screen data of the each frame of displayed picture, so as to refresh the interface according to the bullet screen data at a refresh rate meeting a display requirement in the bullet screen scenario. In a case that bullet screen drawing is not performed in the preset duration, it may be considered that the application enters a video playing scenario, and then the application interface of the application is refreshed and displayed at the third refresh rate, so as to meet a display requirement in the video playing scenario.

In a possible implementation, the refreshing and displaying the application interface of the application at a second refresh rate according to the bullet screen data of the each frame of displayed picture includes: determining the second refresh rate according to the bullet screen data of the each frame of displayed picture; and refreshing and displaying the application interface of the application at the determined second refresh rate.

In another possible implementation, the determining the second refresh rate according to the bullet screen data of the each frame of displayed picture includes: determining a current bullet screen range according to the bullet screen data of the each frame of displayed picture on which statistics is currently collected, where the bullet screen range is used for indicating an order-of-magnitude of a bullet screen density on the displayed picture; and determining the second refresh rate according to the current bullet screen range, where the second refresh rate is a preset refresh rate corresponding to the current bullet screen range; and in a case that the order-of-magnitude of the bullet screen density indicated by the bullet screen range is larger, the determined second refresh rate is larger.

In another possible implementation, the bullet screen data of the frame of displayed picture includes: the number of bullet screens drawn in the frame of displayed picture and/or the number of characters of bullet screens drawn in the frame of displayed picture.

In another possible implementation, the determining a current bullet screen range according to the bullet screen data of the each frame of displayed picture on which statistics is currently collected includes: performing, according to the number of bullet screens drawn in the each frame of displayed picture on which statistics is currently collected, a time stamp corresponding to the each frame of displayed picture, and a bullet screen aging time, calculation to obtain the total number of bullet screens displayed in a current frame of displayed picture; and determining the current bullet screen range according to the number of bullet screens drawn in the current frame of displayed picture and the total number of bullet screens displayed in the current frame of displayed picture.

In another possible implementation, the bullet screen range includes: a high bullet screen range or a low bullet screen range; and the determining the current bullet screen range according to the number of bullet screens drawn in the current frame of displayed picture and the total number of bullet screens displayed in the current frame of displayed picture includes: determining the current bullet screen range as the low bullet screen range in a case that the number of bullet screens drawn in the current frame of displayed picture is less than a first preset value and the total number of bullet screens displayed in the current frame of displayed picture is less than a second preset value; and determining the current bullet screen range as the high bullet screen range in a case that the number of bullet screens drawn in the current frame of displayed picture is greater than or equal to the second preset value or the total number of bullet screens displayed in the current frame of displayed picture is greater than or equal to the second preset value.

In another possible implementation, the collecting statistics on bullet screen data of each frame of displayed picture of the video includes: collecting statistics on bullet screen data of a particular region in the each frame of displayed picture of the video.

In another possible implementation, before the determining whether to perform bullet screen drawing in a preset duration, the method further includes: determining whether the application is in a video playing scenario according to view information of the application interface, where the video playing scenario is a scenario of playing a video; and the determining whether to perform bullet screen drawing in a preset duration includes: determining, in a case of determining that the application is in the video playing scenario, whether to perform bullet screen drawing in the preset duration.

In another possible implementation, before the determining whether to perform bullet screen drawing in a preset duration, the method further includes: determining whether to decode the video; and the determining, in a case of determining that the application is in the video playing scenario, whether to perform bullet screen drawing in the preset duration includes: determining, in a case of determining that the application is in the video playing scenario and determining to decode the video, whether to perform bullet screen drawing in the preset duration.

In another possible implementation, before the determining whether the application is in a video playing scenario according to view information of the application interface, the method further includes: determining whether the application is in a playing whitelist, where the playing whitelist is a list of applications having video playing permission; and the determining whether the application is in a video playing scenario according to view information of the application interface includes: determining, in a case of determining that the application is in the playing whitelist, whether the application is in the video playing scenario according to the view information of the application interface.

In another possible implementation, the determining whether the application is in a playing whitelist includes: determining whether the application is in the playing whitelist according to a package name of the application carried in the view information of the application interface, where the playing whitelist includes: a package name of each application having the video playing permission.

In another possible implementation, the determining whether the application is in a video playing scenario according to view information of the application interface includes: determining whether the view information of the application interface contains feature information of a surfaceview: determining, in a case that the view information of the application interface contains the feature information of the surfaceview; that the application is in the video playing scenario; and determining, in a case that the view information of the application interface does not contain the feature information of the surfaceview; that the application is not in the video playing scenario.

In another possible implementation, the feature information of the surfaceview is: a surfaceview Surface View field carried in a view name.

In another possible implementation, the third refresh rate is determined according to a video source frame rate of the video.

In another possible implementation, the method further includes: refreshing and displaying the application interface of the application at the first refresh rate in response to receiving an operation of exiting video playing by the user.

In another possible implementation, an operating system of the electronic device includes: the application and a surface flinger Surface Flinger; and the determining whether to perform bullet screen drawing in a preset duration includes: determining, by the Surface Flinger, whether bullet screen drawing information of a frame is received in the preset duration, where the bullet screen drawing information of the frame includes: the number of bullet screens drawn in a frame of displayed picture, a time stamp corresponding to the frame of displayed picture, and drawn and rendered bullet screen data in the frame of displayed picture.

In another possible implementation, the operating system of the electronic device further includes: a frame rate decision-making module: the bullet screen data of the frame of displayed picture includes: the number of bullet screens drawn in the frame of displayed picture; and the collecting statistics on bullet screen data of each frame of displayed picture of the video in a case that bullet screen drawing is performed in the preset duration includes: storing, by the Surface Flinger in a case that the bullet screen drawing information of the frame is received in the preset duration, the number of bullet screens drawn in the frame of displayed picture and the time stamp corresponding to the frame of displayed picture.

In another possible implementation, the operating system of the electronic device further includes: a frame rate decision-making module: the refreshing and displaying the application interface of the application at a second refresh rate according to the bullet screen data of the each frame of displayed picture includes: determining, by the Surface Flinger, the current bullet screen range according to the number of bullet screens drawn in the each frame of displayed picture, the time stamp corresponding to the each frame of displayed picture, and the bullet screen aging time that are stored: sending, by the Surface Flinger, current bullet screen range information to the frame rate decision-making module, where the bullet screen range information includes: the current bullet screen range: determining, by the frame rate decision-making module, the second refresh rate according to the bullet screen range information: sending, by the frame rate decision-making module, the determined second refresh rate to the Surface Flinge; and controlling, by the Surface Flinge at the second refresh rate, a display screen of the electronic device to refresh and display the application interface of the application.

In another possible implementation, the sending, by the Surface Flinger, current bullet screen range information to the frame rate decision-making module includes: sending, by the Surface Flinger in a case of determining that the current bullet screen range does not change, the current bullet screen range information to the frame rate decision-making module.

In another possible implementation, the operating system of the electronic device further includes: a drawing and rendering module: the drawing and rendering module includes a bullet screen counter; and in a case that the Surface Flinger receives bullet screen drawing information of a frame in the preset duration, before the Surface Flinger receives the bullet screen drawing information of the frame in the preset duration, the method further includes: determining, by the Surface Flinger, to enable bullet screen statistics collection: invoking, by the application with a rhythm of a Vsync signal, the drawing and rendering module to draw bullet screens: determining, by the drawing and rendering module, whether bullet screen statistics collection is enabled: controlling, by the drawing and rendering module in a case of determining that bullet screen statistics collection is enabled, the bullet screen counter to count the drawn bullet screens; and sending, by the drawing and rendering module, bullet screen drawing information of a current frame to the Surface Flinger with the rhythm of the Vsync signal.

In another possible implementation, the operating system of the electronic device further includes: a frame rate decision-making module: the refreshing and displaying the application interface of the application at a third refresh rate in a case that bullet screen drawing is not performed in the preset duration includes: sending, by the Surface Flinger in a case that no bullet screen drawing information is received in the preset duration, video playing scenario information to the frame rate decision-making module, where the video playing scenario is a scenario of playing a video; and determining, by the frame rate decision-making module, the third refresh rate according to the video playing scenario information and the video source frame rate: sending, by the frame rate decision-making module, the determined third refresh rate to the Surface Flinge; and controlling, by the Surface Flinge at the third refresh rate, the display screen of the electronic device to refresh and display the application interface of the application.

In another possible implementation, the operating system of the electronic device further includes: a media codec Media Codec; and after the responding to receiving an operation of playing a video by the user, the method further includes: invoking, by the application, the Media Codec to decode the video; and sending, by the Media Codec, the video source frame rate of the video to the frame rate decision-making module.

In another possible implementation, an operating system of the electronic device includes: a Surface Flinge; and the determining whether the application is in a video playing scenario according to view information of the application interface includes: determining, by the Surface Flinge, whether a view name in the view information of the application interface carries a SurfaceView field: determining, by the Surface Flinge in a case of determining that the view name carries the SurfaceView field, that the application is in the video playing scenario; and determining, by the Surface Flinge in a case of determining that the view name does not carry the SurfaceView field, that the application is not in the video playing scenario.

In another possible implementation, an operating system of the electronic device includes: the application, the Surface Flinge, and the drawing and rendering module; and the displaying a video picture at the first refresh rate includes: triggering, by the Surface Flinger with a rhythm of a Vsync signal corresponding to the first refresh rate, the application to draw and render a view of a video playing interface, where the video playing interface is an application interface used for displaying a video picture: invoking, by the application with the rhythm of the Vsync signal corresponding to the first refresh rate, the drawing and rendering module to draw and render the view of the video playing interface: sending, by the drawing and rendering module with the rhythm of the Vsync signal corresponding to the first refresh rate, drawn and rendered image data of the video playing interface to the Surface Flinge; performing, by the Surface Flinge with the rhythm of the Vsync signal corresponding to the first refresh rate, view composition with the drawn and rendered image data of the video playing interface; and outputting, by the Surface Flinge with the rhythm of the Vsync signal corresponding to the first refresh rate, the composed image data of the video playing interface to the display screen for display.

In another possible implementation, the operating system of the electronic device further includes: an AMS and a window manager service WMS; and before the triggering, by the Surface Flinge with a rhythm of a Vsync signal corresponding to the first refresh rate, the application to draw and render a view of a video playing interface, the method further includes:

sending, by the application, a request of launching a video playing Activity to the AMS, where the request of launching a video playing Activity carries the package name of the application and a video playing interface name: launching, by the AMS, a video playing Activity according to the package name of the application and the video playing interface name: sending, by the AMS, window information corresponding to the video playing interface to the WMS: creating, by the WMS, a window of the video playing interface according to the window information corresponding to the video playing interface: sending, by the WMS, view information of the video playing interface to the Surface Flinge, where the view information carries the package name of the application; and the view information of the video playing interface corresponds to the window of the video playing interface; and creating, by the Surface Flinge, the view of the video playing interface according to the view information of the video playing interface.

In another possible implementation, an operating system of the electronic device includes: the application, a Surface Flinge, and a Media Codec; and the determining whether to decode the video includes: determining, by the Surface Flinge in a case that information about being invoked is received, that the application invokes the Media Codec to decode the video, where the information about being invoked is used for indicating that the Media Codec is invoked; and determining, by the Surface Flinge in a case that the information about being invoked is not received, that the application does not invoke the Media Codec to decode the video.

In another possible implementation, in a case that the Surface Flinge receives the information about being invoked, before the Surface Flinge receives the information about being invoked, the method further includes: invoking, by the application, the Media Codec to decode the video; and sending, by the Media Codec, the information about being invoked to the Surface Flinge.

In another possible implementation, before the invoking, by the application, the Media Codec to decode the video, the method further includes: sending, by the WMS, window creation completed information of the video playing interface to the application.

In another possible implementation, the determining whether the application is in a playing whitelist includes: determining, by the Surface Flinge, whether the application is in the playing whitelist according to a package name of the application carried in the view information of the application interface, where the playing whitelist includes: a package name of each application having the video playing permission.

In another possible implementation, an operating system of the electronic device includes: the application, a Surface Flinge, a frame rate decision-making module, and a drawing and rendering module; and the refreshing and displaying the application interface of the application at the first refresh rate includes: triggering, by the Surface Flinge with a rhythm of a Vsync signal corresponding to the first refresh rate, the application to draw and render a view of an application home screen, where the application home screen is an application interface displayed after the application is launched: invoking, by the application with the rhythm of the Vsync signal corresponding to the first refresh rate, the drawing and rendering module to draw and render the view of the application home screen: sending, by the drawing and rendering module with the rhythm of the Vsync signal corresponding to the first refresh rate, drawn and rendered image data of the application home screen to the Surface Flinge: performing, by the Surface Flinge with the rhythm of the Vsync signal corresponding to the first refresh rate, view composition with the drawn and rendered image data of the application home screen; and outputting, by the Surface Flinge with the rhythm of the Vsync signal corresponding to the first refresh rate, the composed image data of the application home screen to the display screen for display.

In another possible implementation, the operating system of the electronic device further includes: a launcher Launcher, an AMS, and a WMS; and before the triggering, by the Surface Flinge with a rhythm of a Vsync signal corresponding to the first refresh rate, the application to draw and render a view of an application home screen, the method further includes: sending, by the Launcher, a request of launching an application Activity to the AMS, where the request of launching an application Activity carries a package name of the application: launching, by the AMS, an application Activity: sending, by the AMS, window information corresponding to the application home screen to the WMS, where the window information carries the package name of the application: creating, by the WMS, a window of the application home screen according to the window information corresponding to the application home screen, and sending the package name of the application to the frame rate decision-making module: sending, by the WMS, view information of the application home screen to the Surface Flinge, where the view information of the application home screen corresponds to the window of the application home screen: determining, by the frame rate decision-making module, the first refresh rate according to the package name of the application, where the first refresh rate is a preset refresh rate corresponding to the application; and creating, by the Surface Flinge, the view of the application home screen according to the view information of the application home screen.

According to a second aspect, this application discloses an electronic device, including: one or more processors, a memory, and a display screen. The memory and the display screen are respectively coupled to the one or more processors. The display screen is configured to display an application interface. The memory is configured to store a computer program code, the computer program code includes computer instructions, and the computer instructions, when executed by the one or more processors, cause the electronic device to perform the refresh rate setting method according to any item of the foregoing first aspect.

It should be understood that descriptions of technical features, technical solutions, beneficial effects or similar languages in this application do not imply that all features and advantages can be achieved in any single embodiment. On the contrary, it may be understood that descriptions of features or beneficial effects mean that a particular technical feature, technical solution, or beneficial effect is included in at least one embodiment. Therefore, descriptions of the technical features, technical solutions, or beneficial effects in this specification do not necessarily refer to a same embodiment. Further, the technical features, technical solutions, and beneficial effects described in the embodiments may be combined in any suitable manner. A person skilled in the art understands that the embodiments can be implemented without one or more particular technical features, technical solutions, or beneficial effects of a particular embodiment. In other embodiments, additional technical features and beneficial effects may be further identified in a particular embodiment that does not embody all embodiments.

BRIEF DESCRIPTION OF DRAWINGS

FIG. 4a-1 and FIG. 4a-2 are a flowchart of a refresh rate setting method at an application launching stage according to an embodiment of this application;

FIG. 4b-1, FIG. 4b-2, FIG. 4b-3, and FIG. 4b-4 are a flowchart of a refresh rate setting method at a video playing stage according to an embodiment of this application;

FIG. 4c-(1), FIG. 4c-(2), FIG. 4c-(3), FIG. 4c-(4), FIG. 4c-(5), and FIG. 4c-(6) are a schematic diagram 2 of a video playing scenario of a video application according to an embodiment of this application;

FIG. 4e-1, FIG. 4e-2, FIG. 4e-3, and FIG. 4e-4 are a flowchart of another refresh rate setting method at a video playing stage according to an embodiment of this application.

DESCRIPTION OF EMBODIMENTS

The following clearly and completely describes technical solutions in embodiments of the present application with reference to the accompanying drawings in the embodiments of the present application. Terms used in the following embodiments are only intended to describe particular embodiments, and are not intended to limit this application. As used in this specification and the claims of this application, a singular expression form, "one", "a", "the", "foregoing", "said", or "this", is intended to also include "one or more" expression form, unless clearly indicated to the contrary in the context. It should be further understood that, in the embodiments of this application, "one or more" refers to one, two, or more than two: "and/or" describes an association relationship between associated objects and represents that three relationships may exist. For example, A and/or B may represent: only A exists, both A and B exist, and only B exists, where A and B may be singular or plural.

The character "/" generally indicates an "or" relationship between the associated objects.

The reference to "one embodiment" or "some embodiments" described in this specification means that a specific characteristic, structure or feature described in combination with this embodiment is included in one or more embodiments of this application. Therefore, the statements "in one embodiment", "in some embodiments", "in some other embodiments", "in other embodiments", and the like in the differences in this specification do not necessarily refer to the same embodiment, but mean that "one or more but not all embodiments", unless otherwise specially emphasized in other ways. The terms "include", "contain", "have" and their variations mean "including but not limited to", unless otherwise specially emphasized in other ways.

A plurality of involved in the embodiments of this application refers to two or more. It should be noted that, in descriptions of the embodiments of this application, terms such as "first" and "second" are merely used for distinguishing descriptions, and cannot be understood as an indication or implication of relative importance, or an indication or implication of a sequence.

For a clear and concise description of the following embodiments, brief introductions of a refresh rate setting solution are presented first:

Using such an electronic device as a mobile phone as an example, applications of the mobile phone may be provided with preset refresh rates corresponding to the applications, and preset refresh rates corresponding to different applications may be the same or different. After a user clicks and launches an application, the mobile phone may refresh a screen with a preset refresh rate corresponding to the application in an application running process.

Figure 1A:
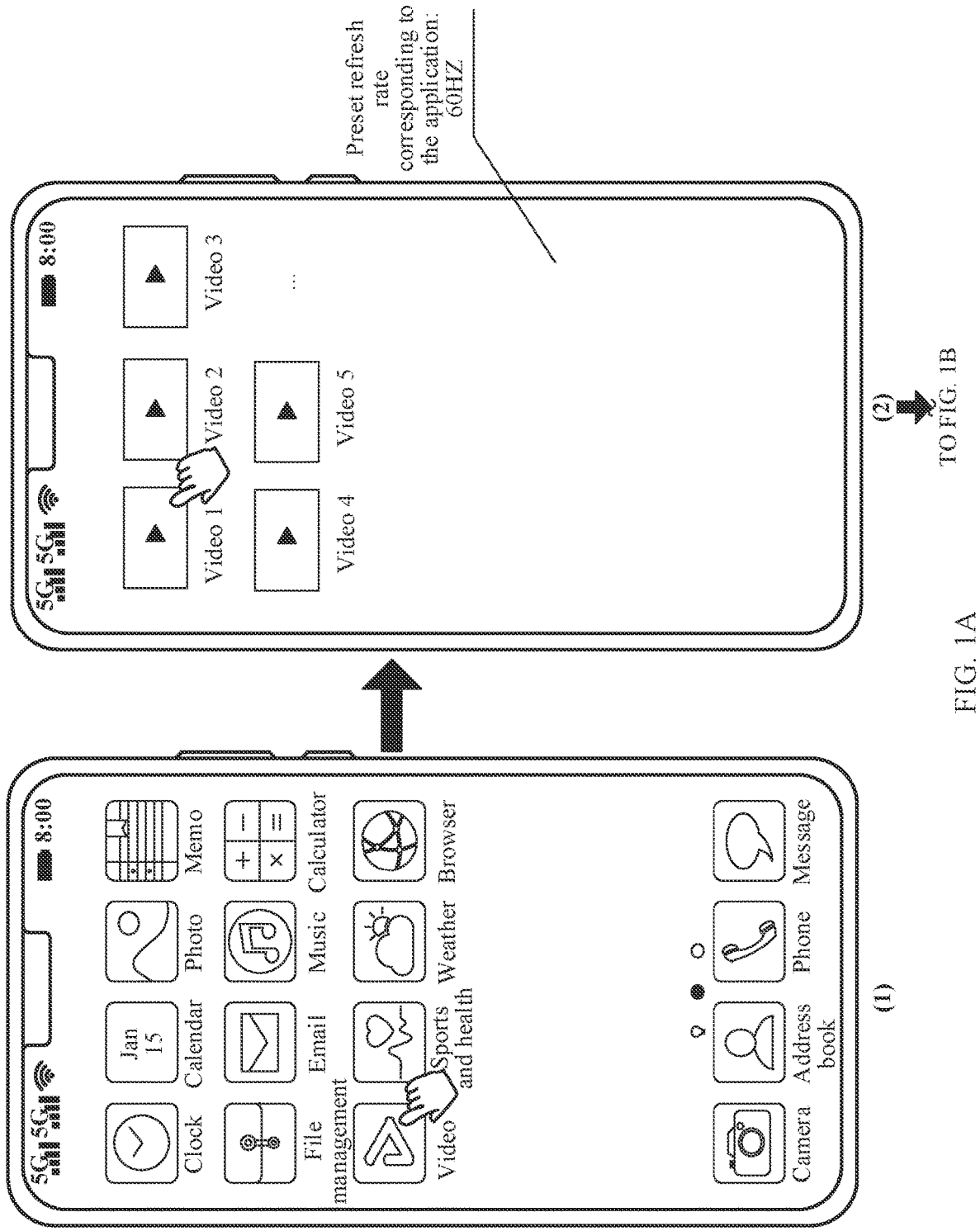
FIG. 1A and FIG. 1B are a schematic diagram 1 of a video playing scenario of a video application according to an embodiment of this application.
Figure 1B:
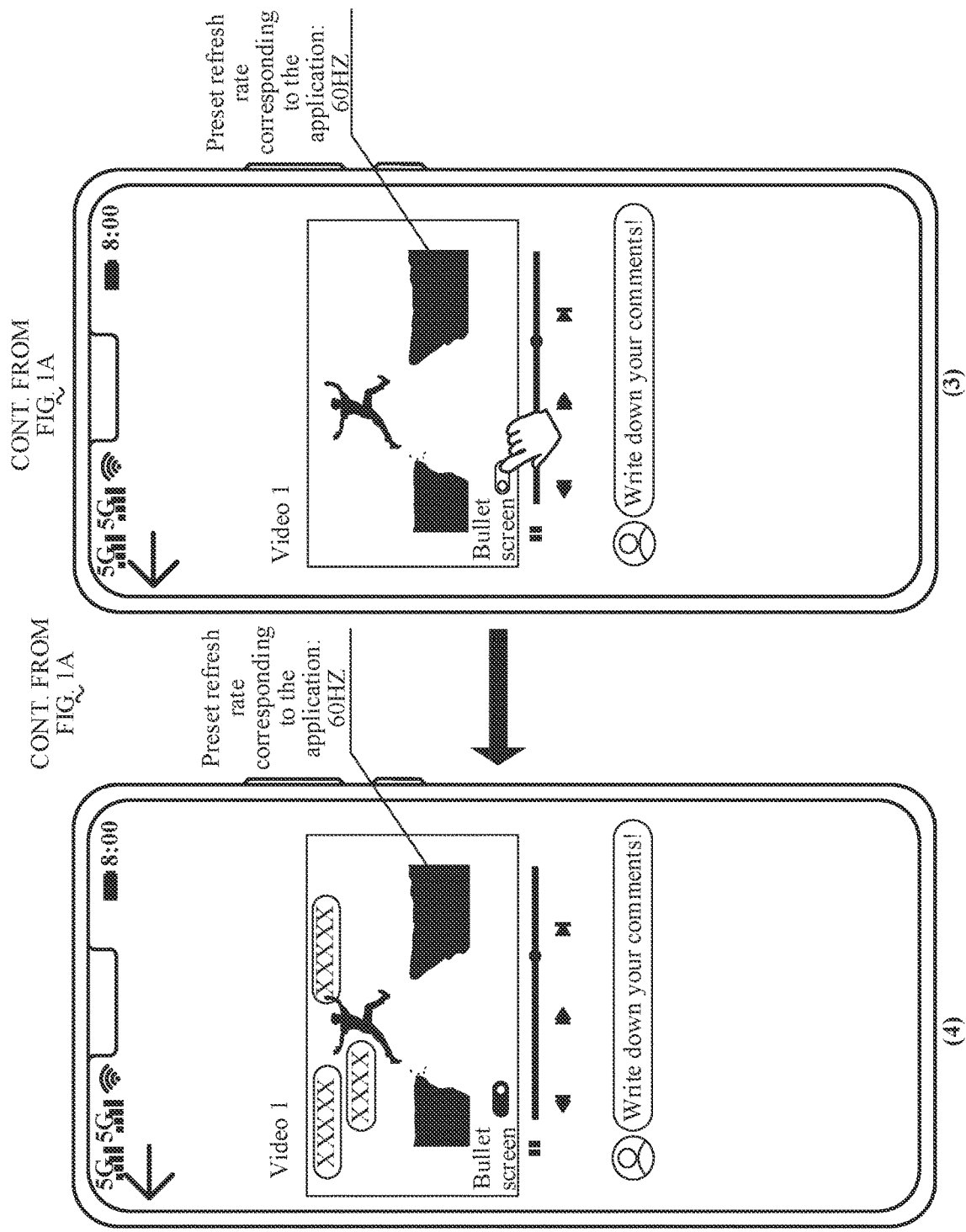

Specifically, for example, as shown in (1) in FIG. 1A and FIG. 1B, clock, calendar, photo, memo, file management, email, music, calculator, video, sports and health, weather, and browser applications are display on a home screen of a mobile phone. A user clicks an icon of the video application, and the interface of the mobile phone is changed into (2) in FIG. 1A and FIG. 1B. As shown in (2) in FIG. 1A and FIG. 1B, playable videos such as a video 1, a video 2, a video 3, a video 4, and a video 5 are presented on an application home screen. In this case, the application is launched, the mobile phone performs refreshing at a preset refresh rate 60 Hz corresponding to the application. The user clicks the video 1 on the application home screen to perform playing, and the interface of the mobile phone is changed into (3) in FIG. 1A and FIG. 1B. (3) in FIG. 1A and FIG. 1B displays a playing interface of the video 1. For the video 1, in this case, a bullet screen switch is in a disabled state. In a playing process of the video 1 shown in (3) in FIG. 1A and FIG. 1B, a video picture is still refreshed at a refresh rate of 60 Hz. The user clicks to enable bullet screens, and the picture of the mobile phone is changed into (4) in FIG. 1A and FIG. 1B. In this case, the bullet screen switch is in an enabled state, bullet screens are rolling in the video picture, and the video picture is still refreshed and displayed at 60 Hz.

However, in a video playing scenario of the application, it is difficult for the preset refresh rate corresponding to the application to meet a requirement for a refresh rate in a video playing process. For example, when the video 1 played in (3) in FIG. 1A and FIG. 1B is a movie, a requirement for fluently displaying pictures can be met only in need of a refresh rate of 24 Hz. However, when video pictures are refreshed at a refresh rate of 60 Hz, the processor is overloaded and power consumption is high, which does not meet a requirement of the mobile phone for low power consumption. In another example, for a scenario of playing a video and enabling bullet screens shown in (4) in FIG. 1A and FIG. 1B, because it is further necessary to dynamically display rolling bullet screens on a picture, a requirement for a refresh rate is higher than that in the scenario of not enabling bullet screens shown in (3) in FIG. 1A and FIG. 1B. If the refresh rate is excessively low; the bullet screen rolling picture is likely to be stalled.

It can be known from the foregoing descriptions: (1) If the preset refresh rate corresponding to the application is higher than an actually required refresh rate in the video playing scenario, it is likely that the processor is overloaded and power consumption is high, which does not meet a requirement of the mobile phone for low power consumption. (2) The preset refresh rate corresponding to the application is fixed, but a requirement for a refresh rate in the video playing scenario is dynamically changed, and consequently the preset refresh rate corresponding to the application cannot adapt to different requirements for a refresh rate in the video playing scenario.

Based on the problems existing in the foregoing technical solution, the embodiments of this application propose a refresh rate setting method, so as to meet requirements of an application for a refresh rate in different video playing scenarios.

The refresh rate setting method proposed in the embodiments of this application may be applied to an electronic device such as a mobile phone, a tablet computer, a notebook computer, an ultra-mobile personal computer (UMPC), a handheld computer, a netbook, a personal digital assistant (PDA), a wearable electronic device, a smartwatch, and the like. A video application is installed in the electronic device. Each video application mentioned in the embodiments of this application refers to an application having a video playing function.

Figure 2:
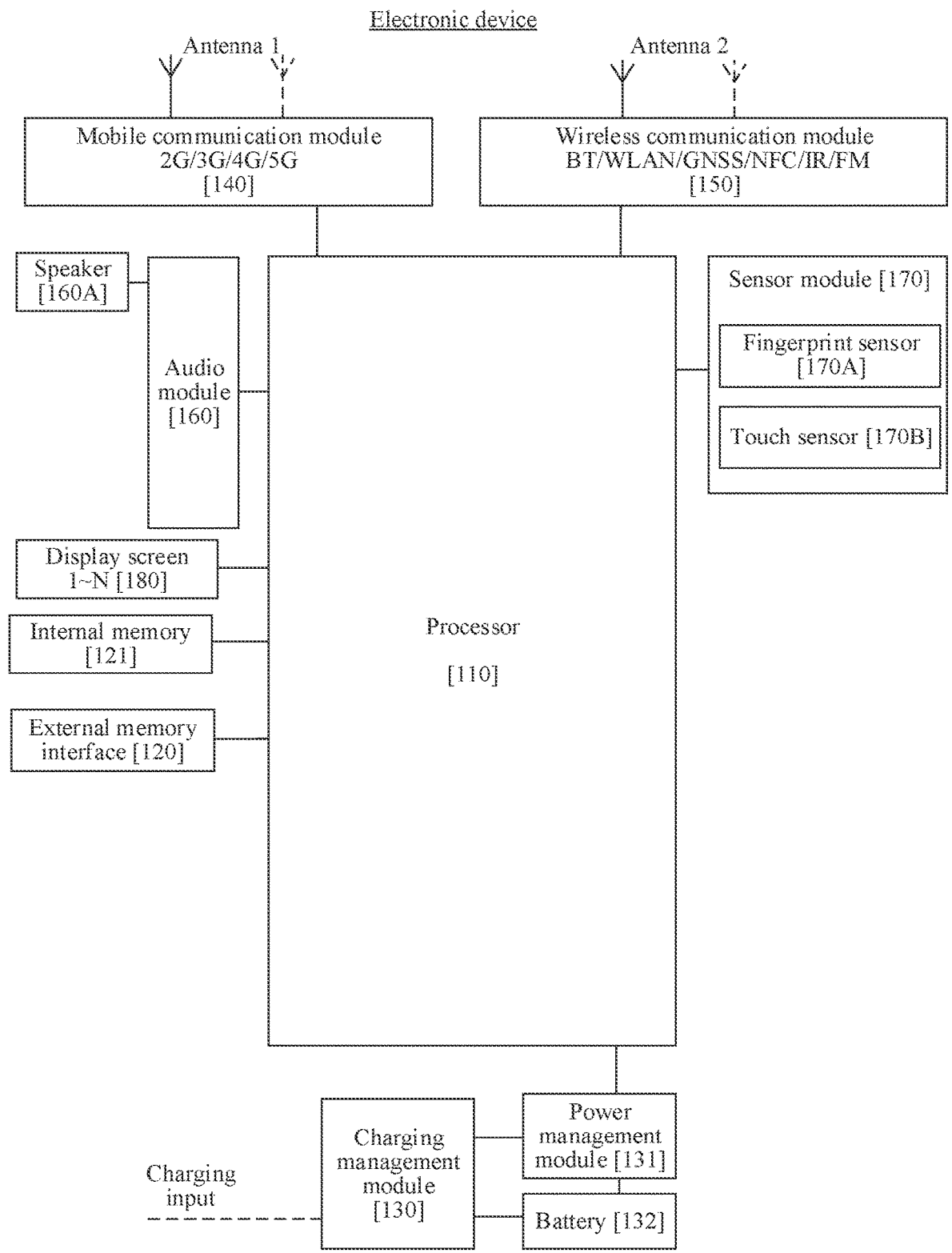
FIG. 2 is a diagram of a hardware structure of an electronic device according to an embodiment of this application.

As shown in FIG. 2, the electronic device proposed in the embodiments of this application may include a processor 110, an external memory interface 120, an internal memory 121, a charging management module 130, a power management module 131, a battery 132, an antenna 1, an antenna 2, a mobile communication module 140, a wireless communication module 150, an audio module 160, a speaker 160A, a sensor module 170, a display screen 180, and the like. The sensor module 170 may include a fingerprint sensor 170A, a touch sensor 170B, and the like.

It can be understood that a schematic structure in this embodiment does not constitute a specific limitation on the electronic device. In some other embodiments, the electronic device may include more or fewer components than those shown in the figure, or some components may be combined, or some components may be split, or a different component deployment may be used. The components in the portrait may be implemented by hardware, software, or a combination of software and hardware.

The processor 110 may include one or more processing units. For example, the processor 110 may include an application processor (AP), a modem processor, a graphics processing unit (GPU), an image signal processor (ISP), and a video codec. Different processing units may be independent components, or may be integrated into one or more processors. For example, in this application, the processor 110 may be configured to perform any refresh rate setting method proposed in the embodiments of this application. For example, the GPU included in the processor 110 may be configured to display, on the display screen 180, an image and a bullet screen involved in any refresh rate setting method proposed in the embodiments of this application.

For details, reference may be made to the following related content of such parts as FIG. 4a-1 and FIG. 4a-2, FIG. 4b-1, FIG. 4b-2, FIG. 4b-3, and FIG. 4b-4, and FIG. 4e-1, FIG. 4e-2, FIG. 4e-3, and FIG. 4e-4, and details are not described herein again.

A memory may be further disposed in the processor 110, and is configured to store instructions and data.

In some embodiments, the processor 110 may include one or more interfaces. The interfaces may include a mobile industry processor interface (MIPI) and the like.

The MIPI interface may be configured to connect the processor 110 to peripheral devices such as the display screen 180. The MIPI interface includes a display serial interface (DSI) and the like. In some embodiments, the processor 110 communicates with the display screen 180 by using a DSI interface, to implement a display function of the electronic device. For example, in this embodiment of this application, the processor 110 communicates with the display screen 180 by using a DSI interface, to display, on the display screen 180, an image and a bullet screen involved in any refresh rate setting method proposed in the embodiments of this application.

It may be understood that a schematic interface connection relationship between the modules in this embodiment is merely an example for description, and constitutes no limitation on the structure of the electronic device. In some other embodiments of this application, the electronic device may also adopt an interface connection manner different from that in the foregoing embodiment, or adopt a combination of a plurality of interface connection manners.

The charging management module 130 is configured to receive a charging input from a charger. The charger may be a wireless charger or may be a wired charger.

The power management module 131 is configured to connect to the battery 132, the charging management module 130, and the processor 110. The power management module 131 receives an input of the battery 132 and/or the charging management module 130, to supply power to the processor 110, the internal memory 121, the display screen 180, and the like.

A wireless communication function of the electronic device may be implemented by using the antenna 1, the antenna 2, the mobile communication module 140, the wireless communication module 150, the modem processor, the baseband processor, and the like.

The antenna 1 and the antenna 2 are configured to transmit and receive electromagnetic wave signals.

The mobile communication module 140 may provide a solution to wireless communication such as 2G/3G/4G/5G applied to the electronic device.

The wireless communication module 150 may provide a solution for wireless communication to be applied to the electronic device, including a wireless local area network (WLAN) (such as a wireless fidelity (Wi-Fi) network), Bluetooth (BT), and the like.

In some embodiments, in the electronic device, the antenna 1 is coupled to the mobile communication module 140, and the antenna 2 is coupled to the wireless communication module 150, so that the electronic device may communicate with a network and another device by using a wireless communication technology.

The electronic device implements a display function by using the GPU, the display screen 180, the application processor, and the like. The GPU is a microprocessor for image processing, and is connected to the display screen 180 and the application processor. The GPU is configured to perform mathematical and geometric calculation, and is configured to render an image. The processor 110 may include one or more GPUs, and execute program instructions to generate or change display information. For example, in this embodiment of this application, the GPU may be configured to display, on the display screen 180, an image and a bullet screen involved in any refresh rate setting method proposed in the embodiments of this application. For details, reference may be made to the following related content of such parts as FIG. 4a-1 and FIG. 4a-2, FIG. 4b-1, FIG. 4b-2, FIG. 4b-3, and FIG. 4b-4, and FIG. 4e-1, FIG. 4e-2, FIG. 4e-3, and FIG. 4e-4, and details are not described herein again.

The display screen 180 is configured to display an image, a video, and the like. The display screen 180 may include a display panel. The display panel may be a liquid crystal display (LCD), an organic light-emitting diode (OLED), an active-matrix organic light-emitting diode (AMOLED), or the like. In some embodiments, the electronic device may include one or N display screens 180, and N is a positive integer greater than 1.

A series of graphical user interfaces (GUIs) may be displayed on the display screen 180 of the electronic device, and these GUIs are home screens of the electronic device. For example, in this embodiment of this application, the display screen 180 may be configured to display an image and a bullet screen involved in any refresh rate setting method proposed in the embodiments of this application. For details, reference may be made. For details, reference may be made to the following related content of such parts as FIG. 4a-1 and FIG. 4a-2, FIG. 4b-1, FIG. 4b-2, FIG. 4b-3, and FIG. 4b-4, and FIG. 4e-1, FIG. 4e-2, FIG. 4e-3, and FIG. 4e-4, and details are not described herein again.

The video codec is configured to compress or decompress a digital video. The electronic device may support one or more video codecs. In this way, the electronic device may play or record videos in a plurality of encoding formats, for example, moving picture experts group (MPEG) 1, MPEG 2, MPEG 3, and MPEG 4. For example, in this embodiment of this application, the video codec may be configured to decode a video played by a video application involved in any refresh rate setting method proposed in the embodiments of this application. For details, reference may be made to the related content of S4206 of such a part as FIG. 4b-1, FIG. 4b-2, FIG. 4b-3, and FIGS. 4b-4 and S4306 of such a part as FIG. 4e-1, FIG. 4e-2, FIG. 4e-3, and FIG. 4e-4, and details are not described herein again. In some other embodiments, the video codec may alternatively be software, and may be, for example, the following media codec shown in FIG. 3.

The external memory interface 120 may be configured to connect to an external storage card such as a micro SD card, to expand a storage capability of the electronic device.

The internal memory 121 may be configured to store computer executable program code, and the executable program code includes instructions. The processor 110 runs the instructions stored in the internal memory 121, to perform various function applications and data processing of the electronic device. For example, in this embodiment, the processor 110 may perform any refresh rate setting method mentioned in the embodiments of this application by executing instructions stored in the internal memory 121. For details, reference may be made to the following related content of such parts as FIG. 4a-1 and FIG. 4a-2, FIG. 4b-1, FIG. 4b-2, FIG. 4b-3, and FIG. 4b-4, and FIG. 4e-1, FIG. 4e-2, FIG. 4e-3, and FIG. 4e-4, and details are not described herein again.

The audio module 160 is configured to convert digital audio information into an analog audio signal output, and is further configured to convert an analog audio input into a digital audio signal.

The speaker 160A, also referred to as a "horn", is configured to convert an audio electrical signal into a sound signal.

The fingerprint sensor 170A is configured to collect a fingerprint. The electronic device may implement fingerprint-based unlock, application lock accessing, fingerprint-based photographing, fingerprint-based call answering, and the like by using a feature of the collected fingerprint.

The touch sensor 170B is also referred to as a "touch device". The touch sensor 170B may be arranged on the display screen 180. The touch sensor 170B and the display screen 180 form a touchscreen, which is also referred to as a "touch screen".

In addition, an operating system runs on the foregoing components, for example, an iOS operating system, an Android open-source operating system, or a Windows operating system. An application may be installed and run on the operating system.

Figure 3:
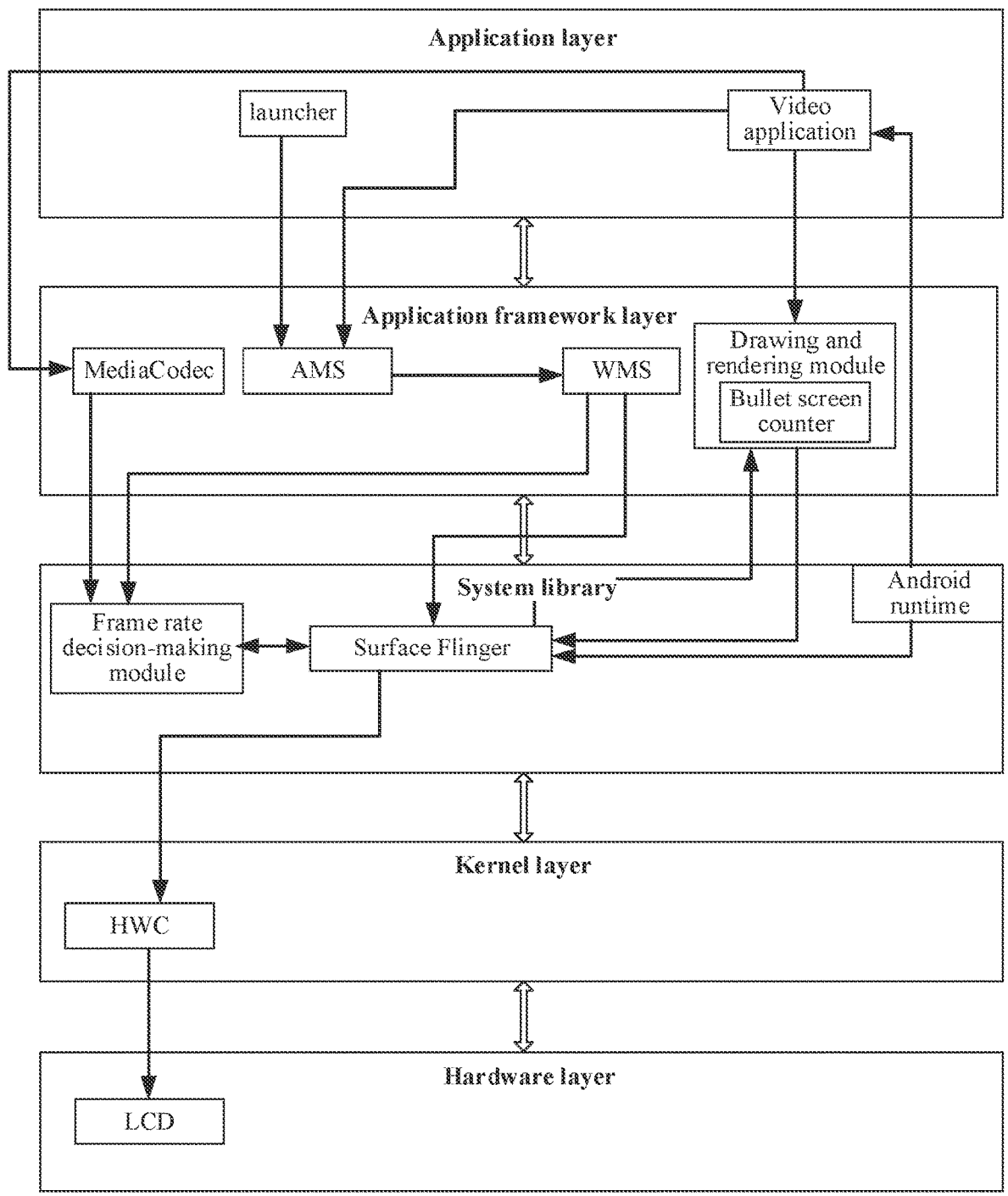
FIG. 3 is a system diagram of an electronic device according to an embodiment of this application.

FIG. 3 is a structural block diagram of the electronic device in this embodiment of this application.

In the layered architecture, software is divided into several layers, and each layer has a clear role and task. The layers communicate with each other by using a software interface. In some embodiments, the Android system is divided into four layers that are respectively an application layer, an application framework layer, an Android runtime and system library, and a kernel layer from top to bottom.

FIG. 3 is a structural block diagram of the electronic device in this embodiment of this application.

In the layered architecture, software is divided into several layers, and each layer has a clear role and task. The layers communicate with each other by using a software interface. In some embodiments, the Android system is divided into four layers that are respectively an application layer, an application framework layer, an Android runtime and system library, and a kernel layer from top to bottom.

Referring to FIG. 3, the application layer may include a launcher and a video application.

The Launcher is configured to launch an application Activity.

For example, in this embodiment, as shown in FIG. 3, the Launcher delivers, in response to an operation of clicking an icon of the video application by a user, a request of launching an application Activity to an Activity manager service (AMS). For details, reference may be made to the following related content of step S4101 shown in FIG. 4a-1 and FIG. 4a-2, and details are not described herein again.

The video application is configured to provide a video playing function to the user.

For example, in this embodiment, as shown in FIG. 3, the video application invokes, in response to an operation of clicking and playing a video by the user, the media codec to decode the video, and delivers a request of launching a video playing Activity to the AMS. For details, reference may be made to the following related content of step S4201 and step S4206 shown in FIG. 4b-1, FIG. 4b-2, FIG. 4b-3, and FIG. 4b-4 and the following related content of step S4301 and step S4306 shown in FIG. 4e-1, FIG. 4e-2, FIG. 4e-3, and FIG. 4e-4, and details are not described herein again.

For example, in this embodiment, as shown in FIG. 3, after being triggered by a surface flinger (Surface Flinger) to perform drawing and rendering, the video application invokes a drawing and rendering thread of a drawing and rendering module, to draw and render image data and/or bullet screen data, and sends the drawn and rendered data to the Surface Flinger for composition. For details, reference may be made to the related content of step S4110 to step S4112 shown in FIG. 4a-1 and FIG. 4a-2, and details are not described herein again.

The application framework layer provides an application programming interface (API) and a programming framework for applications in the application layer. The application framework layer includes some predefined functions. As shown in FIG. 3, the application framework layer may include a Media Codec, an AMS, a window manager service (WMS), and a drawing and rendering module.

The Media Codec is configured to process encoding and decoding of audio and video.

For example, in this embodiment, as shown in FIG. 3, the Media Codec decodes a video that the video application needs to play, and sends a video source frame rate and information about being invoked to a frame rate decision-making module. For details, reference may be made to the related content of step S4207 shown in FIG. 4b-1, FIG. 4b-2, FIG. 4b-3, and FIG. 4b-4 and the related content of step S4307 shown in FIG. 4e-1, FIG. 4e-2, FIG. 4e-3, and FIG. 4e-4, and details are not described herein again.

The AMS is configured to manage an application process and an Activity of the process.

For example, as shown in FIG. 3, in this embodiment, the AMS launches an application Activity in response to a request of launching an application Activity delivered by the Launcher, and then delivers window creation information to the WMS. For details, reference may be made to the related content of step S4102 to step S4103 shown in FIG. 4a-1 and FIG. 4a-2, and details are not described herein again.

In another example, as shown in FIG. 3, in this embodiment, the AMS launches a video playing Activity in response to a video playing Activity request delivered by the video application, and delivers window creation information to the WMS. For details, reference may be made to the related content of step S4202 to step S4203 shown in FIG. 4b-1, FIG. 4b-2. FIG. 4b-3, and FIGS. 4b-4 and S4302 to S4303 shown in FIG. 4e-1, FIG. 4e-2, FIG. 4e-3, and FIG. 4e-4, and details are not described herein again.

The WMS is configured to manage a window, for example, be responsible for launching, adding, and deleting a window.

For example, in this embodiment, the WMS is configured to create, according to window information corresponding to a video application home screen sent by the AMS, a window of the video application home screen. For details, reference may be made to the related content of step S4104 in FIG. 4a-1 and FIG. 4a-2. The WMS may further create a window of a video playing interface according to window information of the video playing interface. For details, reference may be made to the related content of step S4204 shown in FIG. 4b-1, FIG. 4b-2, FIG. 4b-3, and FIGS. 4b-4 and S4304 shown in FIG. 4e-1, FIG. 4e-2, FIG. 4e-3, and FIG. 4e-4.

For example, in this embodiment, the WMS is configured to deliver a package name of the video application to the frame rate decision-making module. For details, reference may be made to the related content of step S4107 shown in FIG. 4a-1 and FIG. 4a-2, and details are not described herein again.

For example, as shown in FIG. 3, in this embodiment, the WMS is configured to deliver view information of the video application home screen or view information of the video playing interface to the Surface Flinger. For details, reference may be made to the related content of step S4105 shown in FIG. 4a-1 and FIG. 4a-2 and step S4205 shown in FIG. 4b-1, FIG. 4b-2, FIG. 4b-3, and FIG. 4b-4, and details are not described herein again.

The drawing and rendering module is configured to launch a drawing and rendering thread to perform drawing and rendering, to obtain drawn and rendered image data and/or bullet screen data.

Figures 2, 4A:
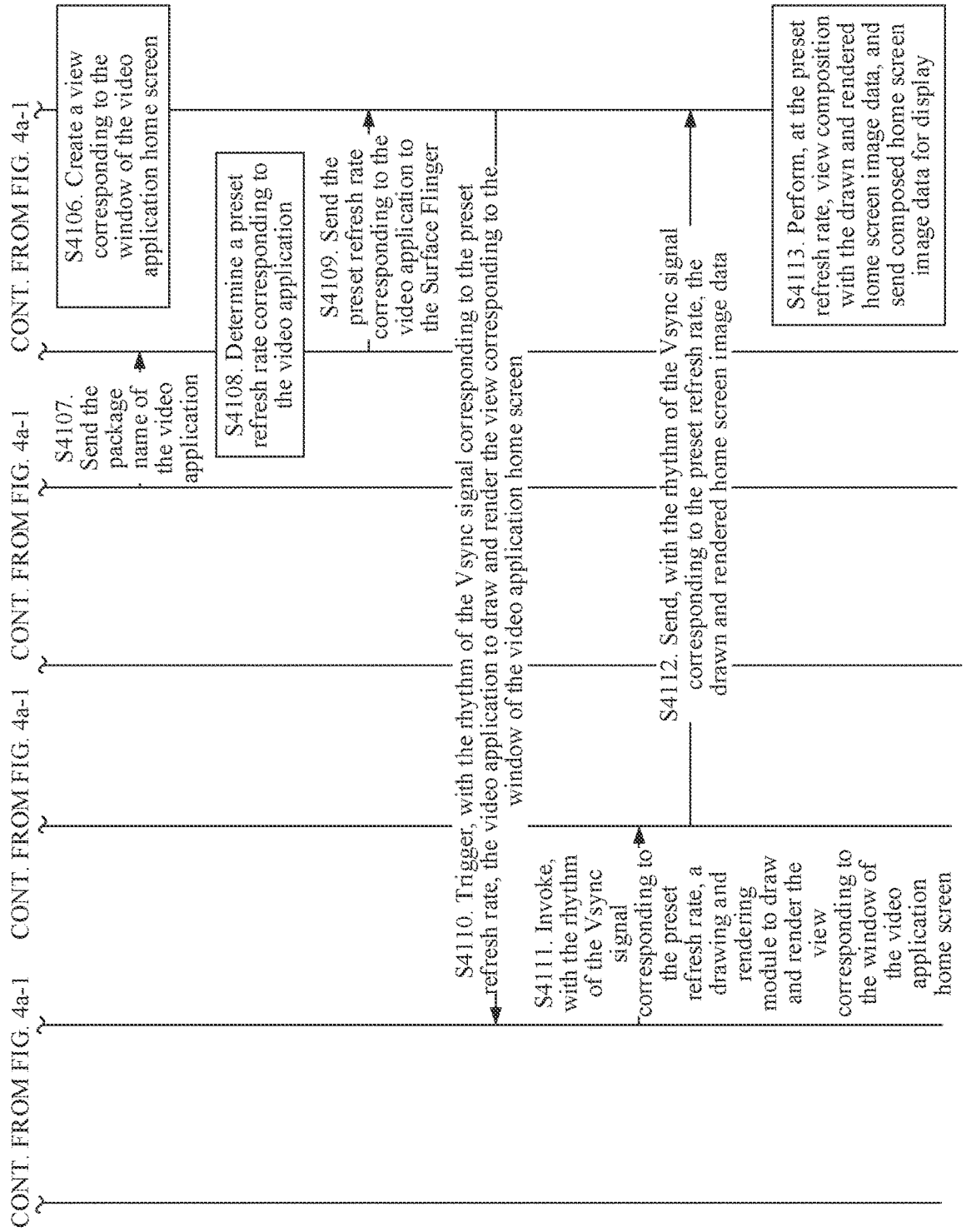
Figures 1, 4B:
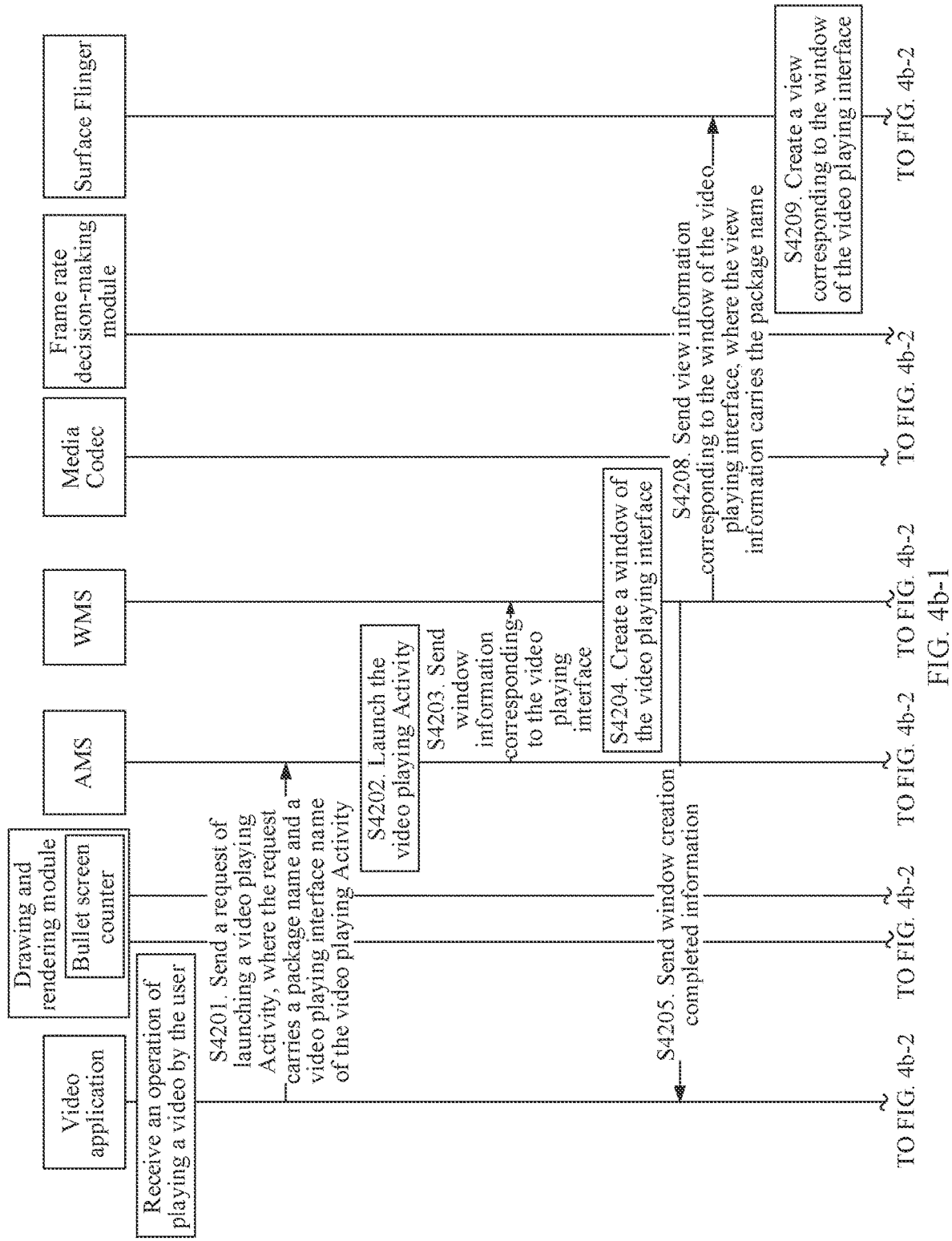
Figures 2, 4B:
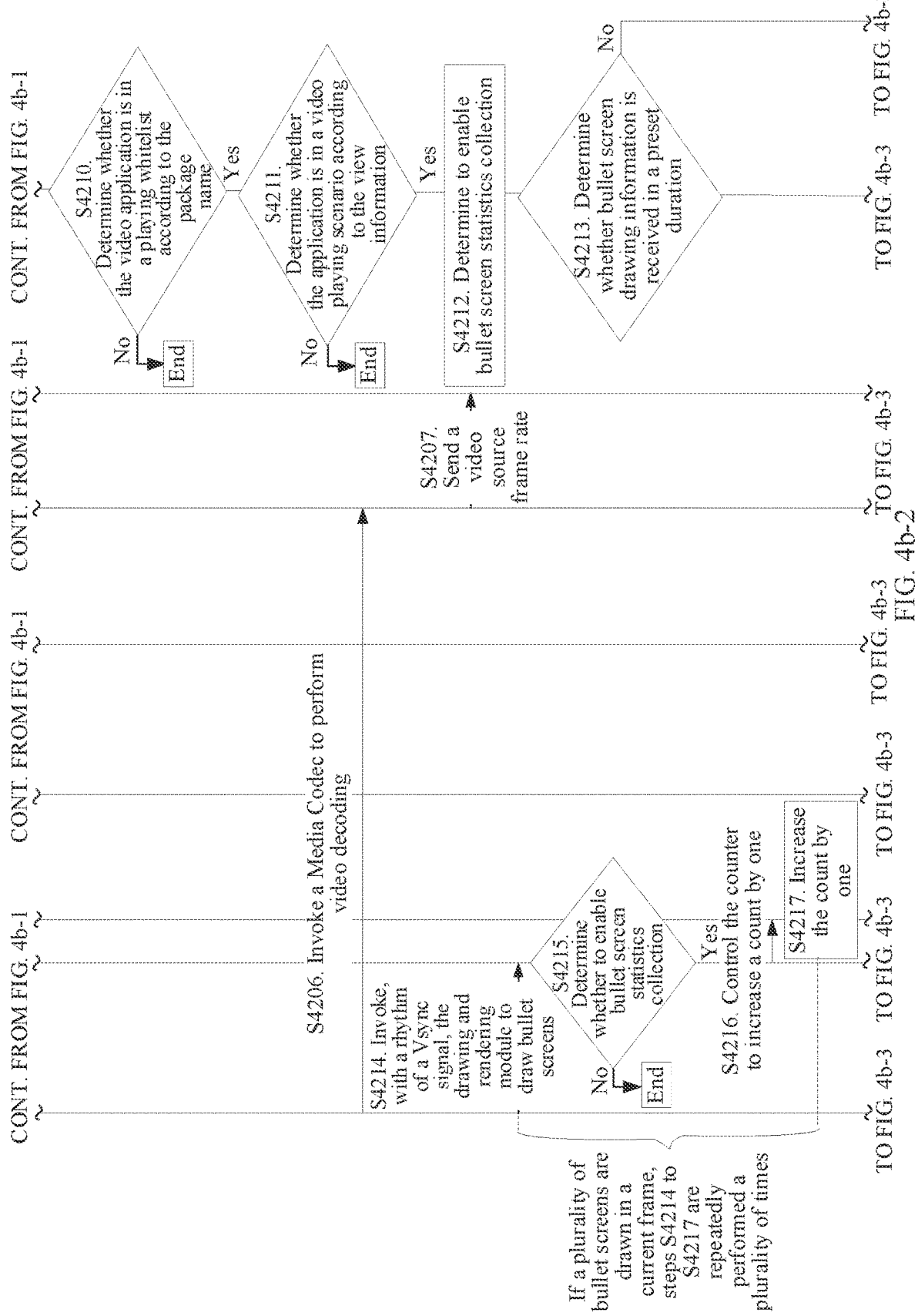
Figures 4, 4B:
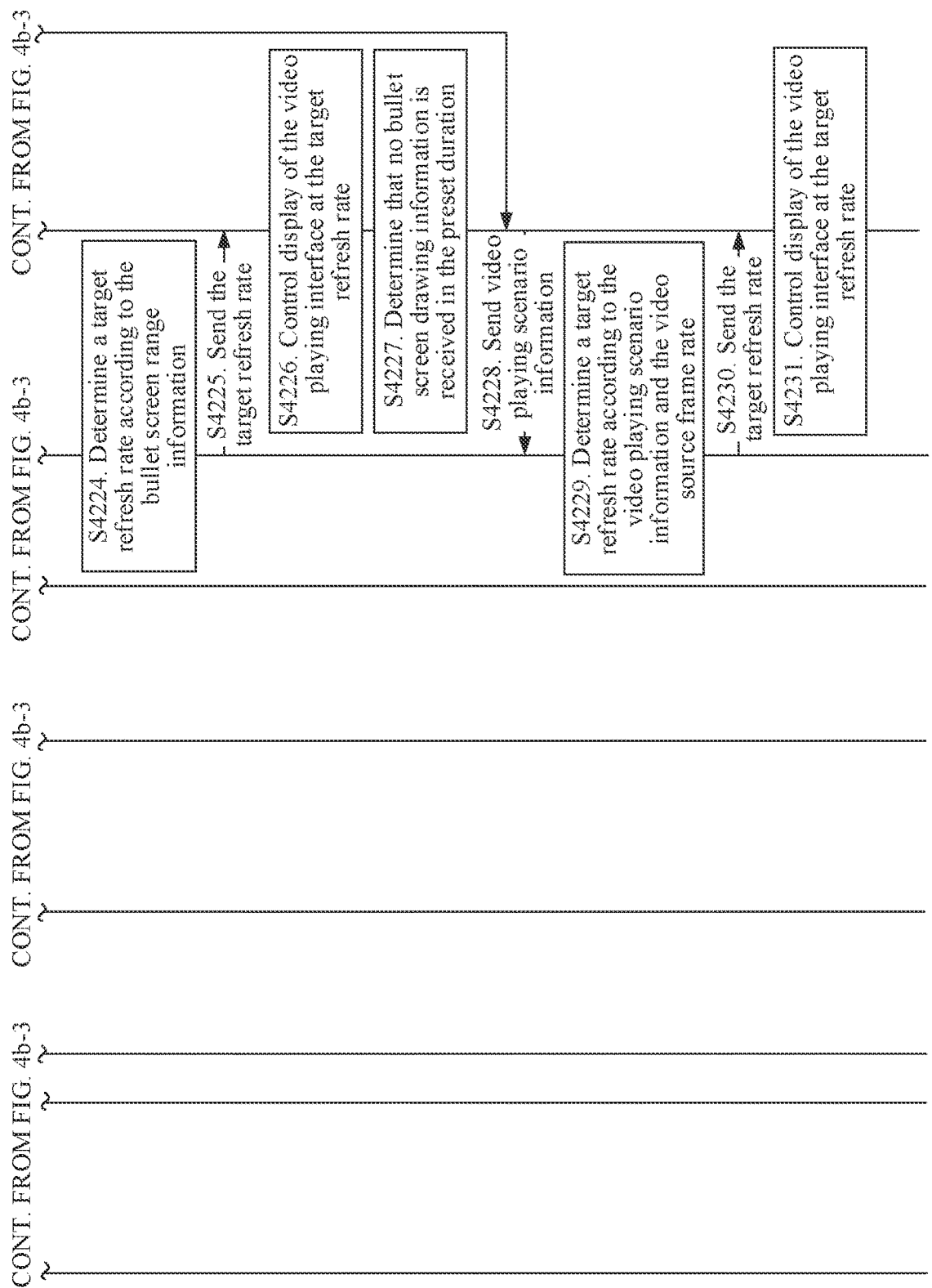

For example, as shown in FIG. 3, in this embodiment, the video application invokes the drawing and rendering thread in the drawing and rendering module, so that the drawing and rendering module draws a view of the video application home screen, a view of the video playing interface, and/or a bullet screen For details, reference may be made to the related content of step S4111 to step S4112 shown in FIG. 4a-1 and FIG. 4a-2 and the related content of step S4214 shown in FIG. 4b-1, FIG. 4b-2, FIG. 4b-3, and FIGS. 4b-4 and S4316 shown in FIG. 4e-1, FIG. 4e-2, FIG. 4e-3, and FIG. 4e-4, and details are not described herein again.

In another example, in this embodiment, the drawing and rendering module further includes a bullet screen counter; and when receiving information about enabling bullet screen statistics collection sent by the Surface Flinger, the bullet screen counter enables bullet screen statistics collection, to collect statistics on the number of bullet screens, and sends bullet screen drawing to the Surface Flinger, where the bullet screen drawing information carries drawn and rendered bullet screen data, the number of bullet screens, and a time stamp. For details, reference may be made to the related content of step S4214 to step S4218 shown in FIG. 4b-1, FIG. 4b-2, FIG. 4b-3, and FIGS. 4b-4 and S4316 to S4319 shown in FIG. 4e-1, FIG. 4e-2, FIG. 4e-3, and FIG. 4e-4, and details are not described herein again.

The Android Runtime includes a core library and a virtual machine. The Android runtime is responsible for scheduling and managing the Android system.

The core library includes two parts: one part is a performance function that the Java language needs to invoke, and the other part is a core library of Android.

The application layer and the application framework layer are run in the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of function modules. For example, as shown in FIG. 3, the system library includes: a frame rate decision-making module and a Surface Flinger.

The frame rate decision-making module is configured to send a target refresh rate (which may also be referred to as a target refresh rate) to the Surface Flinger, so that the Surface Flinger controls composition of display data at the target refresh rate.

For example, as shown in FIG. 3, in this embodiment, the frame rate decision-making module is configured to send the information about being invoked to the Surface Flinger. For details, reference may be made to the related content of step S4308 shown in FIG. 4e-1, FIG. 4e-2, FIG. 4e-3, and FIG. 4e-4, and details are not described herein again.

In another example, in this embodiment, the frame rate decision-making module further receives scenario information sent by the Surface Flinger, determines the target refresh rate according to the scenario information, and sends the target refresh rate to the Surface Flinger. The scenario information includes: video scenario information or bullet screen range information. For details, reference may be made to the related content of step S4224 to step S4225 and S4229 to S4230 shown in FIG. 4b-1, FIG. 4b-2, FIG. 4b-3, and FIGS. 4b-4 and S4326 to step S4327 and step S4331 to step S4332 shown in FIG. 4e-1, FIG. 4e-2, FIG. 4e-3, and FIG. 4e-4, and details are not described herein again.

The Surface Flinger is configured to compose the display data.

For example, as shown in FIG. 3, in this embodiment, the Surface Flinger is configured to create a view of the video application home screen or a view of the video playing interface. For details, reference may be made to the related content of step S4106 shown in FIG. 4a-1 and FIG. 4a-2 and the related content of step S4209 shown in FIG. 4b-1, FIG. 4b-2, FIG. 4b-3, and FIGS. 4b-4 and S4310 shown in FIG. 4e-1, FIG. 4e-2, FIG. 4e-3, and FIG. 4e-4, and details are not described herein again.

For example, as shown in FIG. 3, in this embodiment, the Surface Flinger is configured to trigger the video application to perform drawing and rendering. For details, reference may be made to the related content of step S4110 shown in FIG. 4a-1 and FIG. 4a-2, and details are not described herein again.

In another example, in this embodiment, the Surface Flinger is further configured to receive the view information sent by the WMS and the package name sent by the Media Codec, determine whether the video application is in the video playing scenario according to view features in the view information and the package name, and send information about enabling bullet screen statistics collection to the drawing and rendering module if the video application is in the video playing scenario. For details, reference may be made to the related content of step S4206 to step 4211 shown in FIG. 4b-1, FIG. 4b-2, FIG. 4b-3, and FIGS. 4b-4 and S4309 to S4312 shown in FIG. 4e-1, FIG. 4e-2, FIG. 4e-3, and FIG. 4e-4, and details are not described herein again.

In another example, in this embodiment, the Surface Flinger further receives bullet screen drawing information carrying the drawn and rendered bullet screen data, the number of bullet screens, and the time stamp and sent by the drawing and rendering module, determines a bullet screen range in the bullet screen scenario according to the bullet screen drawing information, and then sends bullet screen scenario information carrying the bullet screen range to the frame rate decision-making module. In another example, when the bullet screen drawing information is not received in the preset duration, the video playing scenario information is sent to the frame rate decision-making module. For details, reference may be made to the related content of step S4219 to step S4223 shown in FIG. 4b-1, FIG. 4b-2, FIG. 4b-3, and FIGS. 4b-4 and S4321 to S4325 shown in FIG. 4e-1, FIG. 4e-2, FIG. 4e-3, and FIG. 4e-4, and details are not described herein again.

In another example, in this embodiment, the Surface Flinger further receives and buffers the drawn and rendered image data and bullet screen data sent by the video application, and performs view composition in collaboration with a hardware composer (HWC).

The kernel layer is a layer between hardware and software. The kernel layer includes at least the HWC, and the HWC is configured to complete combination and display of the image data with hardware. For example, as shown in FIG. 3, in this embodiment, the HWC is configured to receive the view and the target refresh rate sent by the Surface Flinger, process the view at the target refresh rate, and send the processed view to an LCD at a hardware layer for display. For details, reference may be made to the related content of S4113 in FIG. 4a-1 and FIG. 4a-2 and the related content of step S4226 and step S4231 shown in FIG. 4b-1, FIG. 4b-2, FIG. 4b-3, and FIG. 4b-4 and step S4328 and step S4333 shown in FIG. 4e-1, FIG. 4e-2, FIG. 4e-3, and FIG. 4e-4, and details are not described herein again.

It should be noted that, although this embodiment of this application is described by using an Android system as an example, the basic principle is also applicable to an electronic device based on an operating system such as iOS or Windows. It should be further noted that in the hardware layer shown in FIG. 3, in addition to the LCD, other types of display screens such as an OLED may also be used. This is not limited in this embodiment of this application.

FIG. 4a-1 and FIG. 4a-2 are a schematic diagram of a launching stage process of any video application in a refresh rate setting method according to an embodiment of this application. The method is applied to the electronic device proposed in the embodiments of this application and specifically includes the following steps:

S4101. A Launcher delivers a request of launching an application Activity to an AMS in response to an operation of launching a video application by a user.

Specifically, the Launcher receives the operation of launching the video application by the user, and then delivers the request of launching an application Activity to the AMS in response to the operation of launching the video application by the user. Exemplarily, the operation of launching the video application by the user may be an operation of clicking an icon of the video application by the user, an operation of launching the video application by the user via voice, or an operation of unlocking and automatically launching the video application by the user. For example, as shown in FIG. 4a-1 and FIG. 4a-2, when the user needs to use the video application, the user clicks the icon of the video application, so that the Launcher in the electronic device delivers the request of launching an application Activity to the AMS in response to the operation of clicking the icon of the video application by the user.

An Activity is an application component responsible for interacting with the user and provides a screen or an interface, which may be used by the user to interact to complete a task. The application Activity is mainly configured to complete a task of launching an application and provide a home screen of the application to the user. The request of launching an application Activity is used to request to launch a video application Activity, so as to launch the video application and present a home screen of the video application to the user.

In some embodiments, the request of launching an application Activity carries a package name of the video application. In some other embodiments, the request of launching an application Activity may alternatively carry a unique identifier specific to the video application, such as a path of the video application. In some other embodiments, in addition to the unique identifier specific to the video application, the request of launching an application Activity may further carry other information.

In this embodiment of this application, the video application refers to an application having a video playing function, and may be specifically a browser, an application of a video platform, an application of a music platform capable of playing music clips, and the like. For example, as shown in (1) in FIG. 1A and FIG. 1B, when the electronic device is a mobile phone, the user clicks the icon of the "video app" on the interface, and then may trigger the Launcher in the mobile phone to deliver the request of launching an application Activity to the AMS in response to the operation of clicking the icon of the video application by the user.

For details of the execution process and the principle of step S4101, reference may be made to the principle of the Activity-involved related technology in the application launching process in the Android system.

S4102. The AMS launches an application Activity.

In some embodiments, the process of performing step S4102 is as follows: The AMS may create the application Activity according to the package name of the video application carried in the request of launching an application Activity in response to the request of launching an application Activity, and launch the created application Activity.

For details of the execution process and the principle of launching the application Activity by the AMS, reference may be made to the principle of the related technology of launching the application Activity by the AMS in the Android system.

S4103. The AMS sends window information corresponding to a video application home screen to a WMS.

After launching the application Activity, the AMS needs to complete a task of launching the video application, provides the home screen of the video application to the user, for the user to interact with a control of the video application home screen.

Exemplarily, the window information corresponding to the video application home screen may be obtained from installation information of the video application. For example, the AMS may determine the installation information of the video application according to the package name of the video application, and then obtain the window information corresponding to the video application home screen from the installation information of the video application. Exemplarily, the window information corresponding to the video application home screen may be determined through a plurality of times of interaction between the AMS and the video application.

The window information corresponding to the video application home screen may be used to create a window corresponding to the video application home screen, and the window information corresponding to the video application home screen may carry the package name of the video application and may specifically include: window attribute information, window level information, and the like of the video application home screen. For example, the window attribute information may be a window name, a window position, a window size, and the like, and the window level information corresponding to the video application home screen is used to indicate that the window corresponding to the video application home screen is placed at a topmost layer of a display interface. After determining the window information corresponding to the video application home screen, the AMS may send the window information to the WMS, for the WMS to create the window corresponding to the video application home screen.

It should be noted that, a difference between the numbers of windows that the video application home screen needs to create does not affect implementation of this embodiment of this application. This is not limited in this application.

In some embodiments, the process of performing step S4103 may be as follows: The AMS invokes the WMS, and sends the window information corresponding to the video application home screen to the WMS. Exemplarily, the AMS invokes a WMS thread, and applies, by delivering the window information corresponding to the video application home screen, to the WMS for creation of each window of the video application home screen.

S4104. The WMS creates, according to the window information corresponding to the video application home screen, a window of the video application home screen.

Because the window information corresponding to the video application home screen includes window attribute information such as a window name, a window size, and a window position, window level information, and the like of the video application home screen, the WMS may determine, according to the window information corresponding to the video application home screen, a size, a position, a level, and the like of a window needing to be created of the video application home screen, and then may create the window.

For details of the process and technical principle of creating a window through interaction between the AMS and the WMS described in step S4103 to step S4104, reference may be made to the process and technical principle of creating a window through interaction between the AMS and the WMS in the operating system such as an Android system.

S4105. The WMS sends view information corresponding to the window of the video application home screen to the Surface Flinger.

The view information corresponding to the window of the video application home screen may be used to create a view corresponding to the window of the video application home screen, and then the view corresponding to the window of the video application home screen can be displayed in a window region corresponding to step S4104. The view information corresponding to the window of the video application home screen carries the package name of the video application and may specifically include: a window name of the video application home screen, a view name corresponding to the window of the video application home screen, a view size corresponding to the window of the video application home screen, a view position corresponding to the window of the video application home screen, and the like. Exemplarily, the package name of the video application may be carried in the view name.

The view information corresponding to the window of the video application home screen may include view information of a plurality of views, and is specifically determined according to the number of views that the video application home screen needs to create. This is not limited in this application.

Exemplarily, the view information corresponding to the window of the video application home screen may be obtained from installation information of the video application. For example, the AMS may determine the installation information of the video application through the package name of the video application, obtain the view information from the installation information of the video application, and then send the view information to the WMS, and after obtaining the view information, the WMS sends the view information to the Surface Flinger.

Exemplarily, the process of performing step S4105 may be as follows: The WMS may invoke the Surface Flinger, and apply, by delivering the view information corresponding to the window of the video application home screen to the Surface Flinger, for creation of the view corresponding to the window of the video application home screen in the Surface Flinger.

S4106. The Surface Flinger creates a view corresponding to the window of the video application home screen according to the view information corresponding to the window of the video application home screen.

Because the view information corresponding to the window of the video application home screen contains information capable of implementing view creation, such as a window name of the video application home screen, a view name corresponding to a window, a view size, and a view position, the Surface Flinger may create a view corresponding to the window of the video application home screen according to the view information corresponding to the window of the video application home screen.

Exemplarily, in the process of step S4105 to step S4106, the WMS and the Surface Flinger interact with each other to implement view creation through a function such as ViewRootImpl.

For details of the process and technical principle of creating the view corresponding to the window of the video application home screen in the Surface Flinger through interaction and communication between the WMS and the Surface Flinger involved in step S4105 to step S4106, reference may be made to the process and technical principle of creating a view through interaction between the WMS and the Surface Flinger in the Android system.

S4107. The WMS sends a package name of the video application to a frame rate decision-making module.

Step S4107 may be performed after the WMS completes window creation, that is, step S4104. Because the window information received by the WMS in step S4103 carries the package name of the video application, the WMS may send the package name obtained in step S4103 to the frame rate decision-making module at the current stage of launching the video application, and then the frame rate decision-making module may determine that the video application needs to be launched currently. The frame rate decision-making module may determine a preset refresh rate corresponding to the video application according to the package name of the video application.

It should be noted that, the WMS sends the package name of the video application to the frame rate decision-making module in many specific implementations only if the frame rate decision-making module may determine the preset refresh rate corresponding to the video application through the package name delivered by the WMS. A specific manner of sending the package name of the video application is not limited in this embodiment of this application.

S4108. The frame rate decision-making module determines a preset refresh rate corresponding to the video application according to the package name of the video application.

In some embodiments, a correspondence between a package name and a preset refresh rate is stored in the electronic device in advance. Therefore, the frame rate decision-making module may find the preset refresh rate corresponding to the video application through the package name of the video application.

S4109. The frame rate decision-making module sends the preset refresh rate corresponding to the video application to the Surface Flinger.

The video application is currently launched. Therefore, a target refresh rate used in the display process is the preset refresh rate corresponding to the video application, and a manner of delivering the refresh rate corresponding to the video application to the Surface Flinger by the frame rate decision-making module may control the Surface Flinger to compose a to-be-displayed image at the preset refresh rate.

It should be noted that, in some embodiments, step S4107 and step S4108 may alternatively not be performed. For example, if preset refresh rates of all applications are consistent, for example, the electronic device uses a refresh rate of 60 Hz by default, it is not necessary to perform step S4107 and step S4108, and during step S4109, the preset refresh rate used by all applications by default is used as the target refresh rate and delivered to the Surface Flinger.

S4110. The Surface Flinger triggers, with a rhythm of a vertical synchronization (Vsync, Vertical Sync) signal corresponding to a preset refresh rate, the video application to draw and render the view corresponding to the window of the video application home screen.

The Vsync signal is used to control a rhythm of drawing and rendering, view composition, and sending for display of the displayed picture. The preset refresh rate mentioned in step S4110 is the preset refresh rate corresponding to the video application. The Surface Flinger triggers, with the rhythm of the Vsync signal corresponding to the preset refresh rate, the video application to launch drawing and rendering of the view corresponding to the window of the video application home screen. A period of the Vsync signal corresponds to the preset refresh rate. The Vsync signal corresponding to the preset refresh rate may control the display screen to refresh and display at the preset refresh rate.

For details of the process of triggering drawing and rendering by the Surface Flinger with the rhythm of the Vsync signal, reference may be made to the related content of the process and technical principle of triggering drawing and rendering by the Surface Flinger in the Android system.

S4111. The video application invokes, with the rhythm of the Vsync signal corresponding to the preset refresh rate, a drawing and rendering module to draw and render the view corresponding to the window of the video application home screen, to obtain drawn and rendered home screen image data.

The drawn and rendered home screen image data refers to drawn and rendered image data of the video application home screen, and may alternatively be understood as image data obtained after the view corresponding to the window of the video application home screen is drawn and rendered.

Exemplarily, the process of performing step S4111 may be as follows: The video application invokes a drawing and rendering thread of the drawing and rendering module with the rhythm of the Vsync signal corresponding to the preset refresh rate, so that the drawing and rendering module draws and renders the view of the video application home screen, and then the drawing and rendering module may obtain the drawn and rendered home screen image data.

Exemplarily, in the process of performing drawing and rendering, the drawing and rendering module may draw and render the view corresponding to the window of the video application home screen by invoking a function such as Open GL ES or Skia.

For details of the process and technical principle of drawing and rendering the view through interaction between the video application and the drawing and rendering module, reference may be made to the process and technical principle of drawing and rendering the view in the Android system.

S4112. The drawing and rendering module sends, with the rhythm of the Vsync signal corresponding to the preset refresh rate, the drawn and rendered home screen image data to the Surface Flinger.

The drawn and rendered home screen image data obtained by the drawing and rendering module step S4111 may be sent to the Surface Flinger with the rhythm of the Vsync signal corresponding to the preset refresh rate. The specific process in which the drawing and rendering module sends the drawn and rendered home screen image data to the Surface Flinger with the rhythm of the Vsync signal may be implemented jointly in collaboration with another module. A specific implementation process of step S4112 is not limited in this embodiment of this application.

S4113. The Surface Flinger performs, at the preset refresh rate corresponding to the video application, view composition with the drawn and rendered home screen image data, and sends composed home screen image data for display.

The Surface Flinger performs, at the preset refresh rate corresponding to the video application, view composition on drawn and rendered home screen image data of each frame, and sends data of the composed home screen to the display screen (for example, LCD) for display, so that the video application home screen may be refreshed and displayed at the target refresh rate on the display screen of the electronic device. Exemplarily, the Surface Flinger performs, with the rhythm of the Vsync signal corresponding to the preset refresh rate, view composition on drawn and rendered home screen image data of each frame, and sends data of the composed home screen to the display screen (for example, LCD) for display with the rhythm of the Vsync signal, and then the display screen refreshes and displays the video application home screen at the preset refresh rate corresponding to the video application.

For example, as shown in (2) in FIG. 1A and FIG. 1B, the home screen of the video application is displayed at the preset refresh rate of 60 Hz, and a plurality of playable videos are displayed on the home screen.

Exemplarily, after obtaining the drawn and rendered home screen image data, the Surface Flinger may implement view composition through the HWC. For example, the Surface Flinger delivers the target refresh rate to the HWC, and then sends the drawn and rendered home screen image data to the HWC, so that the HWC performs view composition on the drawn and rendered home screen image data at the target refresh rate, and the HWC outputs composed home screen image data of each frame to the display screen for display at the target refresh rate.

For details of the process of sending the composed home screen image data for display by the Surface Flinger, reference may be made to the related content of performing view composition and sending for display by the Surface Flinger in the Android system.

Through step S4101 to step S4103, the electronic device may display the video application home screen at the preset refresh rate corresponding to the video application in the application launching stage, for the user to interact.

FIG. 4*b*-1, FIG. 4*b*-2, FIG. 4*b*-3, and FIG. 4*b*-4 are a schematic diagram of a video playing stage process of any video application in a refresh rate setting method according to an embodiment of this application, applied to the electronic device proposed in the embodiments of this application. The process shown in FIG. 4*b*-1, FIG. 4*b*-2, FIG. 4*b*-3, and FIG. 4*b*-4 may begin to be performed after the process shown in FIG. 4*a*-1 and FIG. 4*a*-2 is completed and the video application home screen of the video application is displayed. In this case, a video application home screen of only one video application is displayed at a front end of the electronic device. A specific video playing stage process includes the following steps:

S4201. A video application delivers a request of launching a video playing Activity to an AMS in response to an operation of playing a video by a user.

The video playing Activity is used to provide a video playing interface, which the user may use to interact to complete a video playing task.

After the video application is launched through the process in FIG. 4a-1 and FIG. 4a-2, the video application receives an operation of playing a video by the user, and then triggers, in response to the operation of playing a video by the user, to send a request of launching a video playing Activity to the AMS, so that the AMS launches the video playing Activity.

The operation of playing a video by the user is in many specific forms. Exemplarily, the operation of playing a video by the user may be an operation of clicking a video on the video application home screen displayed in the foregoing process in FIG. 4a-1 and FIG. 4a-2, or may be an operation of searching for videos needing to be watched on the video application home screen and then clicking a video on a search result interface by the user, or may be an operation of inputting a video needing to be played by the user through voice.

For example, as shown in FIG. 4c-(1), on a video application home screen, the user clicks a video 1, and then may trigger a video application to deliver a request of launching a video playing Activity to the AMS. For a detailed description of FIG. 4c-(1), reference may also be made to the foregoing related description of (2) in FIG. 1A and FIG. 1B, and details are not described herein again.

It should be noted that, the process from displaying the video application home screen to receiving the video playing operation of the user by the video application is in many specific implementation forms. This is not limited in this embodiment of this application.

In some embodiments, the request of launching a video playing Activity carries the package name of the video application and a video playing interface name of the video playing Activity. The video playing interface name can be used to indicate a name of an interface where that a video needing to be played is located. For example, referring to FIG. 4c-(1), the user clicks the video 1, and then triggers the video application to send a request of launching a video playing Activity, and the request of launching a video playing Activity may carry a playing interface name of the video 1.

In some embodiments, the request of launching a video playing Activity may carry another type of identifier of the video application other than the package name of the video application, which may be, for example, a path of the video application, and specific forms of identifiers of the video application are not limited in this embodiment of this application. In some other embodiments, the request of launching a video playing Activity may carry another type of identifier of the video playing interface other than the video playing interface name. This is not limited in this embodiment of this application either.

In some other embodiments, the request of launching a video playing Activity may further carry other information about the video playing Activity, and specific information in the request of launching a video playing Activity is not limited in this embodiment of this application.

It should be noted that, in some other embodiments, alternatively, the video application delivers or another application automatically triggers the video application to deliver the request of launching a video playing Activity to the AMS, and a difference between specific manners of triggering to deliver the request of launching a video playing Activity to the AMS does not affect implementation of this embodiment of this application.

For details of the execution process and the principle of step S4201, reference may be made to the principle of the Activity-involved related technology in the process of launching video playing in the application in the Android system.

S4202. The AMS launches a video playing Activity.

In some embodiments, the process of performing step S4202 is as follows: The AMS may create, in response to the request of launching a video playing Activity, the video playing Activity according to the package name of the video application and the video playing interface name carried in the request of launching a video playing Activity, and launch the created video playing Activity.

For details of the execution process and the principle of launching the video playing Activity by the AMS, reference may be made to the principle of the related technology of launching the Activity by the AMS in the Android system.

S4203. The AMS sends window information corresponding to the video playing interface to the WMS.

The video playing interface is an application interface used for displaying a video picture. After launching the video playing Activity, the AMS needs to complete a video playing task, and provides the user with the video playing interface of the video application, for the user to interact with a control of the playing interface of the video application, thereby meeting a video playing requirement of the user. The window information corresponding to the video playing interface may be used to create the window corresponding to the video playing interface.

Exemplarily, the window information corresponding to the video playing interface may be obtained from installation information of the video application. For example, the AMS may determine the installation information of the video application according to the package name of the video application, and then obtain the window information corresponding to the video playing interface from the installation information of the video application. Exemplarily, the window information corresponding to the video playing interface may be determined through a plurality of times of interaction between the AMS and the video application.

The window information corresponding to the video playing interface may carry the package name of the video application, and may specifically include: window attribute information, window level information, and the like of the video playing interface. For example, the window attribute information may be a window name, a window position, or a window size. The window level information corresponding to the video playing interface is used to indicate that the window corresponding to the video playing interface is placed at the topmost layer of the display interface. After determining the window information corresponding to the video playing interface, the AMS may send the window information to the WMS, for the WMS to create the window corresponding to the video playing interface.

For the process and principle of sending the window information corresponding to the video playing interface to the WMS by the AMS, reference may be made to the foregoing execution process and principle of step S4103 in FIG. 4a-1 and FIG. 4a-2. A difference is that in step S4103, the window information sent by the AMS needs to be related to the video application home screen, while in step S4203, the window information sent by the AMS is related to the video playing interface.

S4204. The WMS creates a window of the video playing interface according to the window information corresponding to the video playing interface.

Because the window information corresponding to the video playing interface includes window attribute information such as a window name, a window size, and a window position, window level information, and the like of the video playing interface, the WMS may determine, according to the window information corresponding to the video playing interface, a size, a position, a level, and the like of a window needing to be created of the video playing interface, and then may create the window of the video playing interface.

For details of an execution process and a principle of step S4204, reference may be made to the foregoing step S4104 shown in FIG. 4a-1 and FIG. 4a-2. A difference is that the window created in step S4104 is the window of the video application home screen, while the window created in step S4204 is the window of the video playing interface.

S4205. The WMS sends window creation completed information to the video application.

When completing step S4204, the WMS sends the window creation completed information to the video application, to prompt the video application that window creation is currently completed, and the video application may trigger a subsequent operation.

The window creation completed information may carry identifier information of a created window, for example, a window name, and a specific form of the window creation completed information is not limited in this embodiment of this application.

S4206. The video application invokes a Media Codec to perform video decoding.

Exemplarily, step S4206 may be triggered after the video application receives the window creation completed information sent in step S4205.

Specifically, the video application invokes the Media Codec, to perform video decoding on a video that the user needs to play in step S4201. For example, as shown in FIG. 4c-(1), the user clicks the video 1, and therefore the video application invokes the Media Codec to perform video decoding on the video 1. For related content of FIG. 4c-(1), reference may be made to the foregoing description of (2) in FIG. 1A and FIG. 1B, and details are not described herein again.

For details of the execution process and the principle of step S4206, reference may be made to the principle of the related technology in the video decoding process in the Android system.

S4207. The Media Codec sends a video source frame rate to a frame rate decision-making module.

The video source frame rate refers to a video source frame rate of the video that the user needs to play. Because the Media Codec invoked by the video application performs video decoding on the video that the user needs to play in step S4206, the Media Codec obtains the video source frame rate of the video through a video source of the video that the user needs to play. In some other embodiments, the Media Codec may further obtain information about the video source of the video, such as resolution.

The video source frame rate of the video that the user needs to play can indicate a required refresh rate of the video that the user needs to play, and then may provide a reference for the frame rate decision-making module when performing refresh rate decision-making. For details, reference may be made to a subsequent description of step S4229.

S4208. The WMS sends view information corresponding to the window of the video playing interface to a Surface Flinger.

The view information corresponding to the window of the video playing interface carries the package name of the video application. The view information corresponding to the window of the video playing interface may be used to create a view of the video playing interface, and then the view of the video playing interface can be displayed in a window region corresponding to step S4204. The view information corresponding to the video playing interface may specifically include: a view name corresponding to the window of the video playing interface, a view size, a view position, a window name, and the like. Exemplarily, the package name of the video application may be carried in the view name.

For details of an execution process and a principle of step S4208, reference may be made to the foregoing process and principle of step S4105 mentioned in FIG. 4a-1 and FIG. 4a-2. A difference is that the view information sent in step S4108 is related to the video application home screen, while the view information sent in step S4208 is related to the video playing interface.

S4209. The Surface Flinger creates a view corresponding to the window of the video playing interface according to the view information corresponding to the window of the video playing interface.

For details of an execution process and a principle of step S4209, reference may be made to the foregoing process and principle of step S4106 mentioned in FIG. 4a-1 and FIG. 4a-2. A difference is that the view created in step S4109 is related to the video application home screen, while the view created in step S4206 is related to the video playing interface.

It should be noted that, S4203, S4204, S4208, and S4209 may be steps repeatedly performed. Exemplarily, after the foregoing process in FIG. 4a-1 and FIG. 4a-2 is performed, the display screen is refreshed at the preset refresh rate. Therefore, when it is necessary to display a new frame of video playing interface, information such as window or view needs to be updated again through S4203, S4204, S4208, and S4209.

Exemplarily, after step S4209 is performed, the Surface Flinger triggers, with the rhythm of the Vsync signal corresponding to the preset refresh rate corresponding to the video application, the video application to draw and render the view corresponding to the window of the video playing interface. Then the video application invokes, with the rhythm of the Vsync signal corresponding to the preset refresh rate, the drawing and rendering module to draw and render the view corresponding to the window of the video playing interface, the drawing and rendering module sends, with the rhythm of the Vsync signal corresponding to the preset refresh rate, image data of the drawn and rendered video playing interface to the Surface Flinger, and the Surface Flinger may perform, at the preset refresh rate corresponding to the video application, view composition with the image data of the drawn and rendered video playing interface, and send image data of the composed video playing interface for display, so that the display screen refreshes the video playing interface at the preset refresh rate corresponding to the video application. For details, reference may be made to the related content of step S4110 to step S4113 shown in FIG. 4a-1 and FIG. 4a-2. A difference is that the displayed interfaces are different.

It should be noted that, the execution process of the step of refreshing and displaying the video playing interface at the preset refresh rate corresponding to the video application and a subsequently described execution process of step S4211 to step S4224 do not interfere with each other, that is, an order of performing step S4211 and the step of refreshing and displaying the video playing interface at the preset refresh rate corresponding to the video application is not limited in this application. Before the frame rate decision-making module sends a new refresh rate to the Surface Flinger, the Surface Flinger may refresh and display the video playing interface at the preset refresh rate corresponding to the video application, until the refresh rate sent by the frame rate decision-making module is changed through step S4211 to step S4224, and then the video playing interface is refreshed again at the new refresh rate.

S4210. The Surface Flinger determines, according to a package name in the view information, whether the video application is in a playing whitelist.

The playing whitelist may be understood as a list of applications having video playing permission. The view information in step S4210 may be understood as the view information corresponding to the window of the video playing interface. It can be known from the foregoing description of step S4208 that, the view information carries the package name of the video application, and therefore whether the video application is in the playing whitelist may be determined through the package name of the video application.

Exemplarily, the package name of the video application may be obtained from the view name carried in the view information corresponding to the video playing interface. For example, a specific format of the view name may be: package name/view-specific name, and then the package name can be obtained from the view information. For example, a view name of a video playing interface of a video application is "xxx.xxxx.xx/com.xx.bangumi.ui.page. detail.BangumiDetailActivityV3 #0SurfaceView-xxx.xxxx.xx/com.bi[ . . . ]age.detail.BangumiDetailActivityV3 #0", and it can be known from the view name that, a package name of the video application is "XXX.XXXX.XX".

Exemplarily, the process of performing step S4210 is as follows: The Surface Flinger searches the playing whitelist to determine whether the package name of the video application exists, and determines that the video application is in the playing whitelist if the package name of the video application exists. It indicates that the video application is not in the playing whitelist if the package name of the video application is not found in the playing whitelist.

If it is determined that the video application is in the playing whitelist, it is considered that the video application has playing permission, and step S4211 is performed. If it is determined that the video application is not in the playing whitelist, it is considered that the video application has no playing permission, and the process ends, that is, the video playing interface is not displayed on the display screen. In some other embodiments, prompt information used to remind the user that the video application has no playing permission may be further displayed on the display screen.

In some other embodiments, step S4210 may alternatively not be performed, that is, step S4211 is directly performed after step S4209 is performed.

S4211. The Surface Flinger determines whether the video application is in a video playing scenario according to the view information corresponding to the window of the video playing interface.

The view information corresponding to the window of the video playing interface contains view feature information that can be used to indicate whether the video application is in the video playing scenario. The determining whether the video application is in the video playing scenario may be understood as determining whether a scenario that the video application is currently in is the video playing scenario. The video playing scenario refers to a scenario of playing a video by the application.

Exemplarily, the view feature information may be surfaceview (SurfaceView), and if the view information contains the SurfaceView, it indicates that the video application is in the video playing scenario. For example, if the view name in the view information contains a surfaceview (SurfaceView) field, it may be determined that the video application is in the video playing scenario. For example, a view name of a video playing interface of a video application is "xxx.xxxx.xx/com.xx.bangumi.ui.page.detail.BangumiDetailActivityV3 #0SurfaceView-xxx.xxxx.xx/com.bi[ . . . ]age.detail.BangumiDetailActivityV3 #0", and carries a "SurfaceView" field. Therefore, it is determined that the video application is currently in the video playing scenario, and the user has a video playing requirement.

If it is determined in step S4211 that the video application is in the video playing scenario, step S4212 is performed, to begin to perform bullet screen statistics collection, and further determine whether the video application is currently in a bullet screen scenario in the video playing scenario. If it is determined in step S4211 that the video application is not in the video playing scenario, the process ends, that is, the frame rate decision-making module does not set the refresh rate again, and the display screen continues to refresh the displayed picture at the preset refresh rate corresponding to the video application mentioned in the process in FIG. 4a-1 and FIG. 4a-2.

It should be noted that, when the Surface Flinger determines in step S4211 that the video application is currently in the video playing scenario, the video playing scenario is not repeatedly determined again. Exemplarily, after it is determined in step S4211 that the video application is in the video playing scenario, if it is detected that the aforementioned view created in step S4209 is destructed, it is determined that the video application is currently not in the video playing scenario, and then information indicating that the video application is not in the video playing scenario may be sent to the frame rate decision-making module, so as to notify the frame rate decision-making module that it is determined that the video application is not in the video playing scenario and to set the target refresh rate to the preset refresh rate corresponding to the video application again.

S4212. The Surface Flinger determines to enable bullet screen statistics collection.

The Surface Flinger determines through step S4211 that the video application is currently in the video playing scenario, and therefore may determine to enable bullet screen statistics collection, so that the drawing and rendering module may begin to collect statistics on bullet screens when performing bullet screen drawing. By enabling bullet screen statistics collection, the Surface Flinger may further determine whether the video application is currently in the bullet screen scenario, and may determine a bullet screen range in the bullet screen scenario according to data of the bullet screen statistics collection. Specifically, after the Surface Flinger determines to enable bullet screen statistics collection, the drawing and rendering module may perform bullet screen statistics collection when drawing bullet screens. However, if the Surface Flinger does not determine to enable bullet screen statistics collection, the drawing and rendering module does not perform bullet screen statistics collection. For details, reference may be made to the related content of subsequent step S4213 to step S4221, and details are not described herein again.

Exemplarily, a manner of performing step S4212 by the Surface Flinger may be setting a state of bullet screen statistics collection to an enabled state by the Surface Flinger. For example, a state parameter of bullet screen statistics collection is modified into a parameter corresponding to the enabled state. A storage position of the bullet screen statistics collection state is not limited in this embodiment of this application.

In some other embodiments, the manner of performing step S4212 may be further as follows: The Surface Flinger sends information about enabling bullet screen statistics collection to the drawing and rendering module, so as to control the drawing and rendering module to enable bullet screen statistics collection.

S4213. The Surface Flinger determines whether bullet screen drawing information is received in a preset duration.

The bullet screen drawing information is related information about drawing bullet screens by the drawing and rendering module. Exemplarily, bullet screen drawing information of a current frame includes: the number of bullet screens of the current frame, a time stamp of the current frame, and drawn and rendered bullet screen data of the current frame. The bullet screen drawing information of the current frame may be understood as bullet screen drawing information of a current frame of displayed picture.

Specifically, if it is determined in step S4213 that the bullet screen drawing information is received in the preset duration, it is considered that the video application is in the bullet screen scenario. If it is determined in step S4213 that the bullet screen drawing information is not received in the preset duration, it is considered that the video application is not in the bullet screen scenario but only in the video scenario determined in step S4211, which may be understood as that the video application does not need to display bullet screens currently in the video playing process and step S4228 is performed. The bullet screen scenario may be understood as a scenario of displaying bullet screens in the video playing process.

Specifically, after the Surface Flinger determines through step S4211 that the video application is currently in the video scenario, bullet screen statistics collection is enabled in step S4212. Therefore, if the video application is currently in the bullet screen scenario, the drawing and rendering module performs bullet screen statistics collection and bullet screen drawing; and then obtains bullet screen drawing information of a current frame and sends the bullet screen drawing information to the Surface Flinger. Exemplarily, when the video application is in the bullet screen scenario, the video application invokes, with the rhythm of the Vsync signal corresponding to the preset refresh rate of the video application, the drawing and rendering module to perform bullet screen drawing and rendering and perform collect statistics on the number of drawn bullet screens, and then the drawing and rendering module sends bullet screen drawing information of a current frame to the Surface Flinger with the rhythm of the Vsync signal. Therefore, in the bullet screen scenario, the Surface Flinger receives the bullet screen drawing information with the rhythm of the Vsync signal.

When the Surface Flinger has received no bullet screen drawing information in a plurality of consecutive frames with the rhythm of the Vsync signal, it is determined that no bullet screen drawing information has been received in the preset duration, that is, it may be considered that the video application is currently not in the bullet screen scenario, but only in the video playing scenario. Exemplarily, when a time difference between a time stamp at which the Surface Flinger receives the bullet screen drawing information most recently and a time stamp of the current frame is greater than or equal to the preset duration, it is determined that no bullet screen drawing information has been received in the preset duration, and it is considered that the video application is currently not in the bullet screen scenario, but only in the video playing scenario.

However, if the Surface Flinger has received bullet screen drawing information in the preset duration, it may be considered that the video application is currently in the bullet screen scenario. Exemplarily, when the time difference between the time stamp at which the Surface Flinger receives the bullet screen drawing information most recently and the time stamp of the current frame is less than the preset duration, it may be determined that bullet screen drawing information has been received in the preset duration, and the video application is currently in the bullet screen scenario.

Exemplarily, the preset duration may be set according to an actual application scenario, experience, or the like. For example, the preset duration may be set to 5 seconds, and a specific setting manner of the preset duration is not limited in this embodiment of this application.

It should be noted that, S4213 may be a step that is repeatedly performed. For example, the Surface Flinger may confirm, with the rhythm of the Vsync signal corresponding to the current preset refresh rate, whether the bullet screen drawing information is received in the preset duration, so as to confirm in real time whether the video application is currently in the bullet screen scenario.

In some other embodiments, after it is determined in step S4211 that the video application is in the video playing scenario and before step S4213 is performed, the video playing scenario information may be further directly sent to the frame rate decision-making module, the frame rate decision-making module determines the target refresh rate according to the video playing scenario information and the video source frame rate and then sends the target refresh rate to the Surface Flinger, and the Surface Flinger controls display of the video playing interface at the target refresh rate. For a specific process and execution principle, reference may be made to subsequent step S4228 to step S4231, and details are not described herein again. After the Surface Flinger controls the display screen to refresh the displayed picture at the target refresh rate determined according to the video playing scenario information, step S4213 is performed. If it is determined that no bullet screen drawing information is received in the preset duration, the process may directly end, and it is not necessary to perform step S4228 to step S4231 again.

S4214. The video application invokes, with a rhythm of a Vsync signal, the drawing and rendering module to draw bullet screens.

The video application invokes, with the rhythm of the Vsync signal corresponding to the current actual refresh rate, the drawing and rendering module to draw bullet screens. Exemplarily, it can be known from the foregoing description in FIG. 4a-1 and FIG. 4a-2 that, after the video application is launched, the display screen refreshes the displayed picture at the preset refresh rate corresponding to the video application. Therefore, when needing to draw bullet screens, the video application may invoke, with the rhythm of the Vsync signal corresponding to the current preset refresh rate, the drawing and rendering module to perform bullet screen drawing. Bullet screens drawn by the video application may be understood as bullet screens of the video that the user needs to play.

Exemplarily, step S4214 may begin to be performed by triggering step S4213 after the video application receives an operation of clicking to enable bullet screens by the user, or step S4214 may begin to be performed by automatically triggering enabling of bullet screens of the video needing to be played after the operation of playing a video by the user is received in the foregoing step S4201. Exemplarily, as shown in FIG. 4c-(2), once the user clicks the bullet screen switch, the video application may be triggered to perform step S4214.

Exemplarily, when the video application invokes the drawing and rendering module to draw bullet screens, the drawing and rendering module may generate a textview (Textview) and a basecanvas (basecanvas), and complete bullet screen drawing with a function such as drawtext, Skia, HWUI, or OPEN GL ES. Exemplarily, for a drawing process of drawing bullet screens of each frame, each time a bullet screen needs to be drawn, the video application invokes the drawing and rendering module once to perform bullet screen drawing. It may be understood that, in a process of drawing bullet screens of a frame of picture, step S4214 may be repeatedly performed a plurality of times according to an actual bullet screen drawing requirement. The process in which the drawing and rendering module draws and renders bullet screens, and displays the bullet screens to the display screen of the electronic device may be completed by a plurality of modules collaboratively. For details, reference may be made to the process and technical principle of bullet screen drawing and rendering in the Android system.

It should be noted that, when and only when the video application needs to draw bullet screens in step S4214, the drawing and rendering module is invoked to perform bullet screen drawing. Therefore, if the video application does not need to draw bullet screens, for example, the user disables the bullet screen switch, or the video has no bullet screen, step S4214 is not performed, and then steps S4215 to S4218 are not performed either. Therefore, step S4214 is not a step that needs to be performed when each frame of picture is displayed. When and only when a frame of picture has a bullet screen drawing requirement, step S4214 is triggered, and a difference between specific manners of triggering step S4214 does not affect implementation of this embodiment of this application.

S4215. The drawing and rendering module determines whether bullet screen statistics collection is enabled.

If the drawing and rendering module determines to enable bullet screen statistics collection, it indicates that there is currently a requirement for collecting statistics on bullet screens, and therefore step S4215 is performed. If the drawing and rendering module determines not to enable bullet screen statistics collection, it indicates that there is currently no requirement for collecting statistics on bullet screens, and therefore the process may end, that is, bullet screen statistics collection is not performed, and subsequent step S4216 to step S4218 are not performed.

Exemplarily, the drawing and rendering module determines, by obtaining a state of bullet screen statistics collection, whether to enable bullet screen statistics collection. If bullet screen statistics collection is in an enabled state, bullet screen statistics collection is enabled. If bullet screen statistics collection is not in the enabled state, bullet screen statistics collection is not enabled. Because the Surface Flinger determines to enable bullet screen statistics collection in the foregoing step S4212, and determines the state of bullet screen statistics collection as the enabled state, the state of bullet screen statistics collection obtained by the drawing and rendering module when performing step S4215 is the enabled state, it is determined that bullet screen statistics collection is enabled, and step S4216 is performed.

In some embodiments, the state of bullet screen statistics collection may be set in the Surface Flinger, and the drawing and rendering module may obtain the state of bullet screen statistics collection from the Surface Flinger, to determine whether to enable bullet screen statistics collection. In some other embodiments, alternatively, when receiving information about enabling bullet screen statistics collection, the drawing and rendering module determines to enable bullet screen statistics collection; and when receiving no information about bullet screen statistics collection, the drawing and rendering module does not enable bullet screen statistics collection.

In some embodiments, the drawing and rendering module determines to enable bullet screen statistics collection, which may be understood as that the drawing and rendering module determines to enable collecting statistics on currently drawn bullet screens. Each time the video application invokes the drawing and rendering module to perform bullet screen drawing, the drawing and rendering module is triggered to enable collecting statistics on currently invoked bullet screens to be drawn.

In some embodiments, if it is determined in step S4215 that bullet screen statistics collection is enabled, a bullet screen counter may be initialized and launched, to cause the bullet screen counter to be in a state capable of performing counting work. Optionally, the bullet screen counter may be initialized and launched only once. In a current frame, if the drawing and rendering module is invoked a plurality of times, to correspondingly determine to enable bullet screen statistics collection a plurality of times, after the bullet screen counter is initialized and launched when it is initially determined that bullet screen statistics collection is enabled, because the bullet screen counter is in a launching state, the bullet screen counter may not be initialized and launched subsequently. Exemplarily, before the bullet screen counter is initialized and launched under the control of the drawing and rendering module, statistics is not collected on bullet screens, and statistics begins to be collected on the bullet screens drawn by the drawing and rendering module only after the bullet screen counter is initialized and launched. Exemplarily, the manner of initializing and launching the bullet screen counter by the drawing and rendering module may be as follows: The drawing and rendering module may send a launching signal to the bullet screen counter, and after receiving the launching signal, the bullet screen counter begins to collect statistics on the bullet screens drawn by the drawing and rendering module. The bullet screen counter may enter a low-power state or a sleep state after bullet screen drawing of a frame of picture ends, so as to reduce power consumption. When bullet screen drawing needs to be performed in a next frame, the drawing and rendering module initializes and launches the bullet screen counter again when determining to enable bullet screen statistics collection.

S4216. The drawing and rendering module controls the bullet screen counter to increase a count by one.

In step S4215, the drawing and rendering module determines to enable bullet screen statistics collection. Therefore, the drawing and rendering module is triggered to control the bullet screen counter to collect statistics on currently drawn bullet screens, so that the count of the bullet screen counter is increased by one, to complete statistics collection on the number of bullet screens currently drawn by the drawing and rendering module. The drawing and rendering module is invoked once to perform bullet screen drawing each time the video application needs to draw a bullet screen, and then the drawing and rendering module is triggered to perform steps S4215 to S4217. Therefore, the bullet screen counter can collect statistics on the number of bullet screens drawn in a current frame.

In some other embodiments, the drawing and rendering module may further control the bullet screen counter to collect statistics on the number of characters of a bullet screen needing to be drawn in a frame of picture, that is, control the count of the bullet screen counter to be added to the number of characters of a bullet screen that is currently invoked and drawn. It should be noted that, data related to bullet screens on which the bullet screen counter may collect statistics may be in many forms, including but not limited to the content proposed in this application.

Figure 4D:
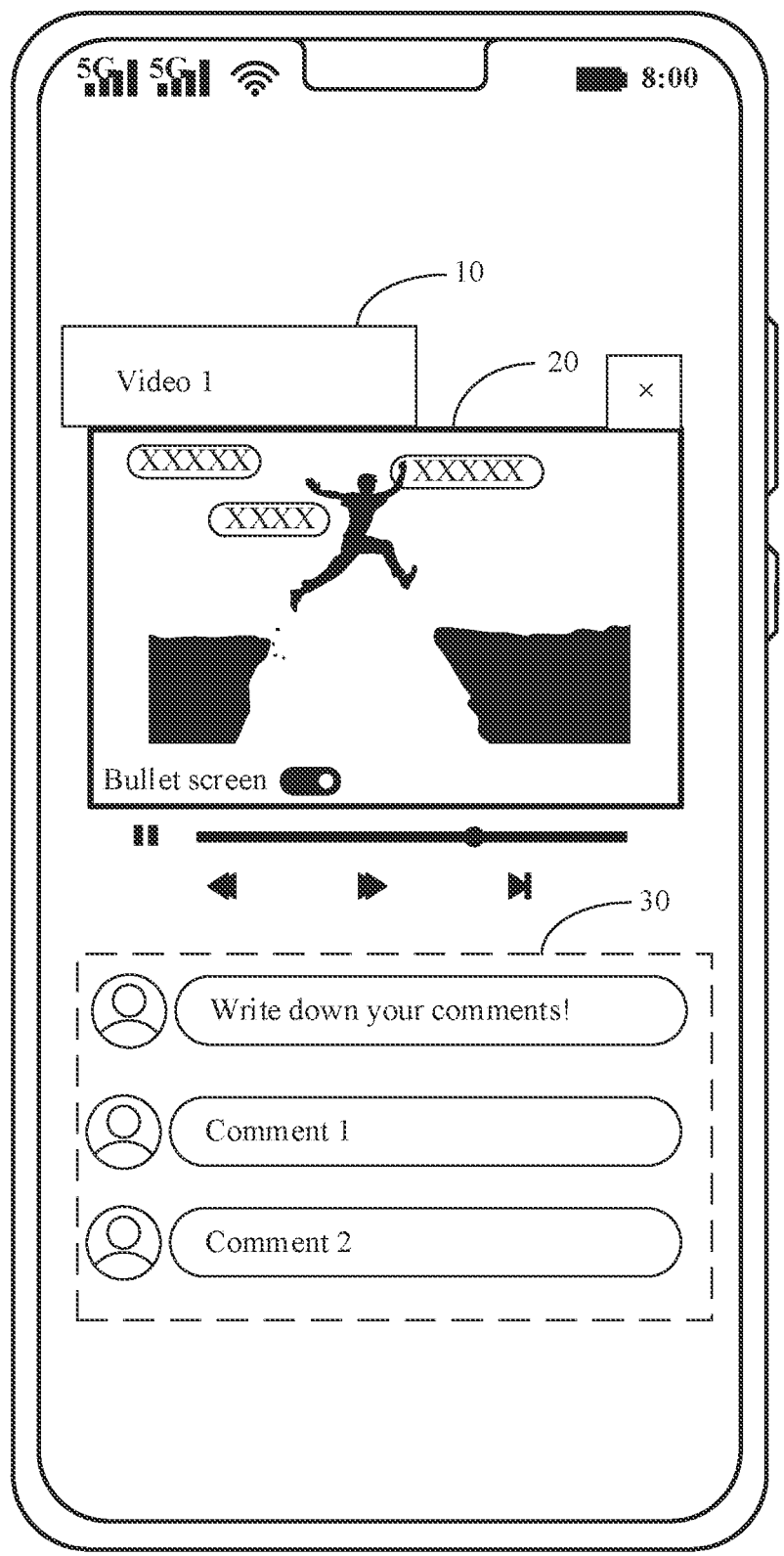
FIG. 4d is a schematic diagram 3 of a video playing scenario of a video application according to an embodiment of this application.

Exemplarily, in some embodiments, to improve precision of bullet screen data on which the bullet screen counter collects statistics, the drawing and rendering module may control the bullet screen counter to collect statistics on bullet screen data in a particular region, that is, collect statistics on bullet screens drawn in only the particular region. For example, as shown in FIG. 4d, on a video playing interface shown in FIG. 4d, to avoid collecting statistics on texts in such parts as a region 10 and a region 30 that are considered as bullet screens, the drawing and rendering module may control the bullet screen counter to collect statistics on texts in only a particular region 20, and then may eliminate interference from texts that are not bullet screens, and collect statistics to obtain accurate bullet screen data such as the number of bullet screens or the number of characters of a bullet screen.

S4217. The bullet screen counter increases the count by one.

Specifically, for each frame of picture, the bullet screen counter collects statistics on the number of bullet screens from zero, the drawing and rendering module is invoked to draw a bullet screen each time the video application performs step S4214, the drawing and rendering module determines to enable bullet screen statistics collection in step S4215, and controls the bullet screen counter to increase the count by one, and only when the drawing of bullet screens needing to be drawn in a current frame of picture is completed, statistics collection ends. That is, in a current frame of picture, if a plurality of bullet screens need to be drawn, step S4214 to step S4217 are repeatedly performed a plurality of times.

In some other embodiments, the bullet screen counter may further collect, under the control of the drawing and rendering module, statistics on the number of characters of bullet screens needing to be drawn in a frame of picture. It should be noted that, data related to bullet screens on which the bullet screen counter may collect statistics may be in many forms, including but not limited to the content proposed in this application.

Exemplarily, in some embodiments, after the bullet screen counter completes statistics collection on the number of bullet screens of a current frame of picture, the count of the bullet screen counter may be reset, and then counting may enable from zero again when statistics needs to be collected on the number of bullet screens in a frame of picture subsequently.

It should be noted that, step S4214 to step S4217 shown in this embodiment of this application are only an exemplary process of collecting statistics on the number of bullet screens, and the drawing and rendering module collects statistics on bullet screen data in a current frame such as the number of bullet screens or the number of characters of a bullet screen in many manners, including but not limited to the content in this embodiment of this application.

S4218. The drawing and rendering module sends bullet screen drawing information of a current frame to the Surface Flinger with the rhythm of the Vsync signal.

The drawing and rendering module sends the bullet screen drawing information of the current frame to the Surface Flinger with the rhythm of the Vsync signal corresponding to the current actual refresh rate. Exemplarily, after the process in FIG. 4a-1 and FIG. 4a-2 is performed, the current actual refresh rate of the electronic device is the preset refresh rate corresponding to the video application. Therefore, when step S4218 is performed, the drawing and rendering module may send the bullet screen drawing information of the current frame to the Surface Flinger with the rhythm of the Vsync signal corresponding to the preset refresh rate.

The bullet screen drawing information of the current frame includes: the number of bullet screens drawn in the current frame, a time stamp of the current frame, and drawn and rendered bullet screen data of the current frame. The number of bullet screens drawn in the current frame is the number of bullet screens that need to be drawn in a current frame of picture and on which the bullet screen counter collects statistics, the time stamp of the current frame is a time stamp corresponding to the current frame of picture, and the drawn and rendered bullet screen data is also drawn and rendered bullet screen data corresponding to the current frame of picture. Exemplarily, the bullet screen drawing information may further carry other information, for example, the package name of the video application, and the number of characters of bullet screens in a current frame on which the bullet screen counter collects statistics.

The drawing and rendering module sends the bullet screen drawing information of the current frame to the Surface Flinger with the rhythm of the Vsync signal at the preset refresh rate corresponding to the video application. It should be noted that, the drawing and rendering module may not need to send bullet screen drawing information to the Surface Flinger in each frame, and if the drawing and rendering module does not perform bullet screen drawing in a frame, the drawing and rendering module does not perform step S4214 to step S4217 in the frame either, so that no bullet screen drawing information is generated in the frame, and no bullet screen drawing information is sent to the Surface Flinger.

Exemplarily, the bullet screen counter in the drawing and rendering module may perform step S4218.

S4219. The Surface Flinger determines that the bullet screen drawing information is received in the preset duration, and stores the number of bullet screens drawn in the current frame and a time stamp.

Exemplarily, because the Surface Flinger receives the bullet screen drawing information of the current frame sent in step S4218, it is determined that the bullet screen drawing information is received currently in the preset duration, and it is considered that the video application is currently in the bullet screen scenario. Then, a bullet screen range in the bullet screen scenario may be determined by storing the number of bullet screens drawn in the current frame and the time stamp and using the number of bullet screens and the time stamp that are stored. For details, reference may be made to the subsequent description of step S4220 to step S4221, and details are not described herein again.

Exemplarily, the number of bullet screens in the bullet screen drawing information and the time stamp may be stored corresponding to each other, to record the number of bullet screens drawn in total at the time stamp. The number of bullet screens and the time stamp are stored in many manners. This is not limited in this embodiment of this application.

Exemplarily, the number of bullet screens and the time stamp may be stored in a table form. For example, as shown in Table 1, a time stamp of a first frame is 35257912694 ns, and the drawing and rendering module draws a total of 3 bullet screens in the first frame: a time stamp of a second frame is 35274579360 ns, and the drawing and rendering module draws a total of 2 bullet screens in the second frame: a time stamp of a third frame is 35291246026 ns, and the drawing and rendering module draws a total of 7 bullet screens in the third frame. The rest can be deduced by analogy, and the number of bullet screens drawn in each frame and a time stamp are recorded.

TABLE 1

| The number of bullet screens drawn in each frame | Time stamp (ns) |
|---|---|
| 3 | 35257912694 |
| 2 | 35274579360 |
| 7 | 35291246026 |
| ... | ... |

The drawn and rendered bullet screen data in the bullet screen drawing information is subsequently composed by the Surface Flinger and sent to the display screen for display. For the process of displaying bullet screen data, reference may be made to the foregoing related description of the process of sending image data for display in step S4110 to step S4113 in FIG. 4a-1 and FIG. 4a-2.

S4220. The Surface Flinger determines the total number of bullet screens displayed in the current frame according to the number of bullet screens, the time stamp, and a bullet screen aging time that are stored.

The bullet screen aging time refers to a bullet screen survival time. For each bullet screen, the time from the bullet screen begins to be displayed on the display screen until the bullet screen completely disappears is the bullet screen survival time, that is, the bullet screen aging time. In different scenarios, the bullet screen aging time may differ. For example, for a video without speed multiplication, the bullet screen aging time may be 5 seconds, and for a video with speed multiplication, the bullet screen aging time may be 3 seconds.

Exemplarily, the bullet screen aging time may be determined in a manner in which the Surface Flinger obtains the bullet screen aging time of the video needing to be played in the current video playing scenario. In some other embodiments, the bullet screen aging time may alternatively be a preset and fixed bullet screen aging time determined through experience, big data, or the like. That is, the bullet screen aging time is determined in many manners. This is not limited in this embodiment of this application.

The number of bullet screens, the time stamp, and the bullet screen aging time that are stored may be understood as the number of bullet screens drawn in each frame, a time stamp corresponding to each frame, and a bullet screen aging time corresponding to each frame that are stored.

The Surface Flinger may determine, according to the number of bullet screens, the time stamp, and the bullet screen aging time of each frame that are stored, the total number of bullet screens currently aged (that is, disappearing on the display screen), the total number of bullet screens displayed in the current frame may be obtained by subtracting the total number of aged bullet screens from the total number of stored bullet screens.

For example, as shown in the foregoing Table 1, when the bullet screen aging time is 5 seconds, and the current frame is the third frame, the stored total number of bullet screens may be calculated as: 3+2+7=12. The time from the first frame to the third frame is: 35291246026−35257912694=33333332 ns, that is, 0.033333332 seconds. Therefore, none of bullet screens drawn from the first frame to the third frame is aged, so that the total number of bullet screens displayed in the current frame is 12.

In some other embodiments, if the bullet screen drawing information sent to the Surface Flinger in step S4218 further includes the total number of characters of bullet screens of the current frame, the total number of characters of bullet screens needing to be displayed in the current frame may be further calculated according to the stored total number of characters of bullet screens. For example, after the total number of bullet screens displayed in the current frame is calculated through the foregoing description, the number of characters of bullet screens in the total number of bullet screens is calculated, and then the total number of characters of bullet screens needing to be displayed in the current frame is obtained.

When a larger total number of bullet screens need to be displayed, a higher screen refresh rate is required, and phenomena that rolling bullet screens are stalled and pictures are not fluent occur easily at an excessively low refresh rate. When a smaller total number of bullet screens need to be displayed, a lower refresh rate is required, and a relatively low refresh rate may ensure that pictures are fluently displayed.

S4221. The Surface Flinger determines a bullet screen range of the current frame according to the number of bullet screens drawn in the current frame and the total number of displayed bullet screens.

The bullet screen range is used for indicating an order-of-magnitude of a bullet screen density of the displayed picture displayed on the display screen. A larger number of bullet screens drawn in the current frame indicates a larger total number of displayed bullet screens, and it is considered that a larger number of bullet screens need to be displayed currently and the bullet screen density is large: otherwise, it is considered that a smaller number of bullet screens need to be displayed and the bullet screen density is small.

Exemplarily, the bullet screen range may include: a high bullet screen range or a low bullet screen range. The low bullet screen range is used to indicate that the bullet screen density of the current frame of picture is low. The high bullet screen range is used to indicate that the bullet screen density of the current frame is high. The process of performing step S4221 may be as follows: The bullet screen range is determined as the low bullet screen range in a case that the number of bullet screens drawn in the current frame is less than a first preset value and the total number of bullet screens displayed in the current frame is less than a second preset value. Otherwise, the bullet screen range is determined as the high bullet screen range in a case that the number of bullet screens drawn in the current frame is greater than or equal to the first preset value or the total number of bullet screens displayed in the current frame is greater than or equal to the second preset value. The first preset value and the second preset value may be set according to experience or the like. For example, the first preset value may be set to 2, and the second preset value may be set to 5.

In some other embodiments, in addition to being divided into such two bullet screen ranges as a high bullet screen range or a low bullet screen range, the bullet screen ranges may alternatively be divided into 3 bullet screen ranges, or a plurality of bullet screen ranges more than 3 bullet screen ranges are set. For example, the bullet screen range may include: a first bullet screen range, a second bullet screen range, or a third bullet screen range. Numbers of bullet screens represented by the first bullet screen range, the second bullet screen range, and the third bullet screen range progressively increase level by level.

In some other embodiments, if the bullet screen drawing information further includes the number of characters of bullet screens in the current frame, the bullet screen range may be further determined according to the number of characters of bullet screens in the current frame, and/or the total number of characters of bullet screens needing to be displayed in the current frame. A larger number of characters of bullet screens needing to be drawn in the current frame indicates a larger total number of characters of bullet screens needing to be displayed, and it is considered that a larger number of bullet screens need to be displayed currently; otherwise, it is considered that a smaller number of bullet screens need to be displayed.

In some other embodiments, to ensure that the determined bullet screen range is accurate, after the Surface Flinger determines the video playing scenario, when step S4221 is initially performed to determine the bullet screen range, the determining of the bullet screen range is first delayed by the preset duration. After the determining of the bullet screen range is delayed by the preset duration, some texts that are not bullet screens, for example, texts in a region 10 and a region 30 in FIG. 4d are considered as disappeared bullet screens having exceeding the bullet screen aging time, so that precision of calculating the total number of bullet screens displayed in a frame is not disturbed, and then the bullet screen range can be accurately determined.

It should be noted that, the bullet screen range of the current frame is determined according to the number of bullet screens drawn in the current frame and the total number of displayed bullet screens in many specific manners, including but not limited to the content proposed in this embodiment of this application.

It should be further noted that the aforementioned step S4219 to step S4221 may be performed in real time. Exemplarily, the bullet screen range of each frame may be determined by performing step S4219 to step S4221 with the Vsync rhythm corresponding to the preset refresh rate.

S4222. The Surface Flinger determines that bullet screen range information is changed.

The bullet screen range information is used to indicate a bullet screen range in the bullet screen scenario, and may specifically include a bullet screen range. Step S4222 may be understood as that the Surface Flinger determines whether bullet screen range information of the current frame is changed. Specifically, the bullet screen range of the current frame may be compared with a bullet screen range determined in a previous frame. If the bullet screen range of the current frame is different from the bullet screen range of the previous frame, it is determined that the bullet screen range information of the current frame is changed. If the bullet screen range determined in the current frame is the same as the bullet screen range of the previous frame, it is determined that the bullet screen range information of the current frame is not changed. Therefore, the process ends, and whether bullet screen range information of a next frame is changed continues to be determined.

It should be noted that, if the bullet screen range is initially determined in step S4221, the Surface Flinger also determines in step S4222 that the bullet screen range information is changed.

When it is determined in step S4222 that the bullet screen range information is changed, step S4223 is triggered. If the Surface Flinger determines that the bullet screen range information is not changed, step S4223 may not be performed.

S4223. The Surface Flinger sends the bullet screen range information to the frame rate decision-making module.

The bullet screen range information can be used to indicate that the video application is currently in the bullet screen scenario and the bullet screen range in the current bullet screen scenario, and then the frame rate decision-making module may adjust the target refresh rate according to the bullet screen range, so as to meet a display requirement in the current bullet screen range. In addition to the bullet screen range of the current frame, the bullet screen range information may further include other information, and may include, for example, information such as the package name of the video application or the video source frame rate, and information included in the bullet screen range information is not limited in this embodiment of this application.

Exemplarily, step S4223 may be performed when and only when the bullet screen range information is changed, that is, if step S4222 is not performed, that is, the bullet screen range information of the current frame is not changed, step S4223 may not be triggered. Because the Surface Flinger may send the bullet screen range information to the frame rate decision-making module only when it is determined that the bullet screen range information is changed, and does not need to send the bullet screen range information of the current frame to the frame rate decision-making module in real time, power consumption may be reduced.

For example, if the bullet screen range determined in the current frame is a high bullet screen range, while a bullet screen range determined last time is a low bullet screen range, it is necessary to send information about the high bullet screen range to the frame rate decision-making module. In another example, when the Surface Flinger initially determines the bullet screen range, it is also necessary to send the bullet screen range information to the frame rate decision-making module.

S4224. The frame rate decision-making module determines a target refresh rate according to the bullet screen range information.

The frame rate decision-making module may determine, according to refresh rate switching information, that the video application is currently in the bullet screen scenario and the bullet screen range in the bullet screen scenario. Then, the target refresh rate may be adjusted according to the bullet screen range information.

Exemplarily, a corresponding preset refresh rate may be allocated to each bullet screen range in advance. A higher bullet screen range indicates a larger number of bullet screens needing to be displayed and a higher corresponding preset refresh rate. For example, the preset refresh rate corresponding to the low bullet screen range may be set to 30 Hz, and the preset refresh rate corresponding to the high bullet screen range may be set to 40 Hz. In some embodiments, to cause the refresh rate determined according to the bullet screen range to be applicable to the current video application, the refresh rate determined according to the bullet screen range may be caused to be less than or equal to the preset refresh rate corresponding to the video application and greater than or equal to the video source frame rate at which the video application plays the video.

The target refresh rate is determined according to the bullet screen range information in many manners. For example, the target refresh rate may be further calculated with the bullet screen range information through a specific calculation rule, and a specific implementation of step S4224 is not limited in this embodiment of this application.

S4225. The frame rate decision-making module sends the target refresh rate to the Surface Flinger.

In some embodiments, to reduce power consumption, the target refresh rate may be sent to the Surface Flinger when the target refresh rate determined by the frame rate decision-making module is changed.

In some other embodiments, a most recently determined target refresh rate may alternatively be sent to the Surface Flinger with a preset frequency.

S4226. The Surface Flinger controls display of the video playing interface at the target refresh rate.

Specifically, the Surface Flinger draws and renders the view of the video playing interface mentioned in step S4209, to obtain the drawn and rendered view of the video playing interface, then performs view composition processing on the drawn and rendered view of the video playing interface and the drawn and rendered bullet screen data received in S4218, and transfers composed data at the target refresh rate to the display screen for display, so that the display screen refreshes and displays the video playing interface at the target refresh rate.

For the process of controlling display of the video playing interface by the Surface Flinger, reference may be made to the foregoing process of drawing and rendering the video application home screen in step S4110 to step S4113 in FIG. 4a-1 and FIG. 4a-2. A main difference is that the target refresh rate in this case is the refresh rate determined according to the bullet screen range information instead of the preset refresh rate corresponding to the video application, and the bullet screen interface played by the video instead of the video application home screen is displayed.

For example, as shown in FIG. 4c-(1), FIG. 4c-(2), FIG. 4c-(3), FIG. 4c-(4), FIG. 4c-(5), and FIG. 4c-(6), in FIG. 4c-(1), the user clicks the video 1 on the video application home screen, to trigger the process shown in FIG. 4b-1, FIG. 4b-2, FIG. 4b-3, and FIG. 4b-4, it may be determined through step S4201 to step S4212 that the video application is currently in the video playing scenario, and the Surface Flinger also determines to enable bullet screen statistics collection. In this case, the picture of the display interface is changed into FIG. 4c-(2). Because the Surface Flinger determines the bullet screen range information only after the preset duration, the original refresh rate 60 Hz is still maintained at the time of just entering the playing interface of the video 1 shown in FIG. 4c-(2), and the refresh rate is not changed. Still referring to FIG. 4c-(2), the user clicks a bullet screen switch, to enable the bullet screen switch and trigger step S4213 to step S4226. After the time is delayed by the preset duration, it is determined that the bullet screen range is the low bullet screen range, to switch to the refresh rate 30 Hz in the low bullet screen range, and the display interface is changed into FIG. 4c-(3). As shown in FIG. 4c-(3), the number of displayed bullet screens is 3, which is in a state of the low bullet screen range, and the display interface is refreshed and displayed at the refresh rate of 30 Hz.

In this embodiment of this application, the Surface Flinger can determine the bullet screen range information according to the number of bullet screens drawn in the current frame and the total number of bullet screens displayed in the current frame, and then can send the refresh rate switching information carrying the bullet screen range information to the frame rate decision-making module, so that the frame rate decision-making module may adjust the target refresh rate according to the bullet screen range, which can meet a requirement for the refresh rate in the bullet screen scenario, and can avoid a case that the refresh rate is excess and power is wasted while meeting a picture fluency requirement.

It should be noted that, because bullet screens displayed in each frame of picture need to be continuously drawn, the number of bullet screens and time stamps stored in the Surface Flinger are also continuously increased, and it is also necessary to continuously perform step S4213 and step S4221, to determine a bullet screen range of a most recent frame, that is, it may be understood as that the Surface Flinger determines a most recent bullet screen range in real time. In some embodiments, the bullet screen range information may be determined only when step S4222 is performed, that is, it is determined that the bullet screen range is changed (for example, different from a bullet screen range determined in a previous frame), so as to notify the frame rate decision-making module to adjust the target refresh rate again.

For example, as shown in the scenario shown in FIG. 4c-(3), the number of bullet screens on the video 1 is less, and the bullet screen range is a low bullet screen range. However, after the video 1 has been played for a period of time, the number of displayed bullet screens calculated by the Surface Flinger in the mobile phone through step S4220 is increased, the number of bullet screens needing to be drawn is also increased, and then the bullet screen range determined in step S4221 is changed into a high bullet screen range. Therefore, the refresh rate is switched again, and after the picture of the video 1 is changed from FIG. 4c-(3) into FIG. 4c-(4), it may be seen that the number of bullet screens on FIG. 4c-(4) is evidently increased compared with (3). In this case, the displayed picture is refreshed at the refresh rate 40 Hz in the high bullet screen range after switching.

S4227. The Surface Flinger determines that no bullet screen drawing information is received in the preset duration.

After step S4226 is performed, the Surface Flinger always refreshes the display screen at the target refresh rate determined according to the bullet screen range information. However, in the process of performing step S4226, the Surface Flinger also repeatedly performs step S4213, that is, whether the video application is still currently in the bullet screen scenario is determined by determining whether bullet screen drawn information is received in the preset duration.

When the Surface Flinger determines that no bullet screen drawing information is received in the preset duration, which may also be understood as that no bullet screen drawing information is received beyond the preset duration, the Surface Flinger determines that the video application is not in the bullet screen scenario anymore, but is changed into being in the video playing scenario. Therefore, it is necessary to perform step S4228, to notify the frame rate decision-making module that the current scenario is changed into the video playing scenario.

Exemplarily, if the user disables bullet screens or a series of cases that bullet screens do not need to be drawn such as a case that bullet screens do not need to be displayed exist in the video playing process, the Surface Flinger receives no bullet screen drawing information in a plurality of consecutive frames, and therefore step S4214 to step S4218 are not performed in the plurality of consecutive frames. When the Surface Flinger receives no bullet screen drawing information beyond the preset duration, it indicates that the video application is not in the bullet screen scenario anymore, but is still in the video playing scenario under the foregoing determining of step S4211 in this case. Therefore, it is determined that the video application is currently in only the video playing scenario, but not in the bullet screen scenario.

The scenario determined by the Surface Flinger needs to be changed from the bullet screen scenario into the video playing scenario, and scenario information is changed. Therefore, step S4228 may be performed, to send the refresh rate switching information carrying the video playing scenario to the frame rate decision-making module again, and the frame rate decision-making module determines the target refresh rate again according to the video playing scenario and the video source frame rate, so that the display screen of the electronic device refreshes the picture at the refresh rate in the video playing scenario.

S4228. The Surface Flinger sends video playing scenario information to the frame rate decision-making module.

In a case that it is determined through the foregoing step S4213 that the video application is in only the video playing scenario but not in the bullet screen scenario, or in a case that it is determined through step S4227 that the video application is changed from the original bullet screen scenario into the video playing scenario, the Surface Flinger notifies, in a manner of sending the video playing scenario information to the frame rate decision-making module, the frame rate decision-making module that the current scenario is the video playing scenario, so that the frame rate decision-making module may reset the target refresh rate according to the video playing scenario information.

The video playing scenario information is used to indicate that the video application is currently in the video playing scenario. The Surface Flinger sends the video playing scenario information to the frame rate decision-making module, so as to notify the frame rate decision-making module that the video application is currently in the video playing scenario, and therefore the frame rate decision-making module needs to reset a target refresh rate applicable to the video playing scenario. A specific representation form of the video playing scenario information is not limited in this embodiment of this application. For example, the video playing scenario information may be represented with a particular symbol or a particular field.

S4229. The frame rate decision-making module determines a target refresh rate according to the video playing scenario information and the video source frame rate.

After receiving the video playing scenario information, the frame rate decision-making module may determine that the video application is currently in the video playing scenario. Exemplarily, in the video playing scenario, the frame rate decision-making module may determine the target refresh rate according to the video source frame rate. For example, the target refresh rate may be set to the video source frame rate. In another example, the target refresh rate may be calculated with a refresh rate calculating rule in the video playing scenario according to the video source frame rate.

In some other embodiments, if other video source information such as video resolution is further sent in step S4207 in addition to the video source frame rate, the target refresh rate may be further determined with reference to the other video source information. A specific process of determining the target refresh rate according to the video source frame rate is not limited in this embodiment.

Because the video source frame rate can indicate a requirement of the video needing to be currently played for the refresh rate, the target refresh rate determined with the video source frame rate in the video playing scenario can meet a requirement of the current video playing scenario.

In some other embodiments, the target refresh rate may be further determined according to only the video playing scenario information. Exemplarily, the preset refresh rate corresponding to the video playing scenario may be stored in advance, and when receiving the video playing scenario information, the frame rate decision-making module sets the target refresh rate to the preset refresh rate corresponding to the video playing scenario. For example, if the preset refresh rate corresponding to the video playing scenario is 48 Hz, and the preset refresh rate corresponding to the video application is 60 Hz, the frame rate decision-making module adjusts, in the process of performing step S4229, the target refresh rate from original 60 Hz to 48 Hz.

S4230. The frame rate decision-making module sends the target refresh rate to the Surface Flinger.

For an execution process and a principle of step S4230, reference may be made to the aforementioned step S4225. A main difference is that the target refresh rate determined in step S4225 is related to the bullet screen range, while the refresh rate determined in step S4230 is related to the video playing scenario.

S4231. The Surface Flinger controls display of the video playing interface at the target refresh rate.

For an execution process and a principle of step S4231, reference may be made to the foregoing description of step S4226. A main difference is that the target refresh rate in step S4226 is determined according to the bullet screen range, while the target refresh rate in step S4231 is determined according to the video playing scenario. Details are not described herein again.

Specifically, for example, as shown in FIG. 4c-(4), a scenario of a high bullet screen range is presented on the playing interface of the video 1. In this case, when the user selects to disable the bullet screen switch, step S4227 to step S4231 are triggered, to determine that the video application is currently not in the bullet screen scenario but only in the video playing scenario, and then complete refresh rate switching, and the picture displayed on the display screen is changed into FIG. 4c-(5). In this case, the bullet screen switch is disabled, no bullet screen exists on the playing interface of the video 1, and the mobile phone refreshes the displayed picture at the refresh rate 24 Hz in the video playing scenario.

In some other embodiments, if the video application does not perform video playing anymore, the Surface Flinger detects that the view in step S4209 is destructed, and then the Surface Flinger determines that the video application is not in the video playing scenario. In this case, the determined scenario information is changed again. Therefore, the video playing scenario information may be sent to the frame rate decision-making module again, and the frame rate decision-making module may adjust the target refresh rate again, for example, set the target refresh rate to the preset refresh rate corresponding to the video application. Exemplarily, when determining that the video application is not in the video playing scenario, the Surface Flinger may further determine to disable bullet screen statistics collection, and then the drawing and rendering module stops bullet screen statistics collection.

For example, as shown in FIG. 4c-(5), when the user clicks an icon "←", to close the playing interface of the video 1, the mobile phone may determine that the video application is not in the video playing scenario. Because of scenario change, refresh rate switching is performed again. Specifically, the displayed picture is changed into FIG.

4c-(6), and the video application returns to the video application home screen, and switches to the preset refresh rate 60 Hz corresponding to the video application to refresh the picture.

In this embodiment of this application, the Surface Flinger can determine, according to the view information corresponding to the video playing interface, and/or information about an invoking party, whether the video application is in the video playing scenario, and then can send, when the video application is in the video playing scenario, the refresh rate switching information to the frame rate decision-making module, so that the frame rate decision-making module adjusts the target refresh rate again, and the target refresh rate determined according to the video playing scenario can meet a performance requirement of the electronic device, and can avoid a case that the refresh rate is excess and power is wasted while meeting a video playing display requirement.

FIG. 4e-1, FIG. 4e-2, FIG. 4e-3, and FIG. 4e-4 is a schematic diagram of a video playing stage process of any video application in a refresh rate setting method according to another embodiment of this application, applied to the electronic device proposed in the embodiments of this application. The process shown in FIG. 4e-1, FIG. 4e-2, FIG. 4e-3, and FIG. 4e-4 may begin to be performed after the process shown in FIG. 4a-1 and FIG. 4a-2 is completed and the video application home screen of the video application is displayed. In this case, a video application home screen of only one video application is displayed at a front end of the electronic device. A specific video playing stage process includes the following steps:

S4301. A video application delivers a request of launching a video playing Activity to an AMS in response to an operation of playing a video by a user.

For an execution process and a principle of step S4301, reference may be made to the foregoing step S4201 shown in FIG. 4b-1, FIG. 4b-2, FIG. 4b-3, and FIG. 4b-4, and details are not described herein again.

S4302. The AMS launches a video playing Activity.

For an execution process and a principle of step S4302, reference may be made to the foregoing step S4202 shown in FIG. 4b-1, FIG. 4b-2, FIG. 4b-3, and FIG. 4b-4, and details are not described herein again.

S4303. The AMS sends window information corresponding to the video playing interface to the WMS.

For an execution process and a principle of step S4303, reference may be made to the foregoing step S4203 shown in FIG. 4b-1, FIG. 4b-2, FIG. 4b-3, and FIG. 4b-4, and details are not described herein again.

S4304. The WMS creates a window of the video playing interface according to the window information corresponding to the video playing interface.

For an execution process and a principle of step S4304, reference may be made to the foregoing step S4204 shown in FIG. 4b-1, FIG. 4b-2, FIG. 4b-3, and FIG. 4b-4, and details are not described herein again.

S4305. The WMS sends window creation completed information to the video application.

For an execution process and a principle of step S4305, reference may be made to the foregoing step S4205 shown in FIG. 4b-1, FIG. 4b-2, FIG. 4b-3, and FIG. 4b-4, and details are not described herein again.

S4306. The video application invokes a Media Codec to perform video decoding.

For an execution process and a principle of step S4306, reference may be made to the foregoing step S4206 shown in FIG. 4b-1, FIG. 4b-2, FIG. 4b-3, and FIG. 4b-4, and details are not described herein again.

S4307. The Media Codec sends a video source frame rate and information about being invoked to a frame rate decision-making module.

The video source frame rate refers to a video source frame rate of the video that the user needs to play. Because the Media Codec invoked by the video application performs video decoding on the video that the user needs to play in step S4306, the Media Codec obtains the video source frame rate of the video through a video source of the video that the user needs to play. In some other embodiments, the Media Codec may further obtain information about the video source of the video, such as resolution.

The information about being invoked is used for indicating that the Media Codec is invoked. In some embodiments, the information about being invoked may carry a package name of the video application, so as to indicate that the Media Codec is invoked by the video application. Specifically, because the Media Codec invoked by the video application performs video decoding in step S4306, the Media Codec may obtain, when invoked by the video application, the package name of the video application, and then the information about being invoked may carry the package name of the video application.

In some other embodiments, the information about being invoked may alternatively not carry the package name of the video application. Because an interface of only a single video application is displayed at a front end in the scenario shown in FIG. 4c-(1), FIG. 4c-(2), FIG. 4c-(3), FIG. 4c-(4), FIG. 4c-(5), and FIG. 4c-(6), the information about being invoked may alternatively not indicate an application invoking the Media Codec.

S4308. The frame rate decision-making module sends the information about being invoked to a Surface Flinger.

The information about being invoked is used for indicating that the Media Codec is invoked. In some other embodiments, the frame rate decision-making module may further send video source information such as the video source frame rate or video resolution to the Surface Flinger.

S4309. The WMS sends view information corresponding to the window of the video playing interface to a Surface Flinger.

For an execution process and a principle of step S4309, reference may be made to the foregoing step S4208 shown in FIG. 4b-1, FIG. 4b-2, FIG. 4b-3, and FIG. 4b-4, and details are not described herein again.

S4310. The Surface Flinger creates a view corresponding to the window of the video playing interface according to the view information corresponding to the window of the video playing interface.

For an execution process and a principle of step S4310, reference may be made to the foregoing step S4209 shown in FIG. 4b-1, FIG. 4b-2, FIG. 4b-3, and FIG. 4b-4, and details are not described herein again.

S4311. The Surface Flinger determines, according to a package name in the view information, whether the video application is in a playing whitelist.

For an execution process and a principle of step S4311, reference may be made to the foregoing step S4210 shown in FIG. 4b-1, FIG. 4b-2, FIG. 4b-3, and FIG. 4b-4, and details are not described herein again.

S4312. The Surface Flinger determines whether the video application is in a video playing scenario according to the view information corresponding to the window of the video playing interface.

If it is determined in step S4312 that the video application is in the video playing scenario, step S4313 is performed. If it is determined that the video application is not in the video playing scenario, the process ends, and the displayed picture continues to be refreshed at the preset refresh rate corresponding to the video application.

For an execution process and a principle of step S4312, reference may be made to the foregoing step S4211 shown in FIG. 4b-1, FIG. 4b-2, FIG. 4b-3, and FIG. 4b-4, and details are not described herein again.

S4313. The Surface Flinger determines, according to the information about being invoked, that the video application invokes the Media Codec.

The Surface Flinger receives the information about being invoked in step S4308, and the information about being invoked can indicate that the Media Codec is invoked, to further verify that there is currently a video playing requirement. Therefore, the video application invokes the Media Codec to perform video decoding. Moreover, with reference to step S4312 in which it is determined that the video application is currently in the video playing scenario, the Surface Flinger verifies again through step S4313 that the video application is currently in the video playing scenario, and then may further perform step S4314, so as to determine whether the video application is currently in the bullet screen scenario in the video playing scenario.

In some embodiments, if the Surface Flinger has not received the information about being invoked, that is, cannot determine whether the video application invokes the Media Codec, the Surface Flinger cannot verify whether the video application is currently in the video playing scenario. Therefore, the process may end, and subsequent step S4314 is not performed.

In some other embodiments, after it is determined in step S4313 that the video application invokes the Media Codec, to verify that the video application is currently in the video playing scenario and before step S4314 is performed, the video playing scenario information may be further directly sent to the frame rate decision-making module, the frame rate decision-making module determines the target refresh rate according to the video playing scenario information and the video source frame rate and then sends the target refresh rate to the Surface Flinger, and the Surface Flinger controls display of the video playing interface at the target refresh rate. For a specific process and execution principle, reference may be made to subsequent step S4330 to step S4333, and details are not described herein again. After the Surface Flinger controls the display screen to refresh the displayed picture at the target refresh rate determined according to the video playing scenario information, step S4314 begins to be performed. If it is determined in step S4315 that information about performing bullet screen drawing by the video application is not received in the preset duration, the process may directly end, and it is not necessary to perform step S4330 to step S4333 again.

In this embodiment of this application, the Surface Flinger is assisted through the information about being invoked in verifying that the video application is in the video playing scenario, thereby improving recognition accuracy of the video playing scenario.

S4314. The Surface Flinger determines to enable bullet screen statistics collection.

It is verified again in step S4313 that the video application is currently in the video playing scenario. Therefore, the Surface Flinger may determine to enable bullet screen statistics collection, so that the drawing and rendering module may begin to collect statistics on bullet screens when performing bullet screen drawing. By enabling bullet screen statistics collection, the Surface Flinger may further determine whether the video application is currently in the bullet screen scenario, and may determine a bullet screen range in the bullet screen scenario according to data of the bullet screen statistics collection.

For an execution process and a principle of step S4314, reference may be made to the foregoing step S4212 shown in FIG. 4b-1, FIG. 4b-2, FIG. 4b-3, and FIG. 4b-4, and details are not described herein again.

S4315. The Surface Flinger determines whether bullet screen drawing information is received in a preset duration.

For an execution process and a principle of step S4315, reference may be made to the foregoing step S4213 shown in FIG. 4b-1, FIG. 4b-2, FIG. 4b-3, and FIG. 4b-4, and details are not described herein again.

S4316. The video application invokes, with a rhythm of a Vsync signal, the drawing and rendering module to draw bullet screens.

For an execution process and a principle of step S4316, reference may be made to the foregoing step S4214 shown in FIG. 4b-1, FIG. 4b-2, FIG. 4b-3, and FIG. 4b-4, and details are not described herein again.

S4317. The drawing and rendering module determines whether bullet screen statistics collection is enabled.

For an execution process and a principle of step S4317, reference may be made to the foregoing step S4215 shown in FIG. 4b-1, FIG. 4b-2, FIG. 4b-3, and FIG. 4b-4, and details are not described herein again.

S4318. The drawing and rendering module controls the bullet screen counter to increase a count by one.

For an execution process and a principle of step S4318, reference may be made to the foregoing step S4216 shown in FIG. 4b-1, FIG. 4b-2, FIG. 4b-3, and FIG. 4b-4, and details are not described herein again.

S4319. The bullet screen counter increases the count by one.

For an execution process and a principle of step S4319, reference may be made to the foregoing step S4217 shown in FIG. 4b-1, FIG. 4b-2, FIG. 4b-3, and FIG. 4b-4, and details are not described herein again.

S4320. The drawing and rendering module sends bullet screen drawing information of a current frame to the Surface Flinger with the rhythm of the Vsync signal.

For an execution process and a principle of step S4320, reference may be made to the foregoing step S4218 shown in FIG. 4b-1, FIG. 4b-2, FIG. 4b-3, and FIG. 4b-4, and details are not described herein again.

S4321. The Surface Flinger determines that the bullet screen drawing information is received in the preset duration, and stores the number of bullet screens drawn in the current frame and a time stamp.

For an execution process and a principle of step S4321, reference may be made to the foregoing step S4219 shown in FIG. 4b-1, FIG. 4b-2, FIG. 4b-3, and FIG. 4b-4, and details are not described herein again.

S4322. The Surface Flinger determines the total number of bullet screens displayed in the current frame according to the number of bullet screens, the time stamp, and a bullet screen aging time that are stored.

For an execution process and a principle of step S4322, reference may be made to the foregoing step S4220 shown in FIG. 4b-1, FIG. 4b-2, FIG. 4b-3, and FIG. 4b-4, and details are not described herein again.

S4323. The Surface Flinger determines a bullet screen range of the current frame according to the number of bullet screens drawn in the current frame and the total number of displayed bullet screens.

For an execution process and a principle of step S4323, reference may be made to the foregoing step S4221 shown in FIG. 4*b*-1, FIG. 4*b*-2, FIG. 4*b*-3, and FIG. 4*b*-4, and details are not described herein again.

S4324. The Surface Flinger determines that bullet screen range information is changed.

For an execution process and a principle of step S4324, reference may be made to the foregoing step S4222 shown in FIG. 4*b*-1, FIG. 4*b*-2, FIG. 4*b*-3, and FIG. 4*b*-4, and details are not described herein again.

S4325. The Surface Flinger sends the bullet screen range information to the frame rate decision-making module.

For an execution process and a principle of step S4325, reference may be made to the foregoing step S4223 shown in FIG. 4*b*-1, FIG. 4*b*-2, FIG. 4*b*-3, and FIG. 4*b*-4, and details are not described herein again.

S4326. The frame rate decision-making module determines a target refresh rate according to the bullet screen range information.

For an execution process and a principle of step S4326, reference may be made to the foregoing step S4224 shown in FIG. 4*b*-1, FIG. 4*b*-2, FIG. 4*b*-3, and FIG. 4*b*-4, and details are not described herein again.

S4327. The frame rate decision-making module sends the target refresh rate to the Surface Flinger.

For an execution process and a principle of step S4327, reference may be made to the foregoing step S4225 shown in FIG. 4*b*-1, FIG. 4*b*-2, FIG. 4*b*-3, and FIG. 4*b*-4, and details are not described herein again.

S4328. The Surface Flinger controls display of the video playing interface at the target refresh rate.

For an execution process and a principle of step S4328, reference may be made to the foregoing step S4226 shown in FIG. 4*b*-1, FIG. 4*b*-2, FIG. 4*b*-3, and FIG. 4*b*-4, and details are not described herein again.

S4329. The Surface Flinger determines that no bullet screen drawing information is received in the preset duration.

For an execution process and a principle of step S4329, reference may be made to the foregoing step S4227 shown in FIG. 4*b*-1, FIG. 4*b*-2, FIG. 4*b*-3, and FIG. 4*b*-4, and details are not described herein again.

S4330. The Surface Flinger sends video playing scenario information to the frame rate decision-making module.

For an execution process and a principle of step S4330, reference may be made to the foregoing step S4228 shown in FIG. 4*b*-1, FIG. 4*b*-2, FIG. 4*b*-3, and FIG. 4*b*-4, and details are not described herein again.

S4331. The frame rate decision-making module determines a target refresh rate according to the video playing scenario information and the video source frame rate.

For an execution process and a principle of step S4331, reference may be made to the foregoing step S4229 shown in FIG. 4*b*-1, FIG. 4*b*-2, FIG. 4*b*-3, and FIG. 4*b*-4, and details are not described herein again.

S4332. The frame rate decision-making module sends the target refresh rate to the Surface Flinger.

For an execution process and a principle of step S4332, reference may be made to the foregoing step S4230 shown in FIG. 4*b*-1, FIG. 4*b*-2, FIG. 4*b*-3, and FIG. 4*b*-4, and details are not described herein again.

S4333. The Surface Flinger controls display of the video playing interface at the target refresh rate.

For an execution process and a principle of step S4333, reference may be made to the foregoing step S4231 shown in FIG. 4*b*-1, FIG. 4*b*-2, FIG. 4*b*-3, and FIG. 4*b*-4, and details are not described herein again.

It should be noted that, for descriptions of functions and technical principles of the Launcher, the video application, the drawing and rendering module, the AMS, the WMS, the Media Codec, the frame rate decision-making module, and the Surface Flinger mentioned in FIG. 4*a*-1 and FIG. 4*a*-2, FIG. 4*b*-1, FIG. 4*b*-2, FIG. 4*b*-3, and FIG. 4*b*-4, and FIG. 4*c*-(1), FIG. 4*c*-(2), FIG. 4*c*-(3), FIG. 4*c*-(4), FIG. 4*c*-(5), and FIG. 4*c*-(6), reference may be made to the related content shown in FIG. 3.

To describe the solutions more concisely, the video application in the embodiments of this application is briefly referred to as an application. In this application, the first refresh rate is used to refer to the preset refresh rate corresponding to the application, the second refresh rate is used to refer to the refresh rate determined by the frame rate decision-making module in the bullet screen scenario, and the third refresh rate is used to refer to the refresh rate determined by the frame rate decision-making module in the video playing scenario. Interfaces such as the video playing interface and the application home screen outputted by the application on the display screen and mentioned in the embodiments of this application are collectively referred to as application interfaces of the application. The view corresponding to the window of the video playing interface mentioned in the embodiments of this application is also briefly referred to as the view of the video playing interface, and the view corresponding to the window of the application home screen is also briefly referred to as the view of the application home screen.

It can be known from the foregoing descriptions in FIG. 4*a*-1 and FIG. 4*a*-2, FIG. 4*b*-1. FIG. 4*b*-2. FIG. 4*b*-3, and FIG. 4*b*-4, and FIG. 4*e*-1, FIG. 4*e*-2, FIG. 4*e*-3, and FIG. 4*e*-4 that, in step S4101 to step S4113 shown in FIG. 4*a*-1 and FIG. 4*a*-2 of the embodiments of this application, the electronic device refreshes and displays the application interface of the application at the first refresh rate after responding to receiving an operation of launching the application by a user. The first refresh rate may be a preset refresh rate corresponding to the application. The refreshing and displaying the application interface of the application at the first refresh rate in response to receiving an operation of launching the application by a user is implemented in many manners, including but not limited to the content proposed in the embodiments of this application.

Figures 1, 4E:
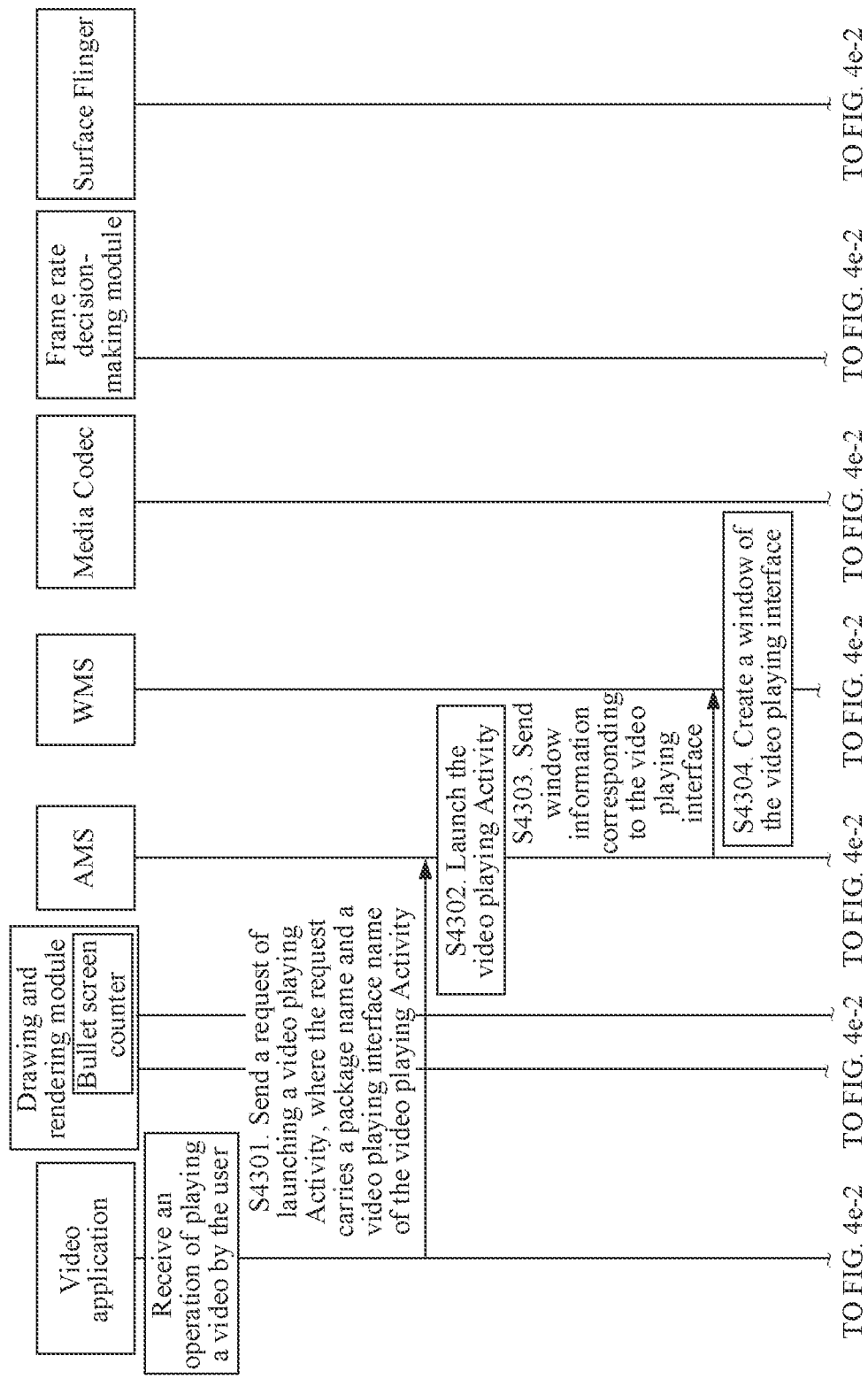
Figures 2, 4E:
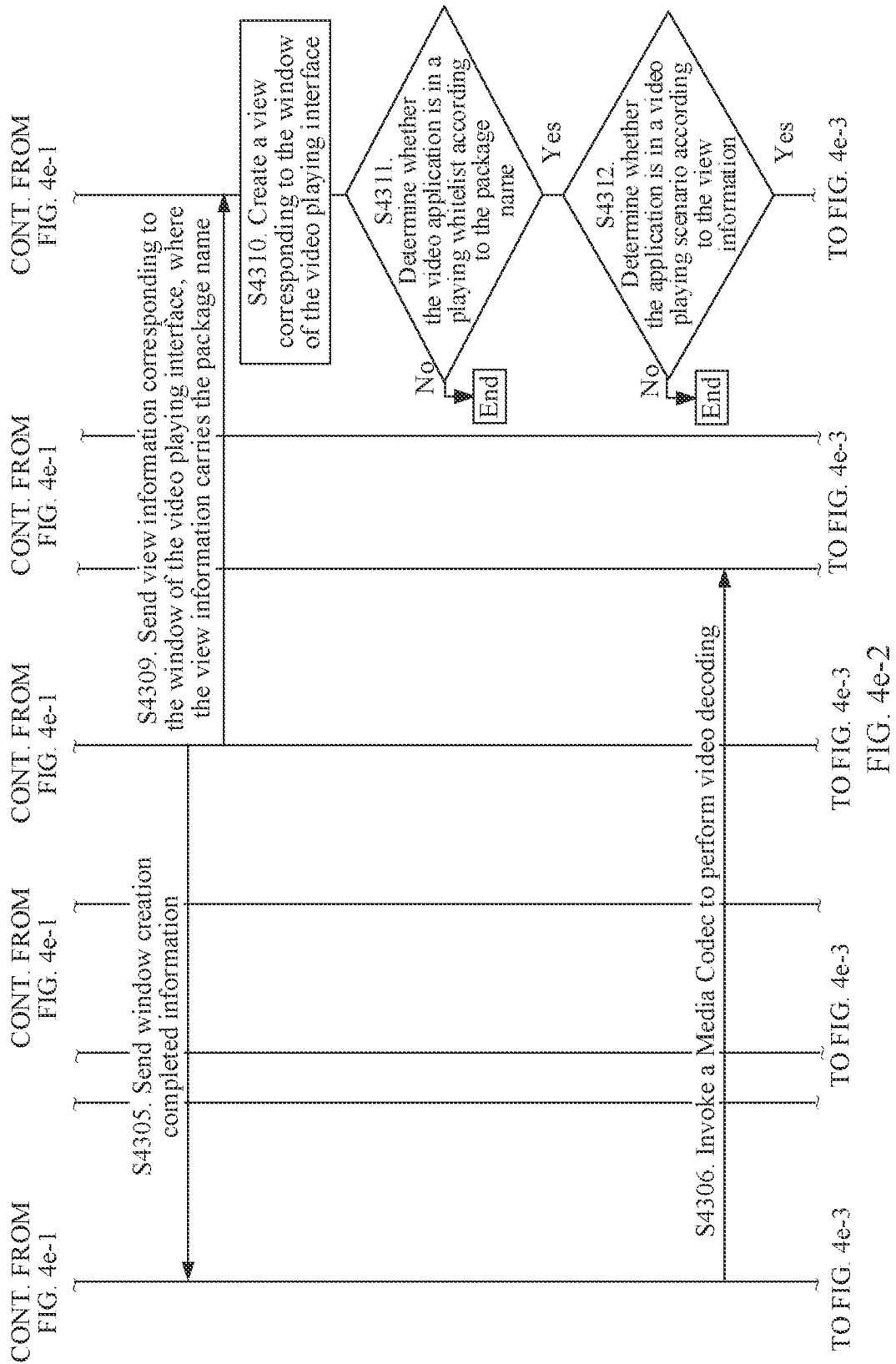
Figures 3, 4E:
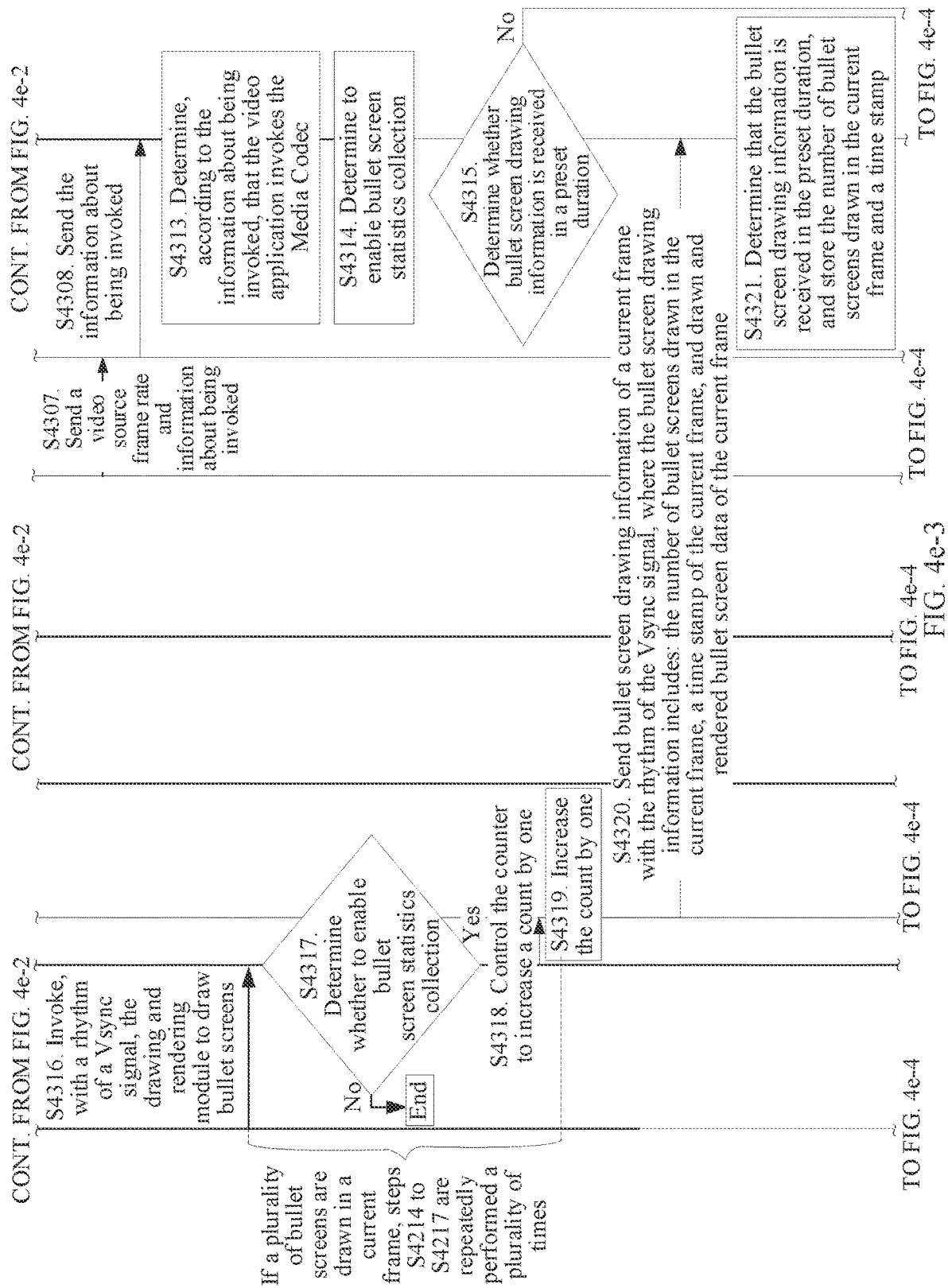
Figures 4, 4E:
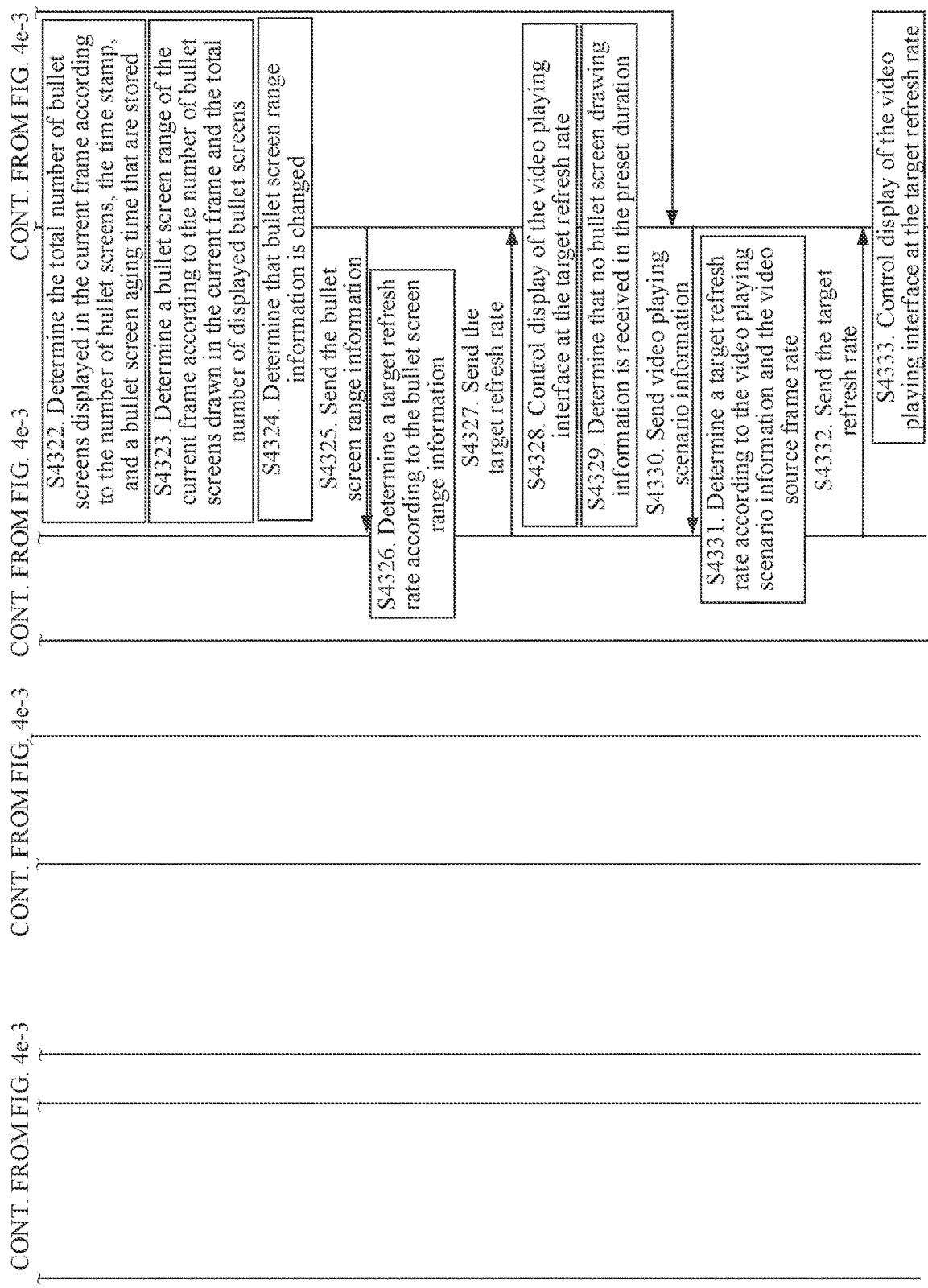

It can be known with reference to the descriptions of step S4201 to step S4209 shown in FIG. 4*b*-1, FIG. 4*b*-2, FIG. 4*b*-3, and FIG. 4*b*-4 and the descriptions of step S4301 to step S4310 shown in FIG. 4*e*-1. FIG. 4*e*-2. FIG. 4*e*-3, and FIG. 4*e*-4 that, the electronic device displays a video playing interface at the first refresh rate in response to receiving an operation of playing a video by the user, where the video playing interface is used to display a video picture of the video played by the user. The displaying a video playing interface at the first refresh rate in response to receiving an operation of playing a video by the user is implemented in many manners, including but not limited to the content proposed in the embodiments of this application.

It can be known still with reference to step S4210 to step S4231 in FIG. 4*b*-1. FIG. 4*b*-2. FIG. 4*b*-3, and FIGS. 4*b*-4 and S4311 to S4333 in FIG. 4*d* that, in the embodiments of this application, in the process of displaying a video picture of the video played by the user, the refresh rate is adjusted in a manner of determining whether to perform bullet screen drawing in the preset duration. Specifically, in the process of displaying a video picture of the video played by the user, if bullet screen drawing is performed in the preset duration, statistics is collected on bullet screen data of each frame of displayed picture of the video, and the application interface of the application is refreshed and displayed at the second refresh rate according to the bullet screen data of each frame of displayed picture. The application interface of the application is refreshed and displayed at a third refresh rate in a case that bullet screen drawing is not performed in the preset duration, where the third refresh rate is different from the second refresh rate. The third refresh rate is a refresh rate used in the video playing scenario, and the second refresh rate is a refresh rate determined according to the bullet screen data of each frame of displayed picture in the bullet screen scenario. In a manner of continuously determining whether to perform bullet screen drawing in the preset duration in the process of displaying the video picture, whether the application is currently in the video playing scenario or the bullet screen scenario may be recognized; and then in the bullet screen scenario, the refresh rate can be adjusted, through the bullet screen data on which statistics is collected, to the second refresh rate meeting a requirement of the current scenario to refresh the application interface, while in the video playing scenario, the refresh rate is adjusted to the third refresh rate meeting a requirement of the video playing scenario to refresh the application interface.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an inner structure of an apparatus is divided into different functional modules to complete all or some of the functions described above. For specific work process of the system, apparatus and unit described above, corresponding process in the foregoing method embodiments may be referred to, and the details are not described herein again.

In the several embodiments provided in the embodiments of this application, it should be understood that, the disclosed system, apparatus, and method may be implemented in other manners. For example, the described apparatus embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate. Parts displayed as units may or may not be physical units, and may be located in one position, or may be distributed on a plurality of network units. Some or all of the units may be selected according to an actual requirement to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the related art, or all or a part of the technical solutions may be implemented in the form of a software product. The computer software product is stored in a storage medium and includes several instructions for instructing a computer device (which may be a personal computer (PC), a server or a network device) or a processor to perform all or some of the steps of the method described in the embodiments. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A refresh rate setting method, applicable to an electronic device, wherein an application is installed in the electronic device, and the method comprises:
    in response to receiving an operation of launching the application by a user, refreshing and displaying an application interface of the application at a first refresh rate;
    in response to receiving an operation of playing a video by the user, displaying a video picture at the first refresh rate;
    determining, in a process of displaying the video picture, whether the application is in a video playing scenario according to view information of the application interface, wherein the video playing scenario is a scenario of playing a video;
    determining, in a case of determining that the application is in the video playing scenario, whether to perform bullet screen drawing in a preset duration;
    collecting statistics on bullet screen data of each frame of the video in a case that bullet screen drawing is performed in the preset duration;
    refreshing and displaying the application interface of the application at a second refresh rate according to the bullet screen data of each frame of the video in the case that bullet screen drawing is performed in the preset duration; and
    refreshing and displaying the application interface of the application at a third refresh rate in a case that bullet screen drawing is not performed in the preset duration, wherein the third refresh rate is different from the second refresh rate.

2. The method according to claim 1, wherein the refreshing and displaying the application interface of the application at the second refresh rate according to the bullet screen data of each frame of the video comprises:
    determining the second refresh rate according to the bullet screen data of each frame of the video; and
    refreshing and displaying the application interface of the application at the determined second refresh rate.

3. The method according to claim 2, wherein the determining the second refresh rate according to the bullet screen data of each frame of the video comprises:
- determining a current bullet screen range according to the bullet screen data of each frame of the video on which statistics is currently collected, wherein the bullet screen range is used for indicating an order-of-magnitude of a bullet screen density on a current frame of the video; and
- determining the second refresh rate according to the current bullet screen range.

4. The method according to claim 1, wherein the bullet screen data of a frame of the video comprises: a number of bullet screens drawn in the frame and/or a number of characters of bullet screens drawn in the frame.

5. The method according to claim 4, wherein the determining the current bullet screen range according to the bullet screen data of each frame of displayed picture of the video on which statistics is currently collected comprises:
- performing, according to the number of bullet screens drawn in each frame of the video on which statistics is currently collected, a time stamp corresponding to each frame of the video, and a bullet screen aging time, a calculation to obtain the total number of bullet screens displayed in a current frame of the video; and
- determining the current bullet screen range according to the number of bullet screens drawn in the current frame of the video and the total number of bullet screens displayed in the current frame of the video.

6. The method according to claim 5, wherein the bullet screen range comprises: a high bullet screen range or a low bullet screen range; and
- wherein the determining the current bullet screen range according to the number of bullet screens drawn in the current frame of the video and the total number of bullet screens displayed in the current frame of the video comprises:
  - determining the current bullet screen range as the low bullet screen range in a case that the number of bullet screens drawn in the current frame of the video is less than a first preset value and the total number of bullet screens displayed in the current frame of the video is less than a second preset value; and
  - determining the current bullet screen range as the high bullet screen range in a case that the number of bullet screens drawn in the current frame of the video is greater than or equal to the second preset value or the total number of bullet screens displayed in the current frame of the video is greater than or equal to the second preset value.

7. The method according to claim 1, wherein the collecting the statistics on the bullet screen data of each frame of the video comprises:
- collecting statistics on bullet screen data of a particular region in each frame of of the video.

8. The method according to claim 1, wherein before the determining whether to perform the bullet screen drawing in the preset duration, the method further comprises:
- determining whether to decode the video; and
- wherein the determining, in the case of determining that the application is in the video playing scenario, whether to perform the bullet screen drawing in the preset duration comprises:
  - determining, in a case of determining that the application is in the video playing scenario and determining to decode the video, whether to perform the bullet screen drawing in the preset duration.

9. The method according to claim 8, wherein before the determining whether the application is in the video playing scenario according to the view information of the application interface, the method further comprises:
- determining whether the application is in a playing whitelist, wherein the playing whitelist is a list of applications having video playing permission; and
- wherein the determining whether the application is in the video playing scenario according to the view information of the application interface comprises:
  - determining, in a case of determining that the application is in the playing whitelist, whether the application is in the video playing scenario according to the view information of the application interface.

10. The method according to claim 9, wherein the determining whether the application is in the playing whitelist comprises:
- determining whether the application is in the playing whitelist according to a package name of the application carried in the view information of the application interface, wherein the playing whitelist comprises a package name of each application having the video playing permission.

11. The method according to claim 8, wherein the determining whether the application is in the video playing scenario according to the view information of the application interface comprises:
- determining whether the view information of the application interface contains feature information of a SurfaceView;
- determining, in a case that the view information of the application interface contains the feature information of the SurfaceView, that the application is in the video playing scenario; and
- determining, in a case that the view information of the application interface does not contain the feature information of the SurfaceView, that the application is not in the video playing scenario.

12. The method according to claim 11, wherein the feature information of the SurfaceView is: a SurfaceView field carried in a view name.

13. The method according to claim 1, wherein the third refresh rate is determined according to a video source frame rate of the video.

14. The method according to claim 1, wherein the method further comprises:
- in response to receiving an operation of exiting video playing by the user, and refreshing and displaying the application interface of the application at the first refresh rate.

15. The method according to claim 1,
- wherein an operating system of the electronic device comprises: the application and a Surface Flinger; and
- wherein the determining whether to perform the bullet screen drawing in the preset duration comprises:
  - determining, by the Surface Flinger, whether bullet screen drawing information of a frame is received in the preset duration, wherein the bullet screen drawing information of the frame comprises: a number of bullet screens drawn in the frame, a time stamp corresponding to the frame, and drawn and rendered bullet screen data in the frame.

16. The method according to claim 15, wherein the collecting the statistics on the bullet screen data of each frame of the video in the case that bullet screen drawing is performed in the preset duration comprises:

storing, by the Surface Flinger in a case that the bullet screen drawing information of the frame is received in the preset duration, the number of bullet screens drawn in the frame of displayed picture and the time stamp corresponding to the frame, of displayed picture.

17. The method according to claim 15, wherein the refreshing and displaying the application interface of the application at the second refresh rate according to the bullet screen data of each frame of the video comprises:
   determining, by the Surface Flinger, the current bullet screen range according to the number of bullet screens drawn in each frame of the video, the time stamp corresponding to the each frame of the video, and the bullet screen aging time that are stored;
   sending, by the Surface Flinger, current bullet screen range information to the operating system, wherein the bullet screen range information comprises the current bullet screen range;
   determining, by the operating system, the second refresh rate according to the bullet screen range information;
   sending, by the operating system, the second refresh rate to the Surface Flinger; and
   controlling, by the Surface Flinger at the second refresh rate, a display screen of the electronic device to refresh and display the application interface of the application.

18. The method according to claim 1, wherein the preset duration is a period of time from a beginning of displaying the video.

19. An electronic device, comprising:
   one or more processors;
   a memory; and
   a display screen,
   wherein the memory and the display screen are respectively coupled to the one or more processors;
   wherein the display screen is configured to display an application interface; and
   wherein the memory is configured to store computer program code, the computer program code comprises computer instructions, and the computer instructions, when executed by the one or more processors, cause the electronic device to perform a refresh rate setting method comprising:
      in response to receiving an operation of launching an application by a user, refreshing and displaying the application interface of the application at a first refresh rate;
      in response to receiving an operation of playing a video by the user, displaying a video picture at the first refresh rate;
      determining, in a process of displaying the video picture, whether the application is in a video playing scenario according to view information of the application interface, wherein the video playing scenario is a scenario of playing a video;
      determining, in a case of determining that the application is in the video playing scenario, whether to perform bullet screen drawing in a preset duration;
      collecting statistics on bullet screen data of each frame of the video in a case that bullet screen drawing is performed in the preset duration;
      refreshing and displaying the application interface of the application at a second refresh rate according to the bullet screen data of each frame of the video in the case that bullet screen drawing is performed in the preset duration; and
      refreshing and displaying the application interface of the application at a third refresh rate in a case that bullet screen drawing is not performed in the preset duration, wherein the third refresh rate is different from the second refresh rate.

20. A non-transitory computer-readable storage medium, wherein the computer-readable storage medium stores computer instructions, and when the computer instructions are run on an electronic device, the electronic device is enabled to perform a refresh rate setting method comprising:
   in response to receiving an operation of launching an application by a user, refreshing and displaying an application interface of the application at a first refresh rate;
   in response to receiving an operation of playing a video by the user, displaying a video picture at the first refresh rate;
   determining, in a process of displaying the video picture, whether the application is in a video playing scenario according to view information of the application interface, wherein the video playing scenario is a scenario of playing a video;
   determining, in a case of determining that the application is in the video playing scenario, whether to perform bullet screen drawing in a preset duration;
   collecting statistics on bullet screen data of each frame of the video in a case that bullet screen drawing is performed in the preset duration;
   refreshing and displaying the application interface of the application at a second refresh rate according to the bullet screen data of each frame of the video in the case that bullet screen drawing is performed in the preset duration; and
   refreshing and displaying the application interface of the application at a third refresh rate in a case that bullet screen drawing is not performed in the preset duration, wherein the third refresh rate is different from the second refresh rate.

* * * * *

UNITED STATES PATENT AND TRADEMARK OFFICE
CERTIFICATE OF CORRECTION

PATENT NO. : 12,375,757 B2  
APPLICATION NO. : 18/035380  
DATED : July 29, 2025  
INVENTOR(S) : Feng et al.

Page 1 of 1

It is certified that error appears in the above-identified patent and that said Letters Patent is hereby corrected as shown below:

On the Title Page

Abstract (57), Line 10: "user, determining, in a process of displaying the video" should read -- user; determining, in a process of displaying the video --.

In the Claims

Claim 2, Column 50, Line 67: "application at the determined second refresh rate." should read -- application at the second refresh rate. --.

Claim 7, Column 51, Line 55: "region in each frame of of the video." should read -- region in each frame of the video. --.

Claim 14, Column 52, Line 49: "playing by the user, and refreshing and displaying the" should read -- playing by the user, refreshing and displaying the --.

Claim 16, Column 53, Line 4: "in the frame of displayed picture and the time stamp" should read -- in the frame and the time stamp --.

Claim 16, Column 53, Line 5: "corresponding to the frame, of displayed picture." should read -- corresponding to the frame. --.

Signed and Sealed this  
Twenty-sixth Day of August, 2025

Coke Morgan Stewart  
*Acting Director of the United States Patent and Trademark Office*